US010310796B2

(12) United States Patent
Lee et al.

(10) Patent No.: US 10,310,796 B2
(45) Date of Patent: Jun. 4, 2019

(54) DUAL DISPLAY WITH POINTER CONTROLLED BY A REMOTE DEVICE

(71) Applicant: LG ELECTRONICS INC., Seoul (KR)

(72) Inventors: Donghee Lee, Seoul (KR); Gahyun Chloe Sun, Seoul (KR); Woojin Jeong, Seoul (KR); Jaekyung Lee, Seoul (KR)

(73) Assignee: LG ELECTRONICS, Seoul (KR)

( * ) Notice: Subject to any disclaimer, the term of this patent is extended or adjusted under 35 U.S.C. 154(b) by 108 days.

(21) Appl. No.: 15/381,829

(22) Filed: Dec. 16, 2016

(65) Prior Publication Data

US 2017/0180672 A1 Jun. 22, 2017

(30) Foreign Application Priority Data

Dec. 17, 2015 (KR) .................. 10-2015-0181282

(51) Int. Cl.
*G06F 3/14* (2006.01)
*G06F 3/0346* (2013.01)
*H04N 5/44* (2011.01)

(52) U.S. Cl.
CPC .......... *G06F 3/1446* (2013.01); *G06F 3/0346* (2013.01); *H04N 5/4403* (2013.01)

(58) Field of Classification Search
CPC .................. G06F 3/033; G06F 3/0346; G06F 3/0354–3/03549; G06F 3/1423–3/1446; G09G 2300/02; G09G 2300/026
See application file for complete search history.

(56) References Cited

U.S. PATENT DOCUMENTS

| 2012/0262487 | A1  | 10/2012 | Huebner |                |
|---|---|---|---|---|
| 2014/0101574 | A1* | 4/2014  | Maynard | G06F 3/0484    |
|              |     |         |         | 715/761        |
| 2014/0184652 | A1* | 7/2014  | Matel   | G09G 5/08      |
|              |     |         |         | 345/681        |
| 2015/0293739 | A1* | 10/2015 | Choi    | G06F 3/04812   |
|              |     |         |         | 345/157        |
| 2018/0129462 | A1* | 5/2018  | Han     | H04N 5/445     |
| 2018/0129463 | A1* | 5/2018  | Hwang   | H04N 5/44      |

OTHER PUBLICATIONS

European Patent Office Application Serial No. 16203789.9, Search Report dated Apr. 5, 2017, 8 pages.

* cited by examiner

*Primary Examiner* — Gene W Lee
(74) *Attorney, Agent, or Firm* — Lee, Hong, Degerman, Kang & Waimey

(57) ABSTRACT

A display device, which is connected to other display device and has one side surface closely contacting a side surface of the other display device, includes: a display unit configured to display at least a portion of a pointer corresponding to a movement of a remote control device; a communication unit configured to perform a connection with the other display device; and a control unit configured to control the pointer to be displayed on at least one of the display device and the other display device based on a placement state of the display device and the other display device and movement information received from the remote control device.

16 Claims, 69 Drawing Sheets

(a)

(b)

(a)

(b)

(a)

(b)

(a)

(b)

(a)

(b)

DUAL DISPLAY WITH POINTER CONTROLLED BY A REMOTE DEVICE

CROSS-REFERENCE TO RELATED APPLICATIONS

Pursuant to 35 U.S.C. § 119(a), this application claims the benefit of earlier filing date and right of priority to Korean Patent Application No. 10-2015-0181282, filed on Dec. 17, 2015, the contents of which are all hereby incorporated by reference herein in its entirety.

BACKGROUND

The present disclosure relates to a display device, and more particularly, to a display device and an operating method thereof, which are capable of displaying a pointer corresponding to a movement of a remote control device through a plurality of display devices connected to the display device and controlling any one of the plurality of display devices to process a command received from the remote control device.

Recently, there has been a service of providing one piece of content through a plurality of display devices by bringing the plurality of display devices into close contact with one another. That is, since there has been a limitation in a screen size or the like when only one display device is used, content has been provided by realizing a large screen through a plurality of display devices.

A remote control device for controlling an operation of display devices can be connected to (or registered in) the display devices through a wireless communication method (for example, Bluetooth or the like).

When content is provided through a plurality of display devices, in order to control an operation of any one of the plurality of display devices, it is necessary to use a remote control device connected to a corresponding display device. In this case, in order to control operations of the plurality of display devices, a user can experience the inconvenience of using a plurality of remote control devices. Therefore, there is a need for a method capable of easily and conveniently controlling operations of display devices by using one remote control device.

SUMMARY

Embodiments provide a display device and an operating method thereof, which are capable of displaying a pointer corresponding to a movement of a remote control device through a plurality of display devices and controlling any one of the plurality of display devices to process a command received from the remote control device.

In one embodiment, a display device, which is connected to other display device and has one side surface closely contacting one side surface of the other display device, include: a display unit configured to display at least a portion of a pointer corresponding to a movement of a remote control device; a communication unit configured to perform a connection with the other display device; and a control unit configured to control the pointer to be displayed on at least one of the display device and the other display device based on a placement state of the display device and the other display device and movement information received from the remote control device.

The control unit may check a placement state of the display device and the other display device and set position coordinates of each of the display device and the other display device based on the check result.

The control unit may change a pointer coordinate system of the display device based on the set position coordinates.

The control unit may calculate coordinates indicating a position at which the pointer is displayed, based on the placement state and the movement information, and transmits the calculated coordinates to the other display device.

The control unit may determine whether at least a portion of the pointer is displayed, based on the calculated coordinates and size information of the pointer, and display at least a portion of the pointer on the display unit based on the determination result.

The control unit may verify an operation mode of the display device in response to a control command received from the remote control device, and as the verification result, when the operation mode is a twin mode in which one piece of content is displayed on a combined screen including the display unit of the display device and a display unit of the other display device, perform control such that one of the display device and the other display device, which controls an operation of the twin mode, processes the control command.

As the verification result, when the operation mode is a split mode in which the display device and the other display device respectively display different pieces of content, the control unit may transmit the control command to one of the display device and the other display device, on which the pointer is placed.

In another embodiment, an operating method of a display device which is connected to other display device and has one side surface closely contacting one side surface of the other display device, includes: checking a placement state of the display device and the other display device; receiving movement information from a remote control device connected to the display device; and controlling a pointer corresponding to a movement of the remote control device to be displayed on at least one of the display device and the other display device based on a placement state of the display device and the other display device and the movement information.

Figure 5:
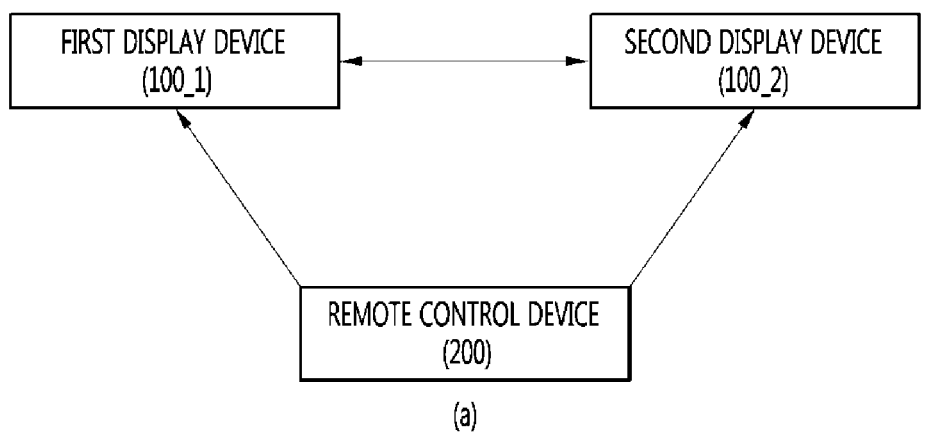
Figure 5:
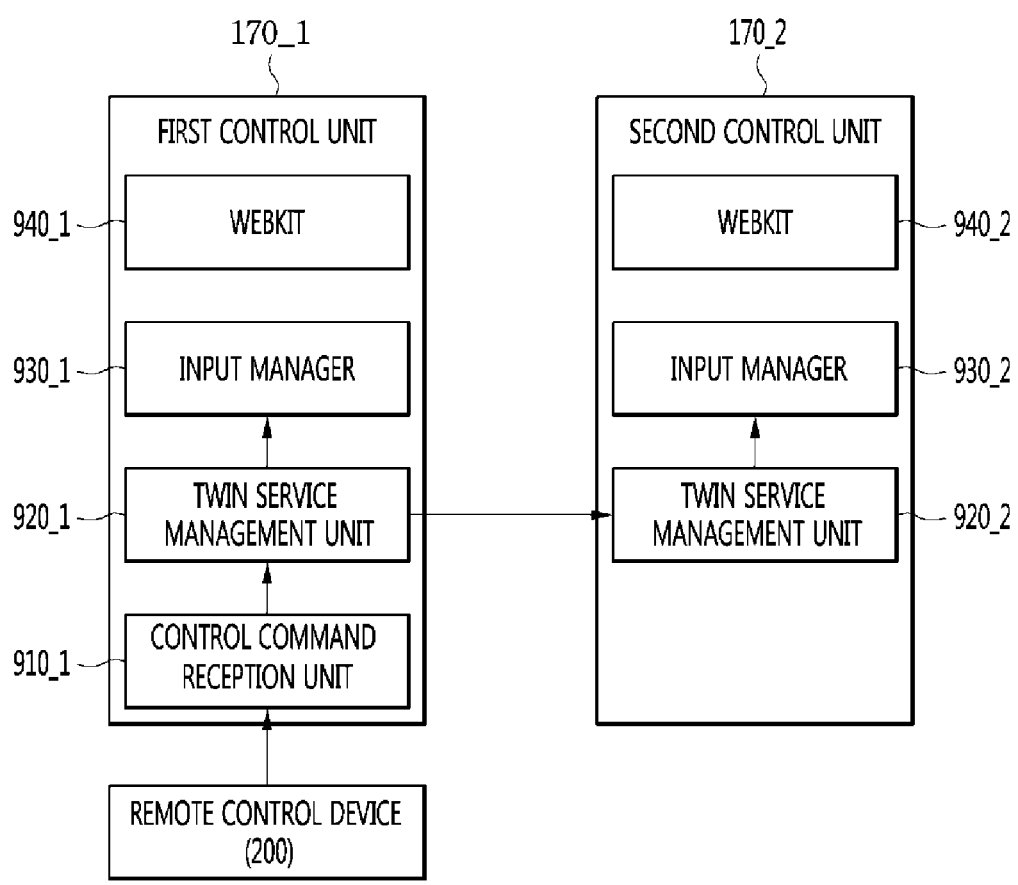

(a) of FIG. 5 is a diagram illustrating a configuration of a display system according to an embodiment of the present invention, and (b) of FIG. 5 is a diagram illustrating a detailed configuration of control units respectively included in display devices.

Figure 6:
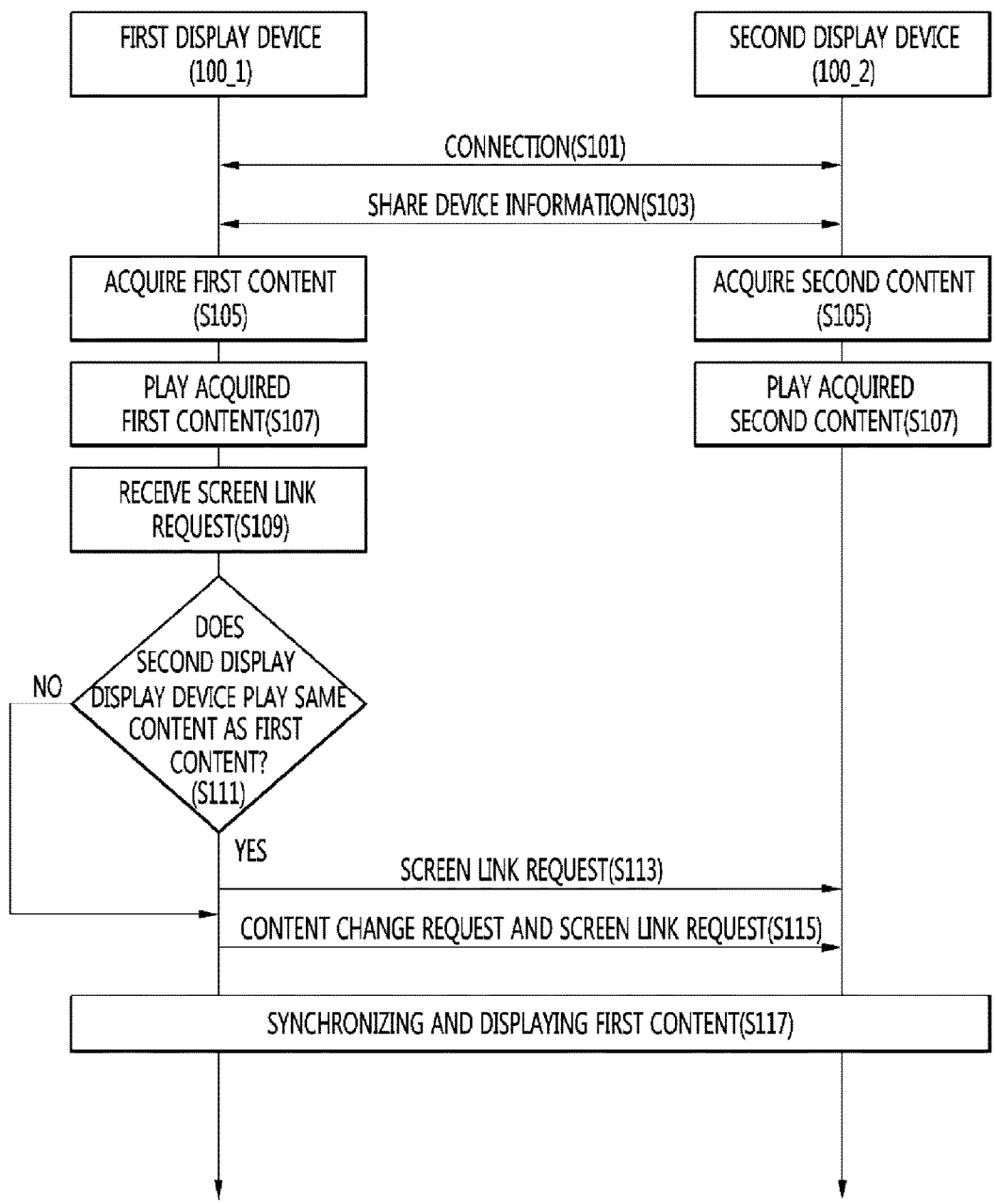

FIG. 6 is a ladder diagram illustrating an operating method of a display system according to an embodiment of the present invention.

Figure 7:
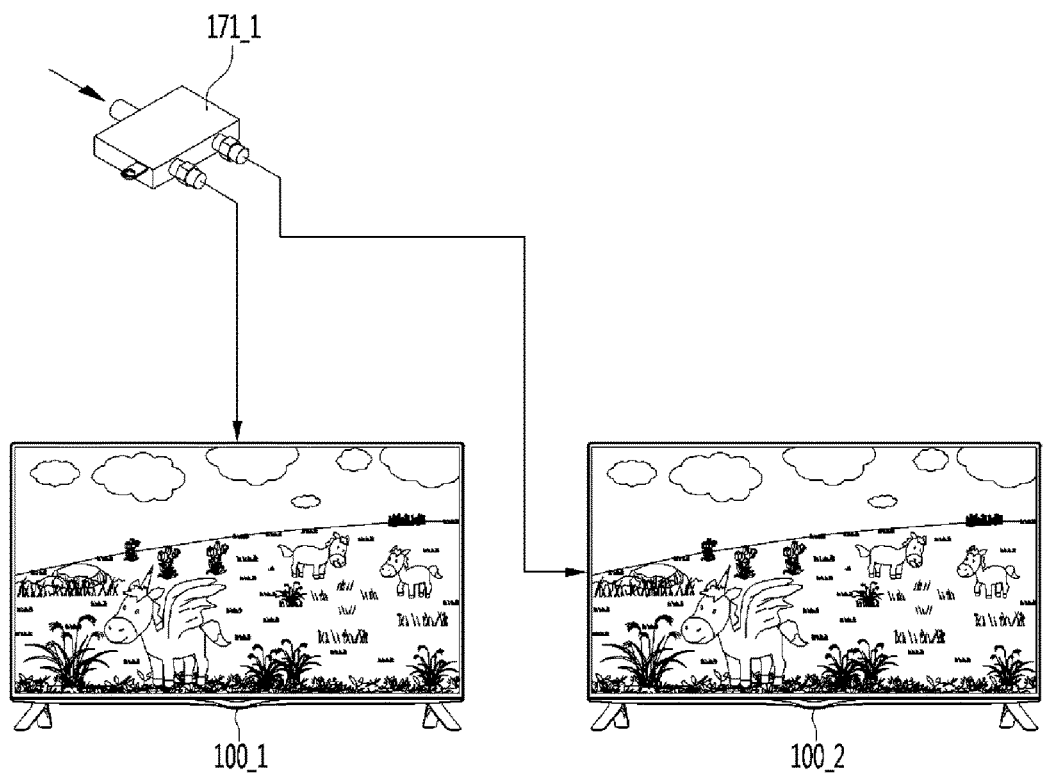
Figure 8:
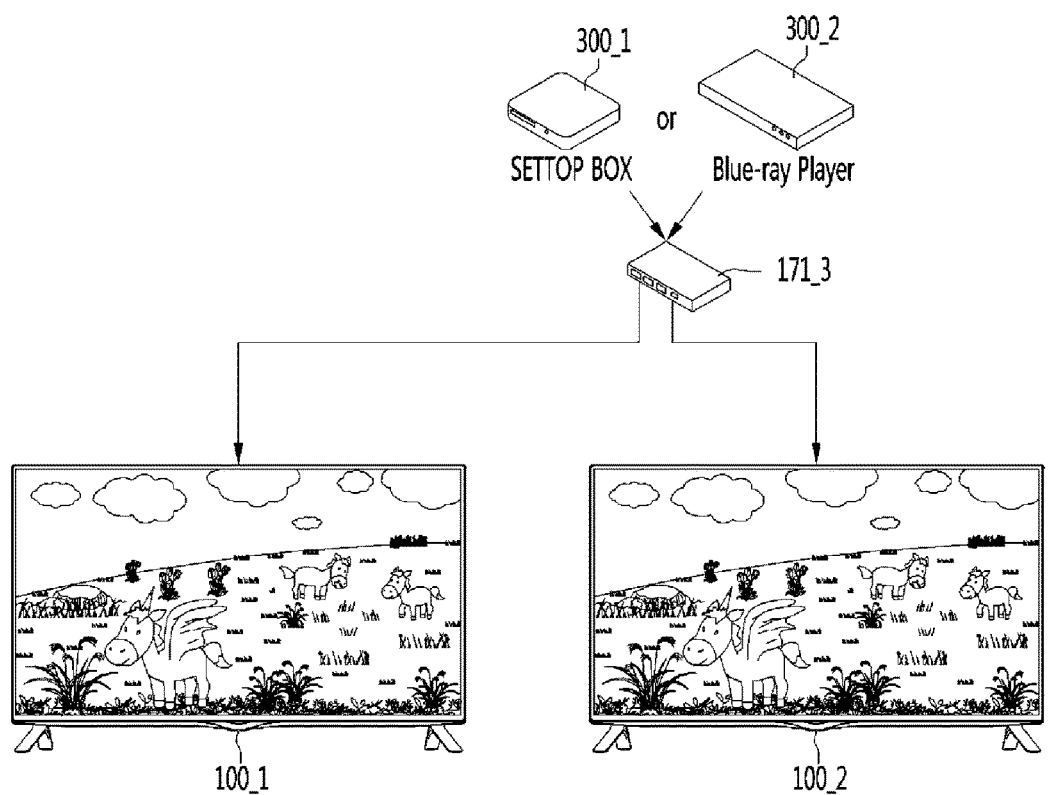

FIGS. 7 and 8 are diagrams illustrating examples in which display devices acquire the same content by a physical input.

Figure 9:
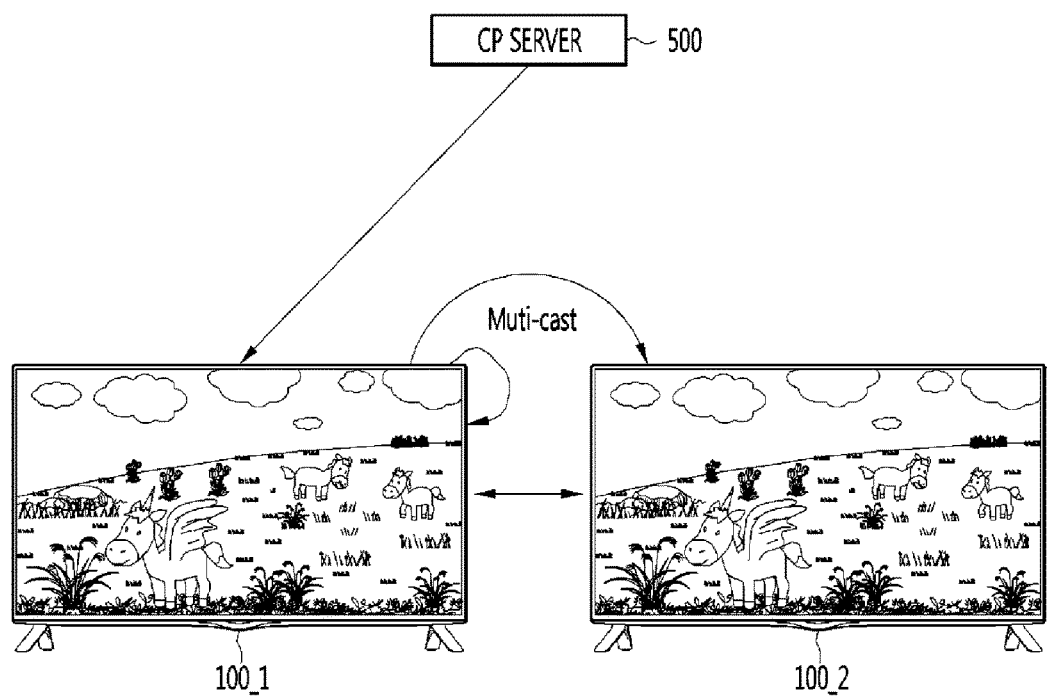

FIG. 9 is a diagram illustrating an example in which a first display device and a second display device acquire the same content through a content provider server (CP server) according to an embodiment of the present invention.

Figure 10:
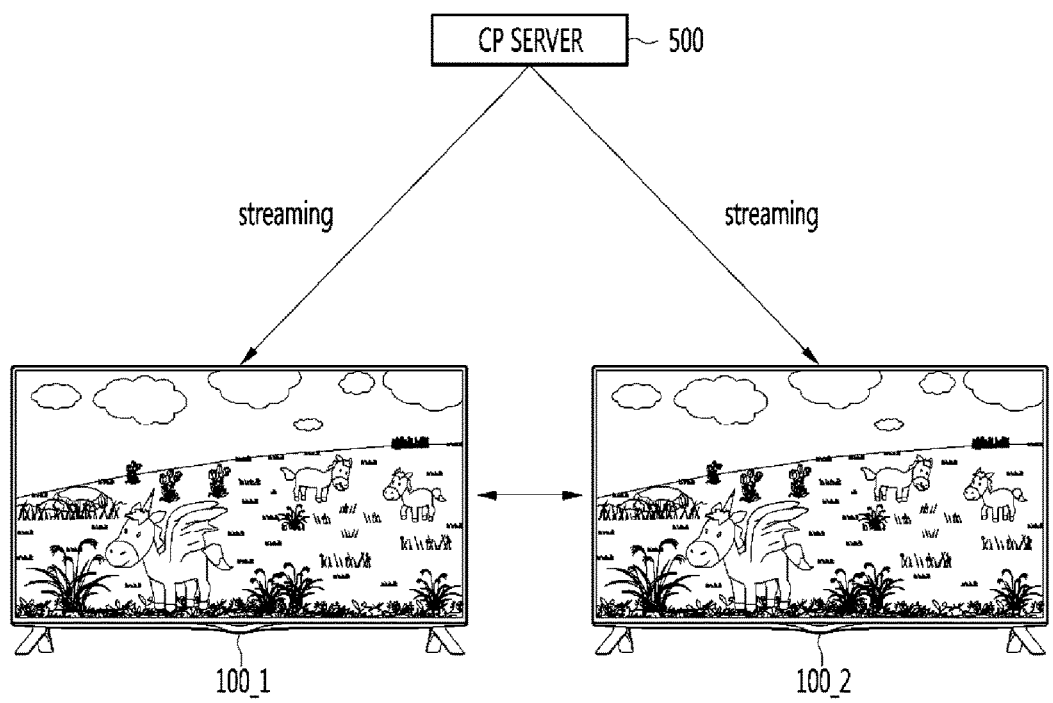

FIG. 10 is a diagram illustrating an example in which a first display device and a second display device acquire the same content through a CP server according to another embodiment of the present invention.

Figure 11:
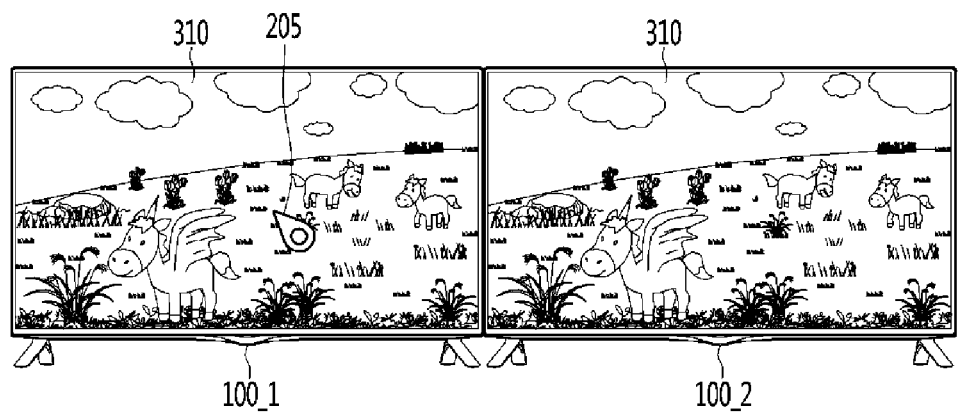
Figure 11:
Figure 11:
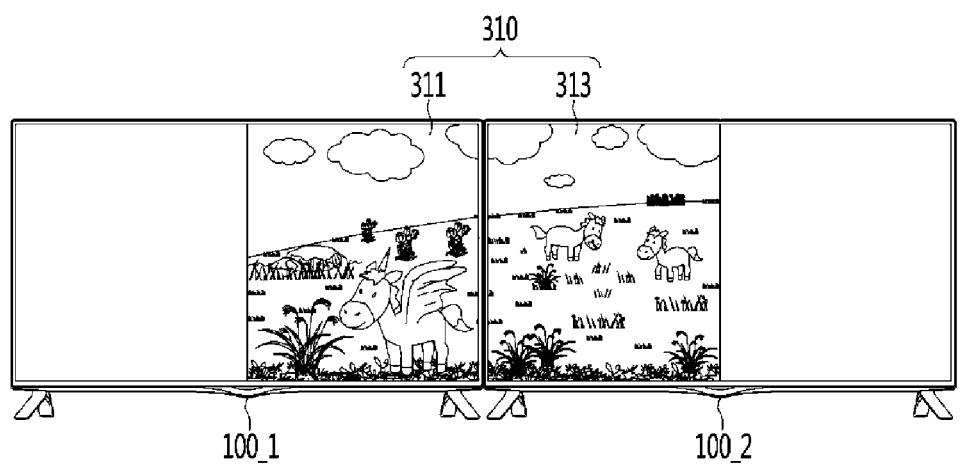

FIG. 11 is a diagram illustrating an example of a combined screen output according to a screen link request when a first display device and a second display device play the same content according to an embodiment of the present invention.

Figure 12:
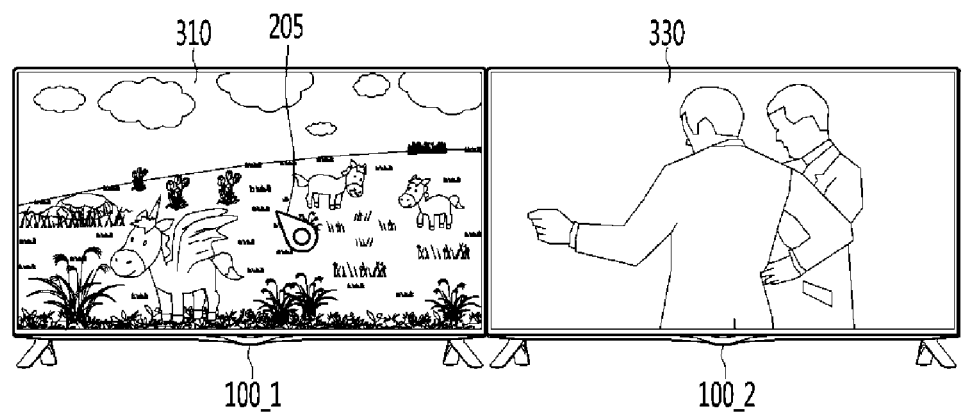
Figure 12:
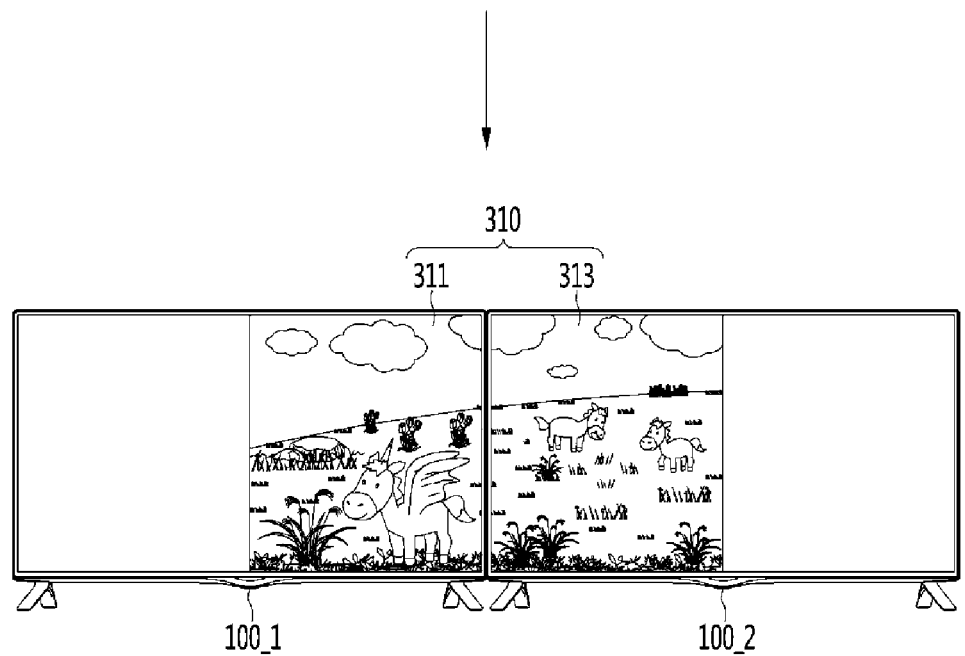
Figure 13:
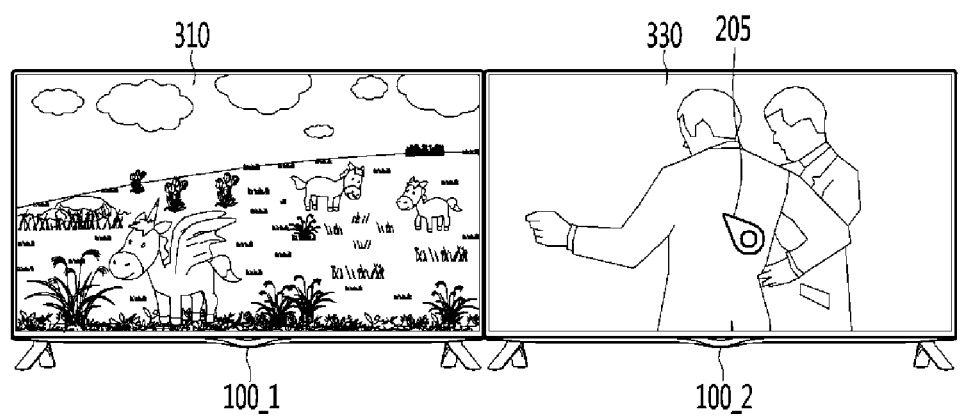
Figure 13:
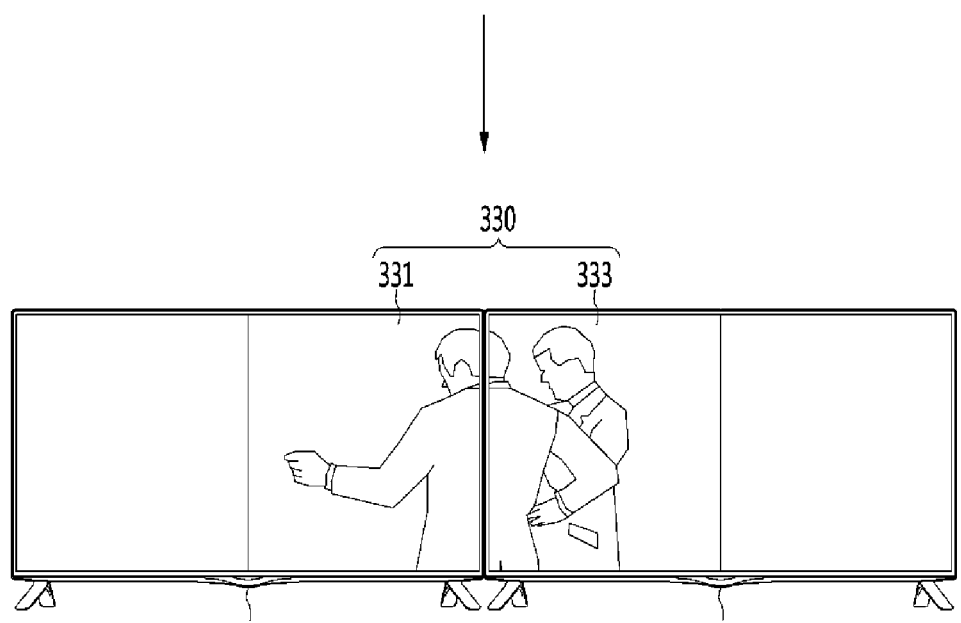

FIGS. 12 and 13 are diagrams illustrating an example of a screen output according to a screen link request when a first display device and a second display device respectively play different pieces of content.

Figure 14:
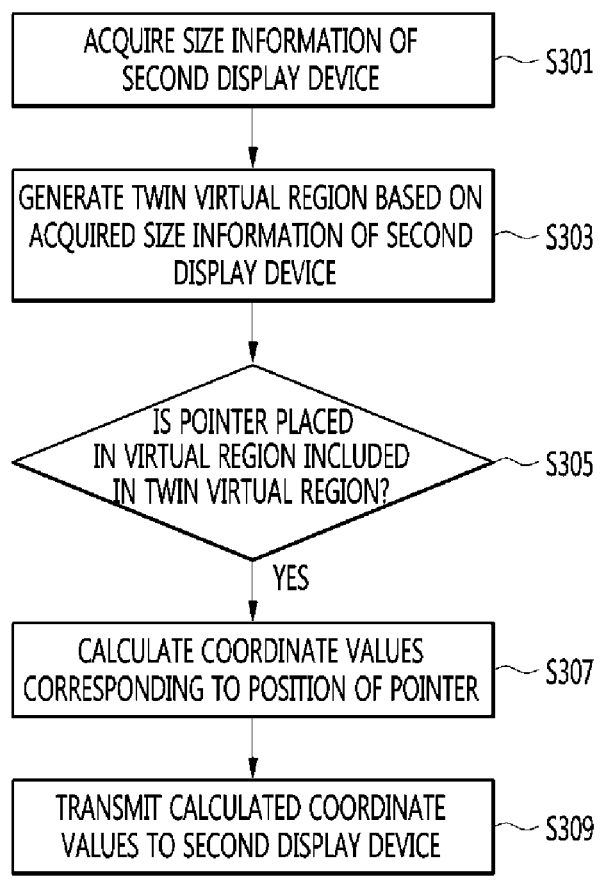

FIG. 14 is a flowchart illustrating a process of recognizing that a pointer is placed on a screen of a second display device according to an embodiment of the present invention.

Figure 15:
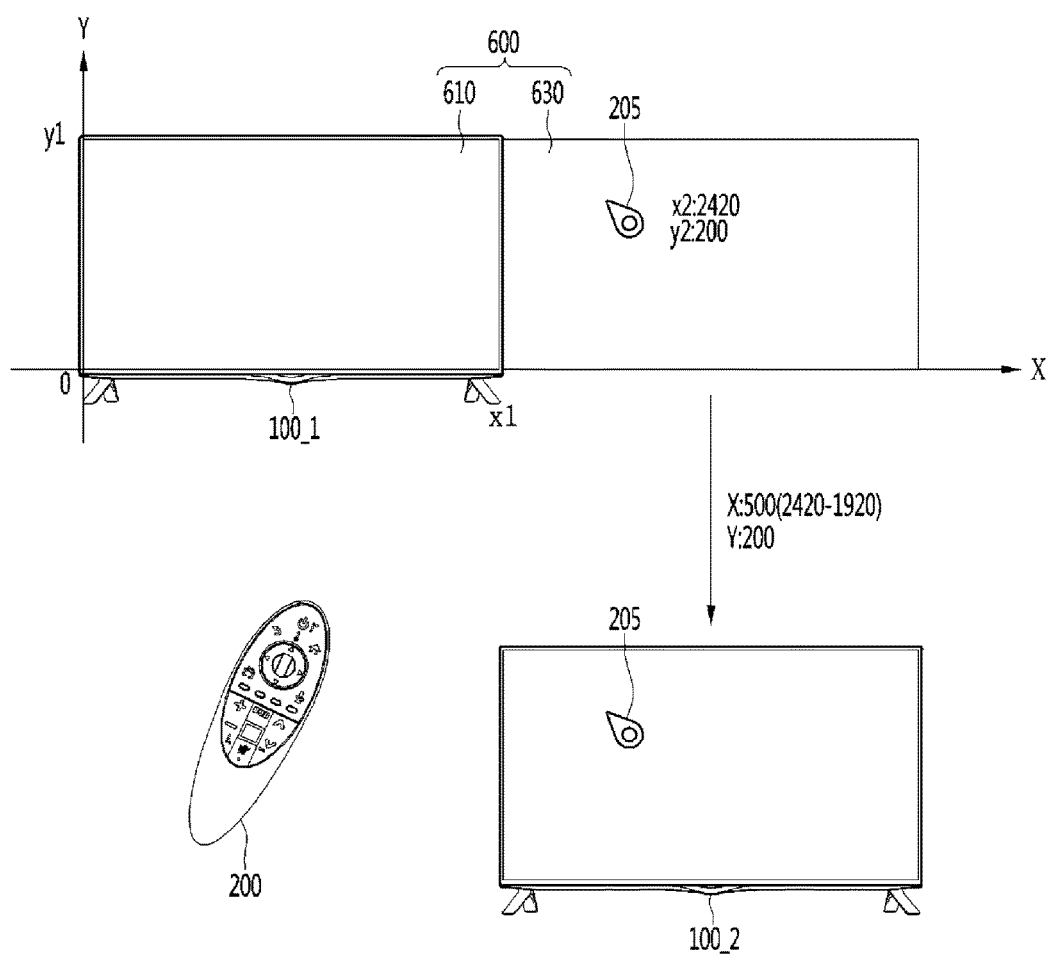

FIG. 15 is a diagram illustrating an example in which a position of a pointer is detected through a twin virtual region according to an embodiment of the present invention.

Figure 16:
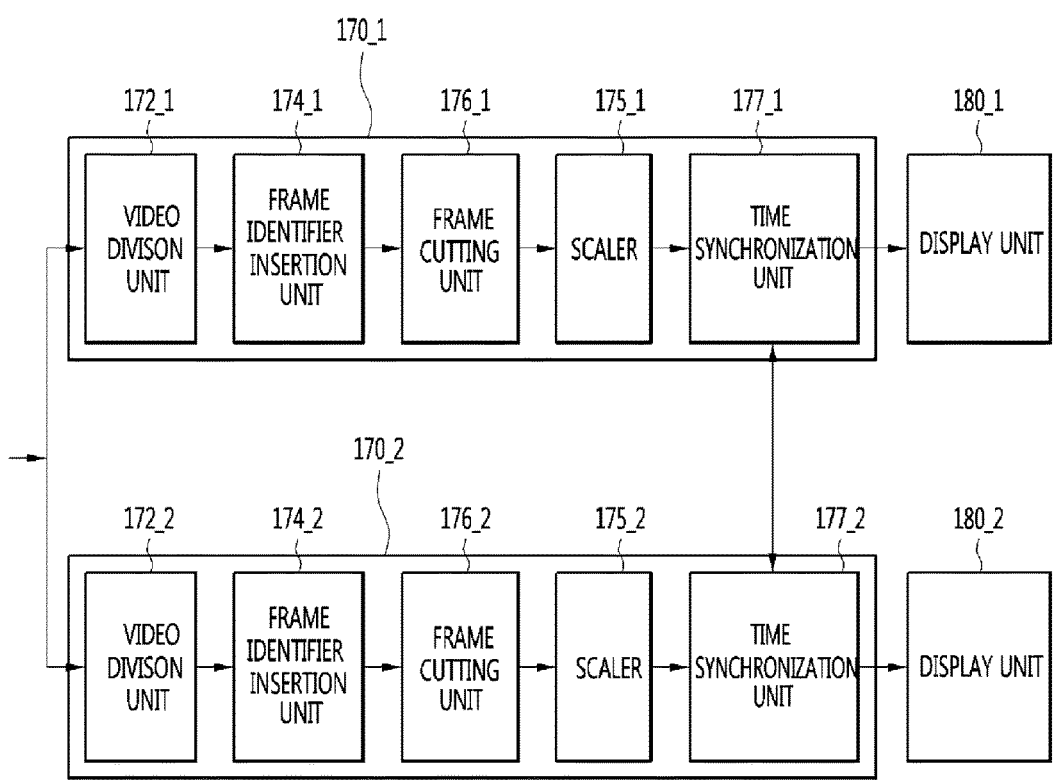

FIG. 16 is a diagram illustrating a configuration of a control unit according to another embodiment of the present invention.

Figure 17:
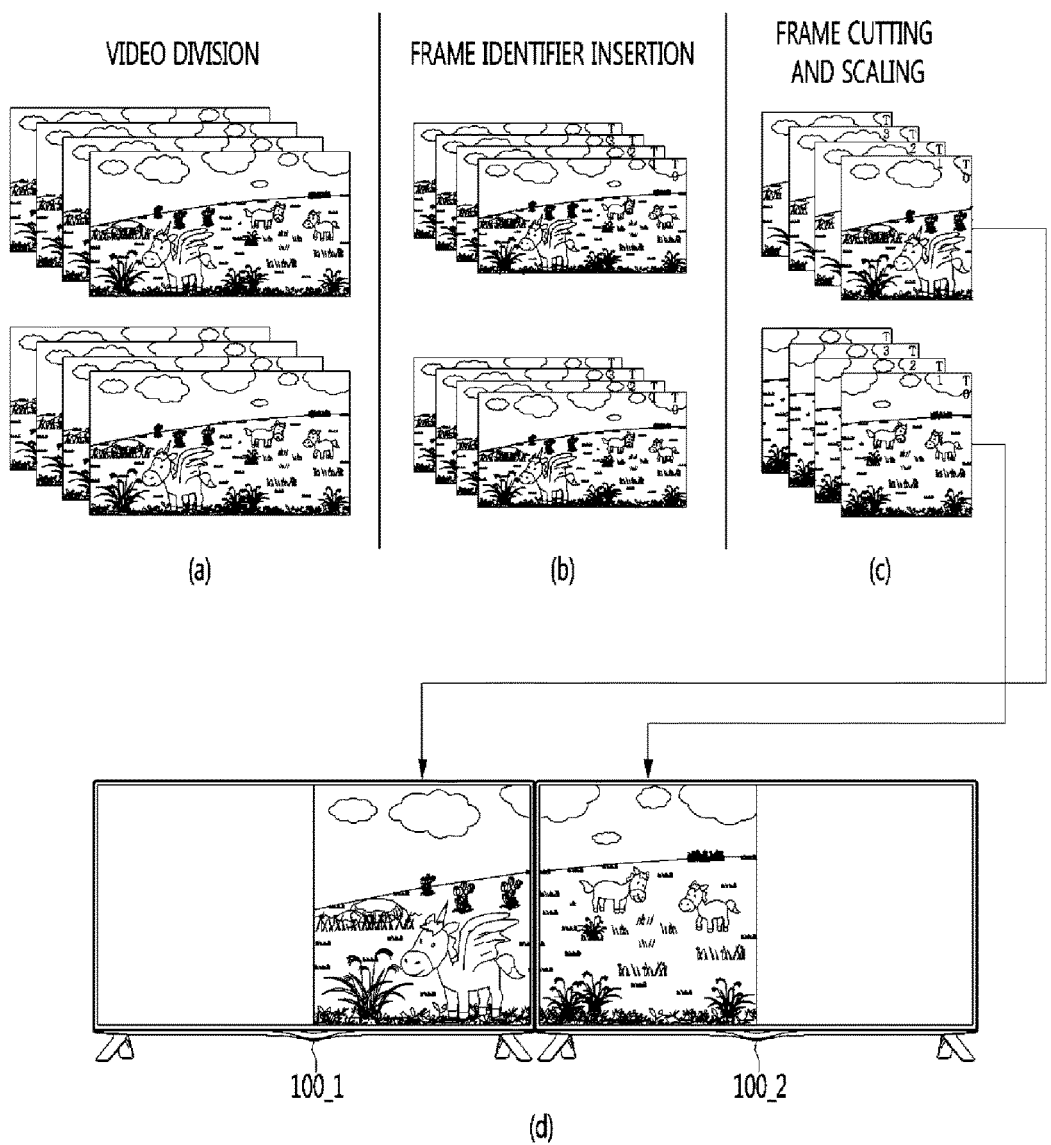

FIG. 17 is a diagram illustrating a process of performing synchronization so as to play content.

Figure 18:
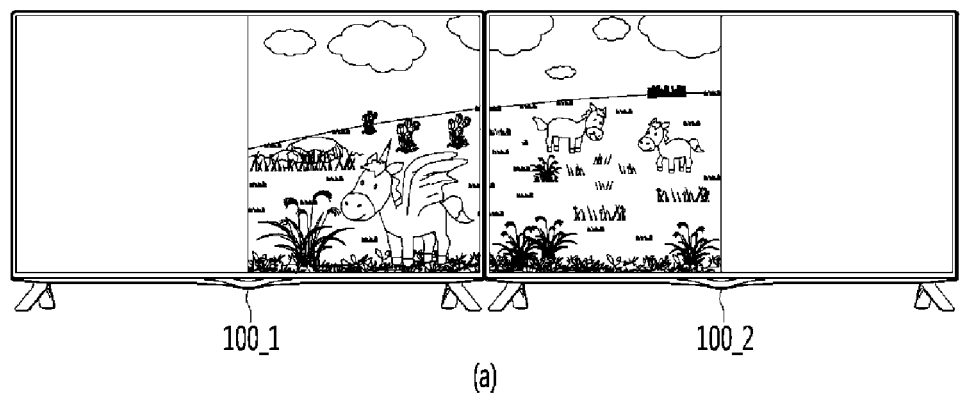
Figure 18:
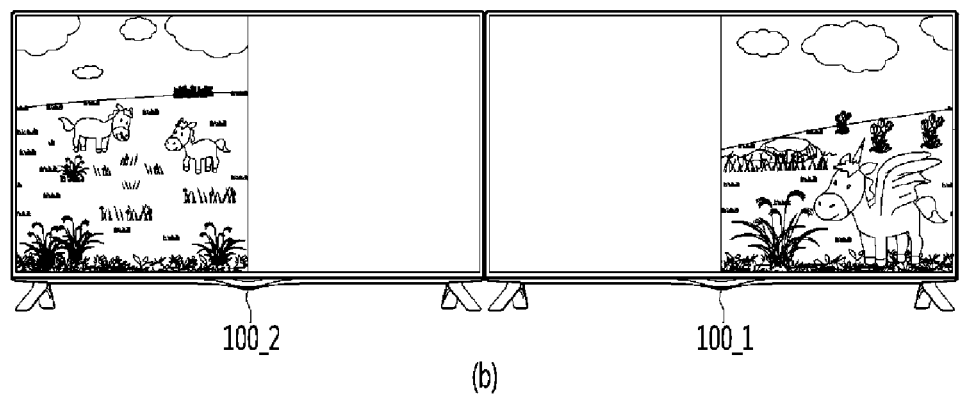

FIG. 18 is a diagram illustrating a state in which a first display device and a second display device are normally disposed and a state in which the first display device and the second display device are abnormally disposed.

Figure 19:
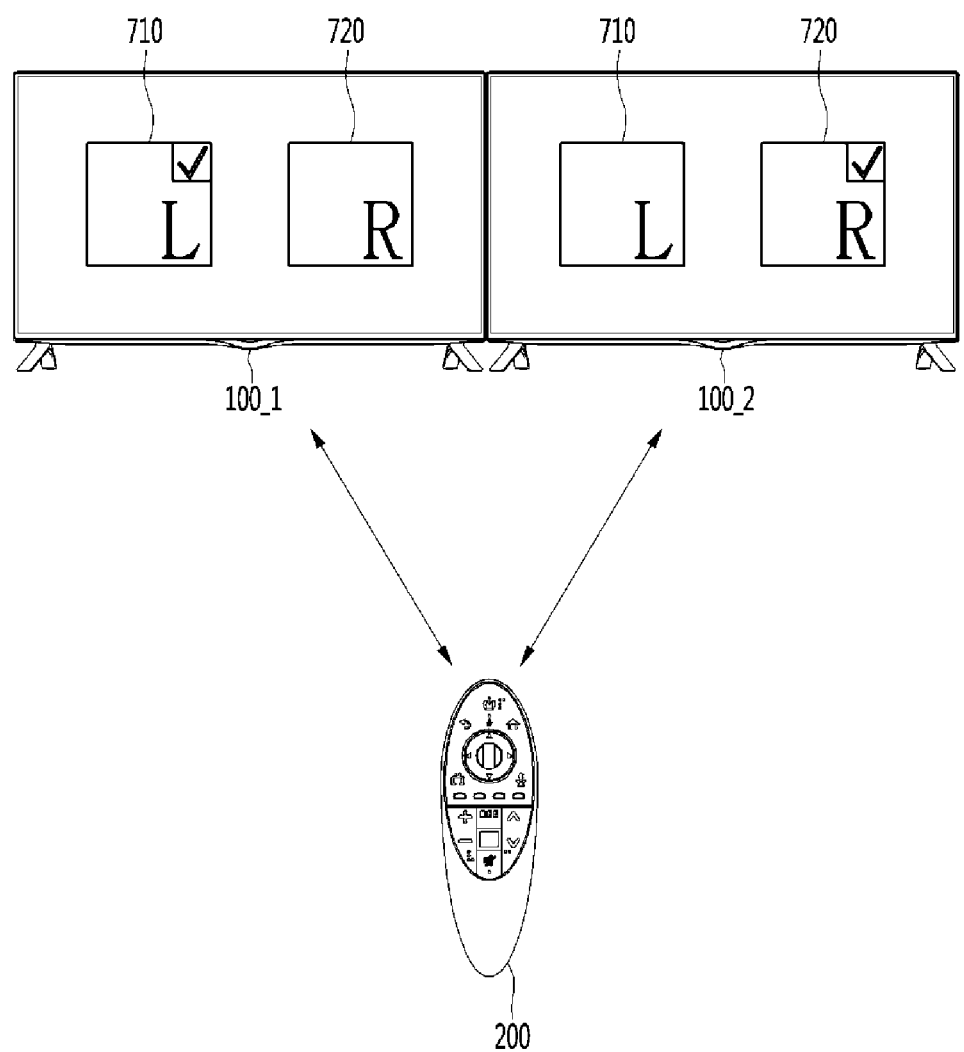

FIG. 19 is a diagram illustrating an example in which a placement of a first display device and a second display device is manually set according to an embodiment of the present invention.

Figure 20:
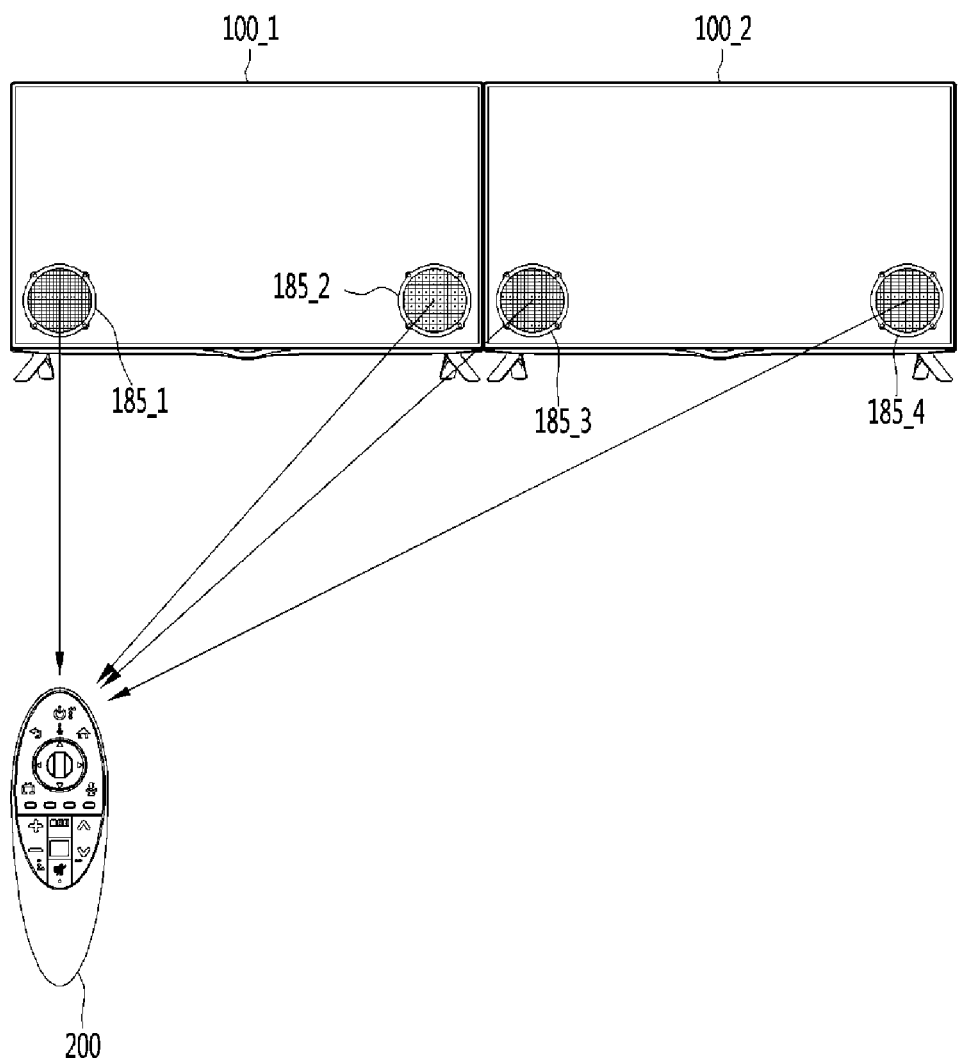

FIG. 20 is a diagram illustrating a method of checking a placement state of display devices through a speaker provided in each of the display devices and a microphone provided in a remote control device according to another embodiment of the present invention.

Figure 21:
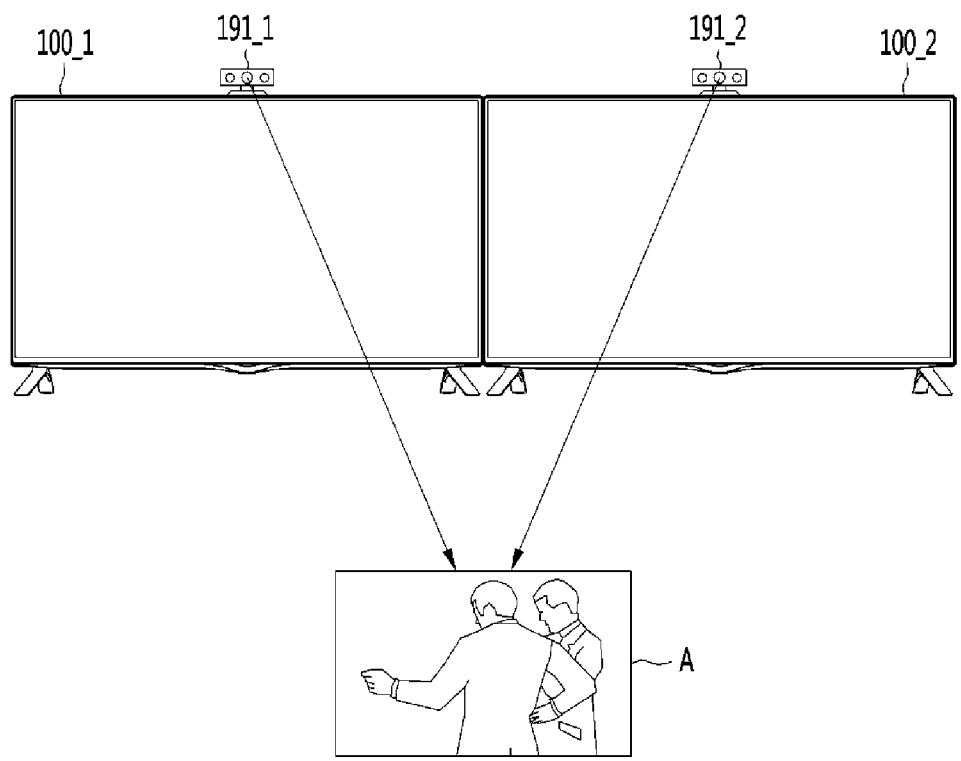

FIG. 21 is a diagram illustrating a method of checking a placement state of display devices through a camera provided in each of the display devices according to another embodiment of the present invention.

Figure 22:
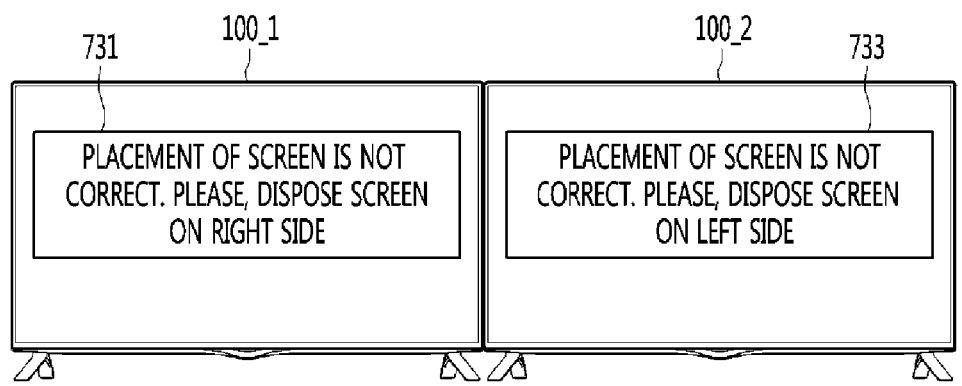

FIG. 22 is a diagram illustrating a placement guide window output when a placement state of a first display device and a second display device is abnormal according to an embodiment of the present invention.

Figure 23:
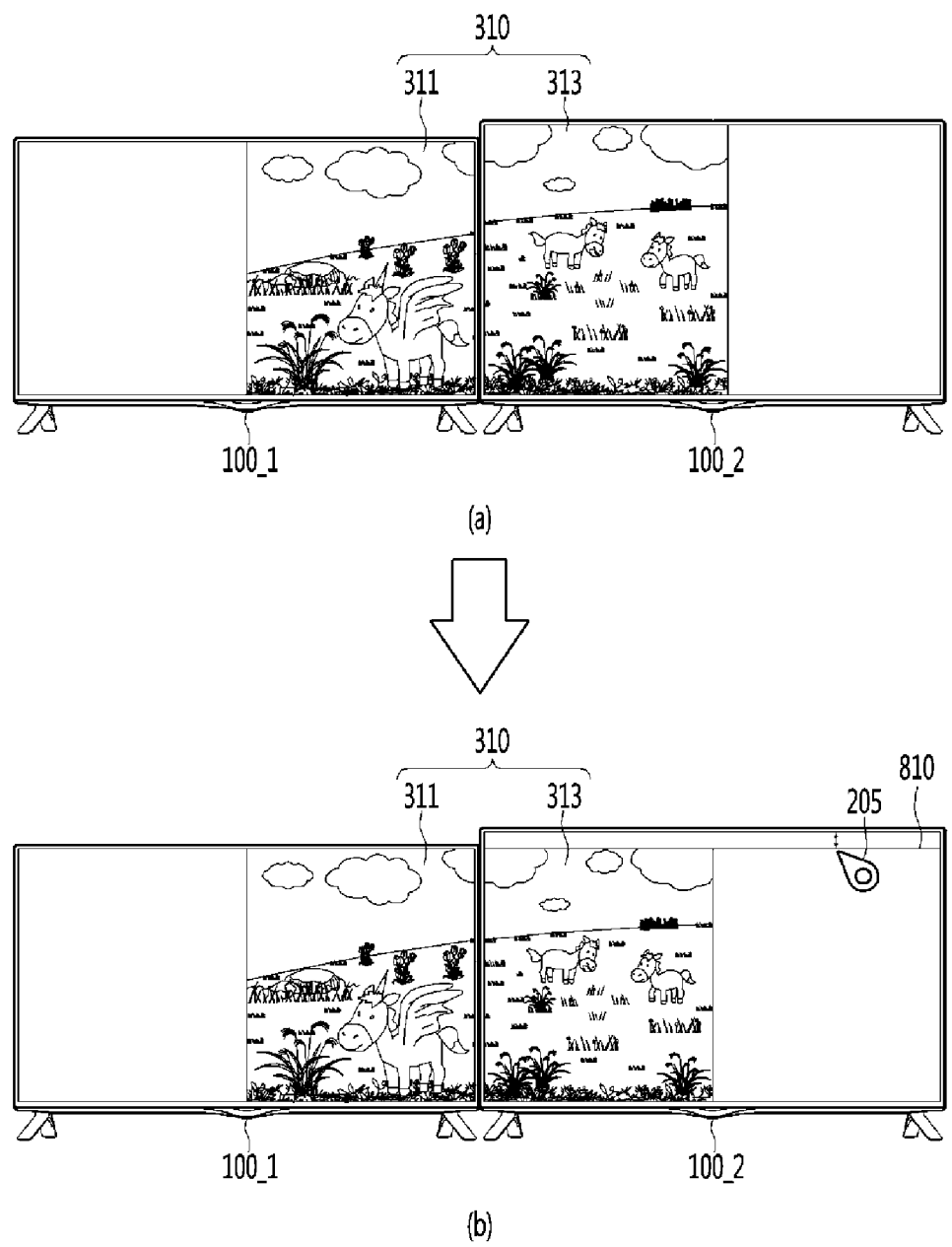

FIG. 23 is a diagram illustrating a process of performing a screen link when a size of a first display device is different from that of a second display device according to an embodiment of the present invention.

FIGS. 24 to 27 are diagrams illustrating various embodiments in which a voice is automatically adjusted and output according to a sound channel of each of display devices.

Figure 28:
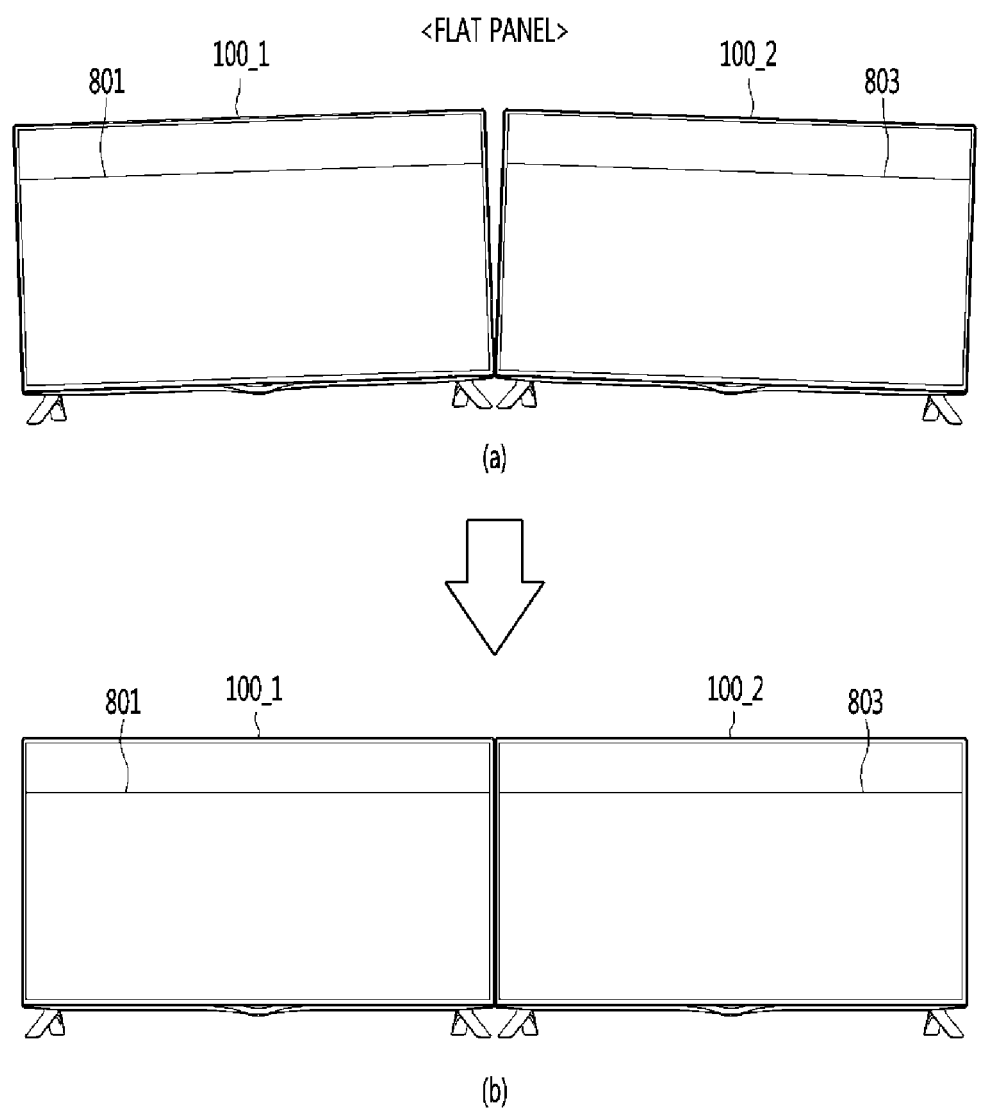
Figure 29:
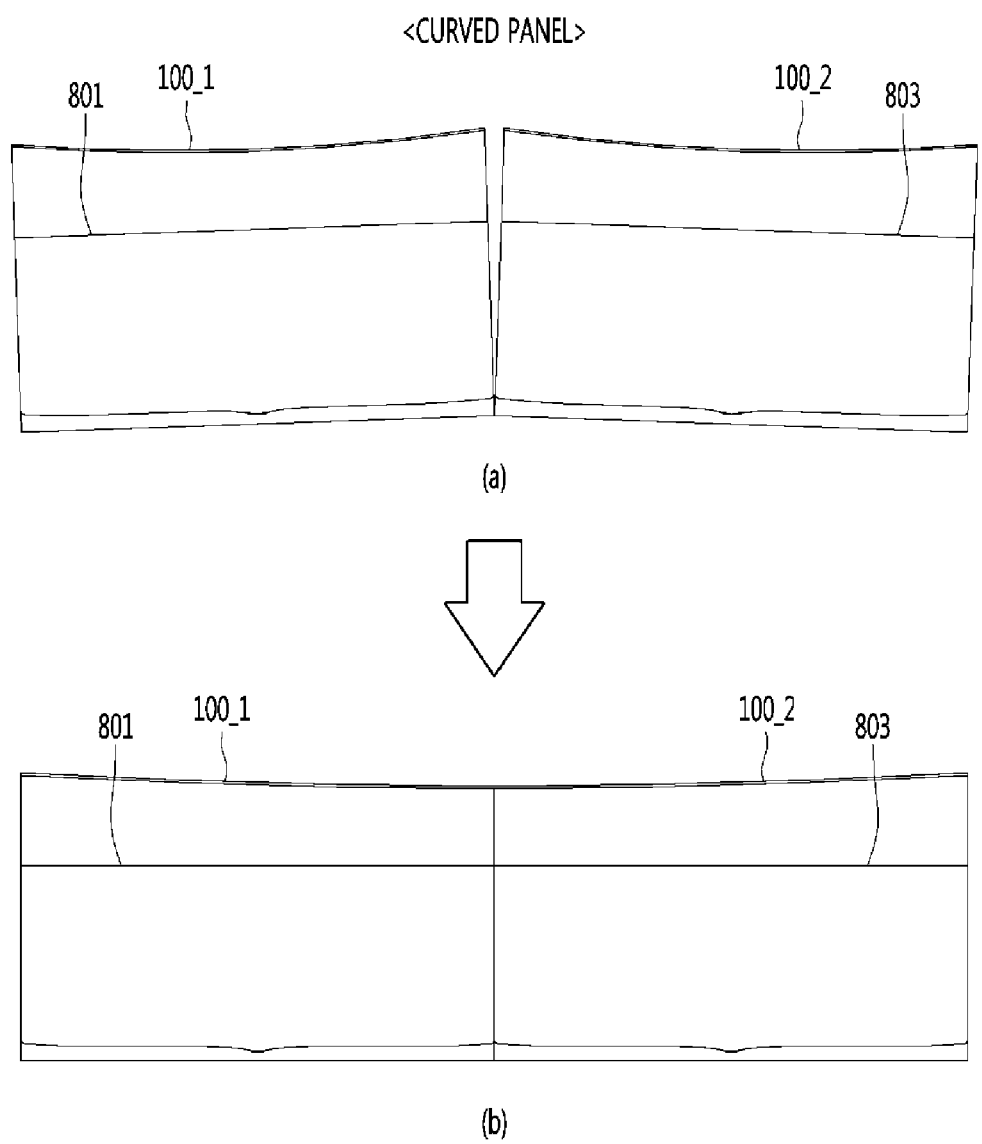

FIGS. 28 to 29 are diagrams illustrating embodiments in which, when a physical placement is distorted between a first display device and a second display device, a placement guideline is provided for guiding the alignment of the first display device and the second display device.

Figure 30:
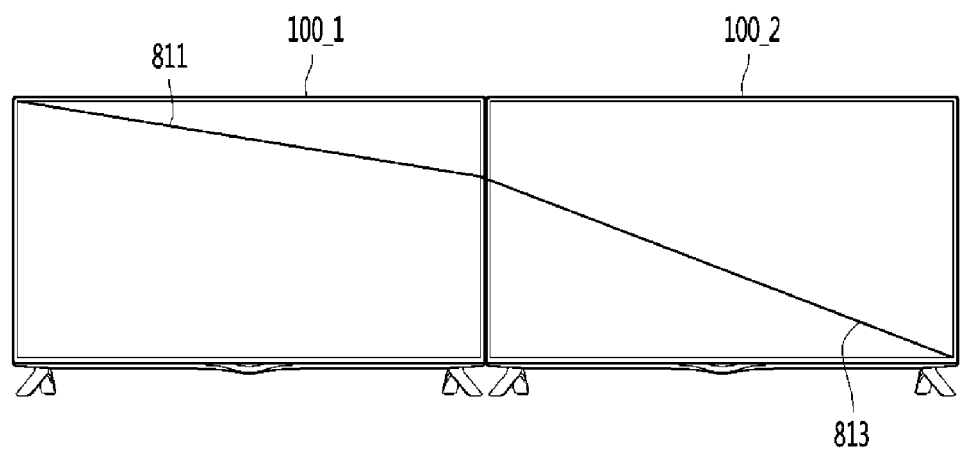

FIG. 30 illustrates screens on which diagonal guidelines are displayed according to an embodiment of the present invention.

Figure 31:
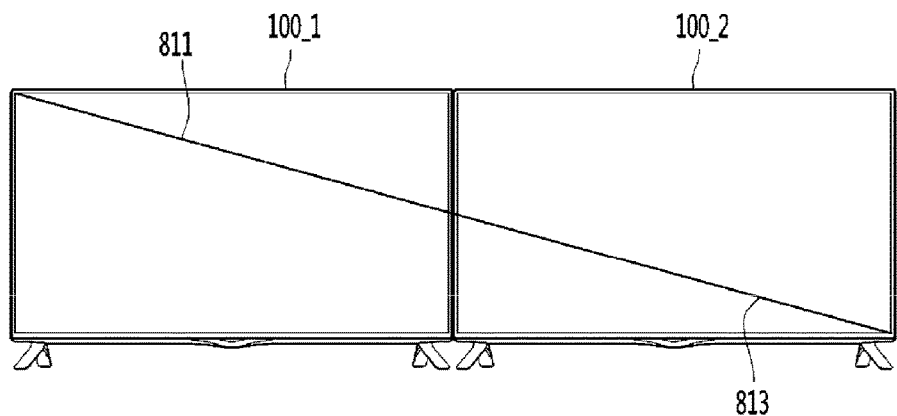
Figure 31:
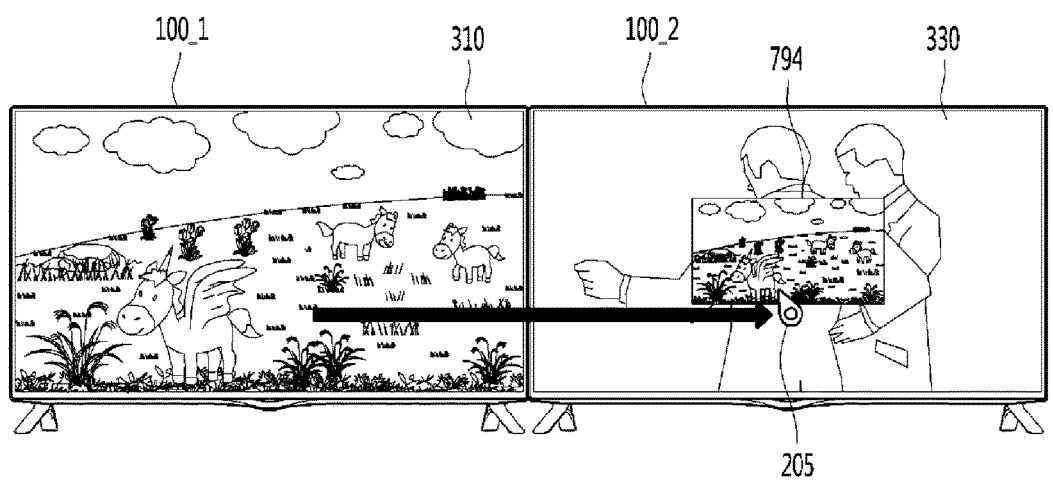

FIG. 31 illustrates screens on which diagonal guidelines are aligned according to an embodiment of the present invention.

Figure 32:
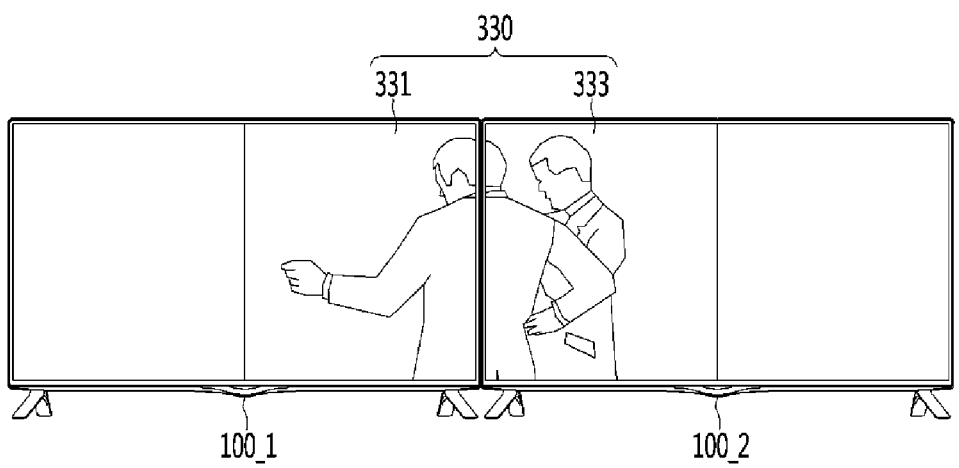

FIG. 32 illustrates a combined screen according to an embodiment of the present invention.

Figure 33:
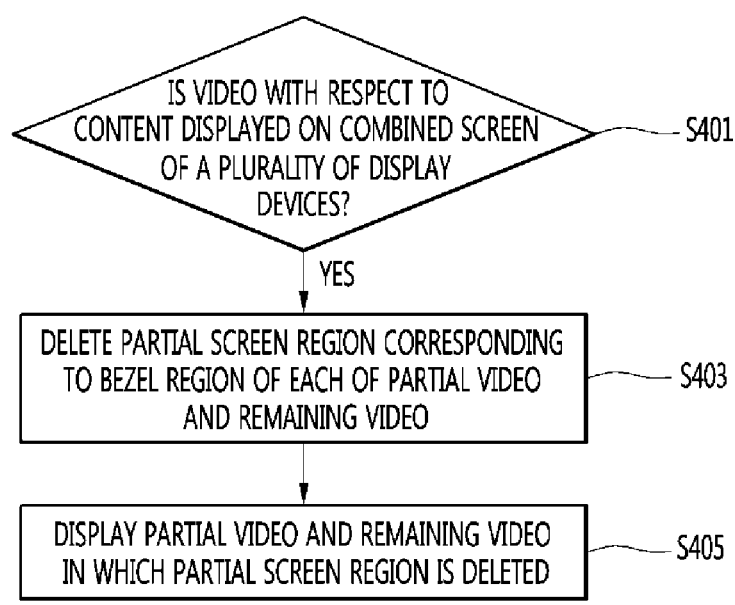

FIG. 33 is a flowchart of a video correction process of displaying a combined screen according to an embodiment of the present invention.

Figure 34:
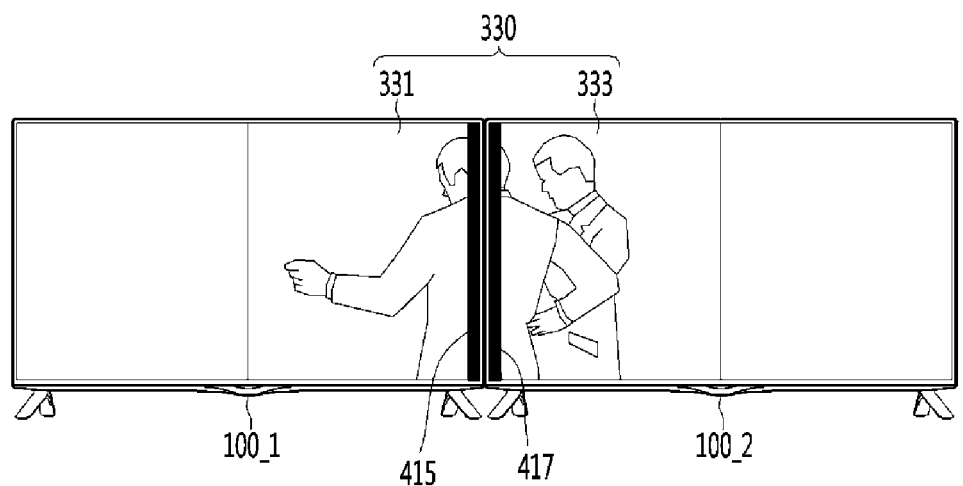

FIG. 34 illustrates partial screen regions corresponding to bezel regions according to an embodiment of the present invention.

Figure 35:
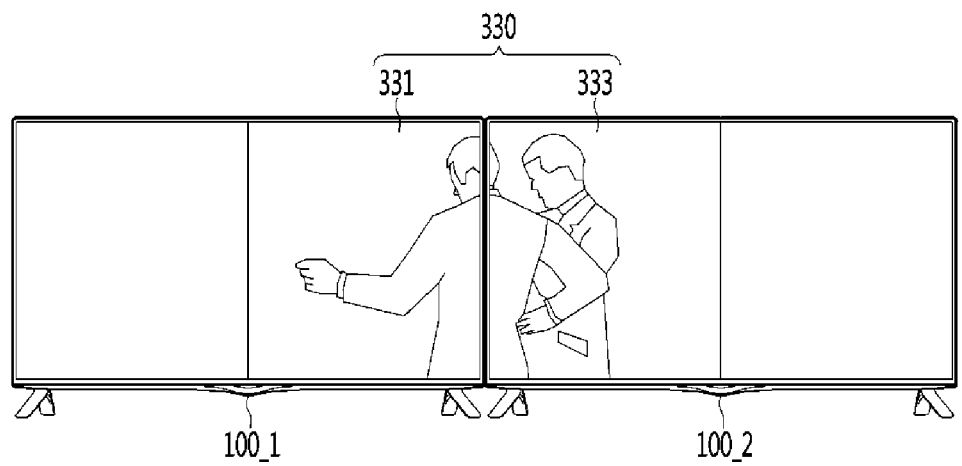

FIG. 35 illustrates a combined screen in which partial screen regions are deleted according to an embodiment of the present invention.

Figure 36:
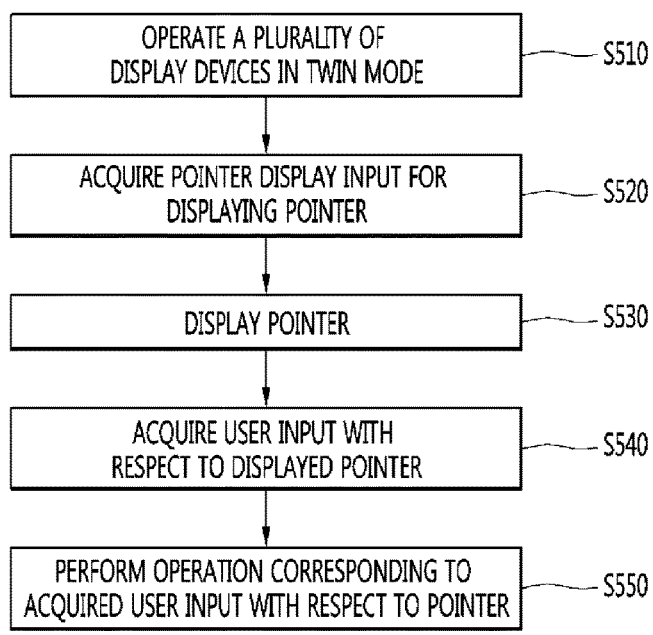

FIG. 36 is a flowchart illustrating an operating method of a display device according to a user input with respect to a pointer of the display device according to an embodiment of the present invention.

Figure 37A:
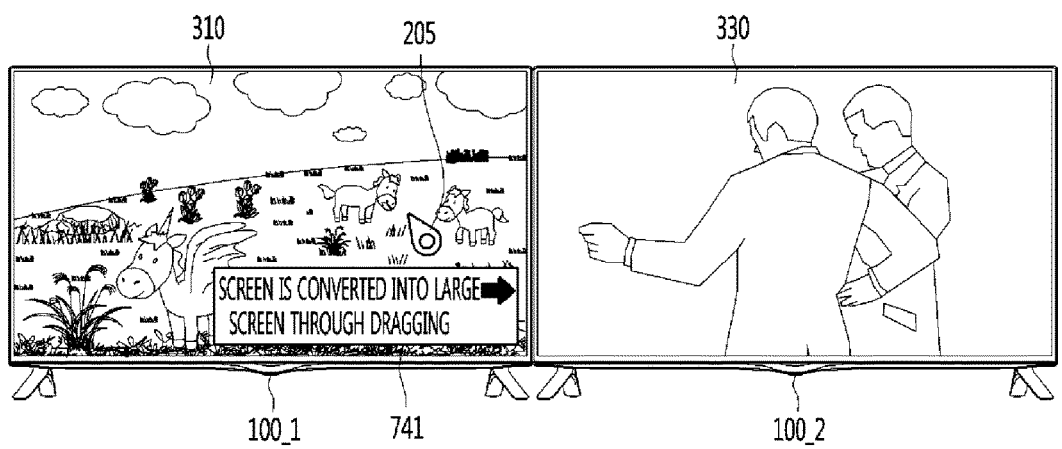

FIG. 37A illustrates a screen displaying guide information on a combined screen display according to an embodiment of the present invention.

Figure 37B:
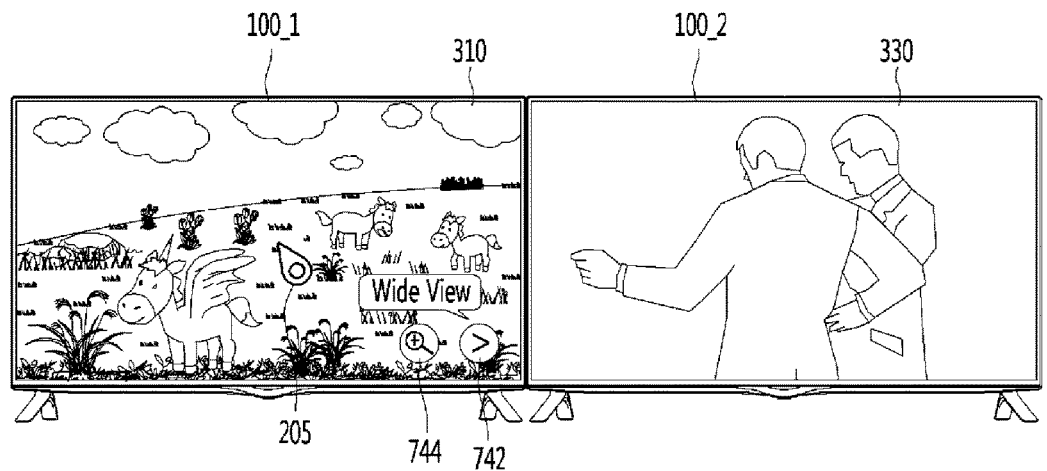

FIG. 37B is an illustrative diagram of a combined screen icon display according to an embodiment of the present invention.

Figure 37C:
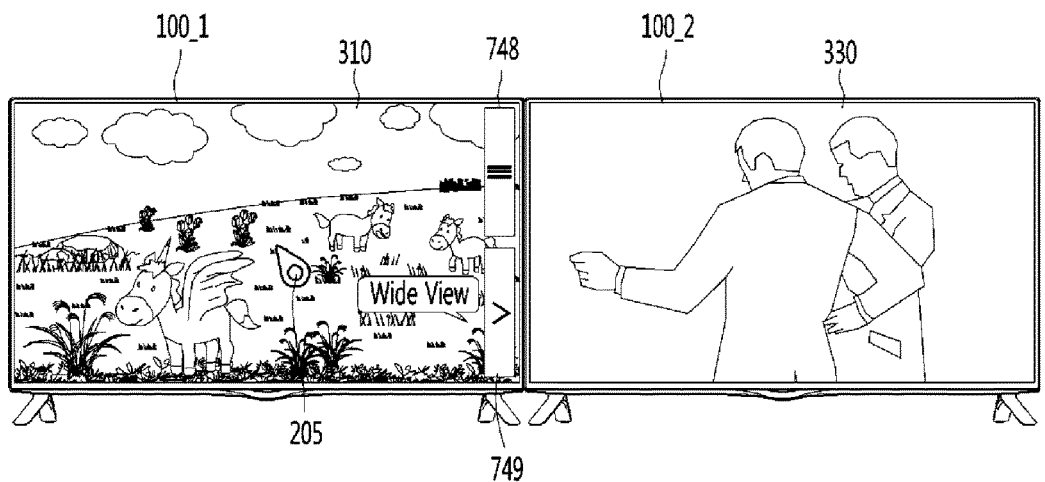

FIG. 37C is an illustrative diagram of a combined screen icon display according to another embodiment of the present invention.

Figure 37D:
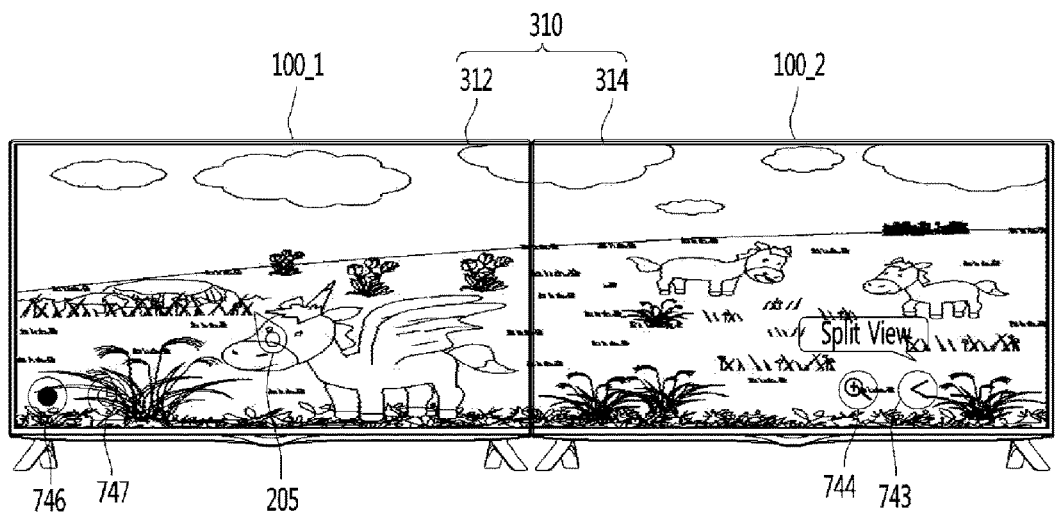

FIG. 37D is an illustrative diagram of a split screen icon display according to an embodiment of the present invention.

Figure 38:
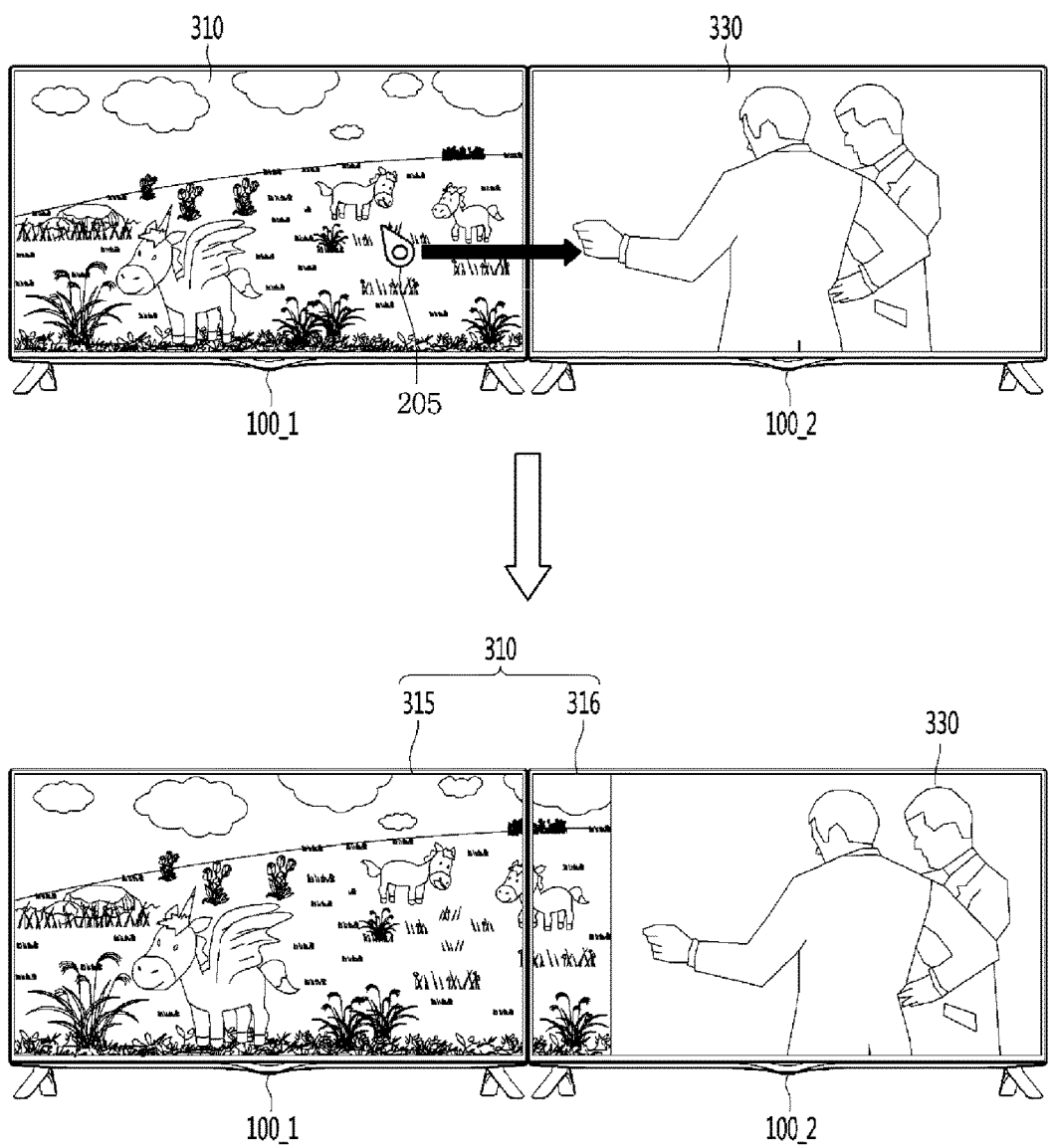

FIG. 38 is an illustrative diagram of a screen size adjustment operation according to an embodiment of the present invention.

Figure 39:
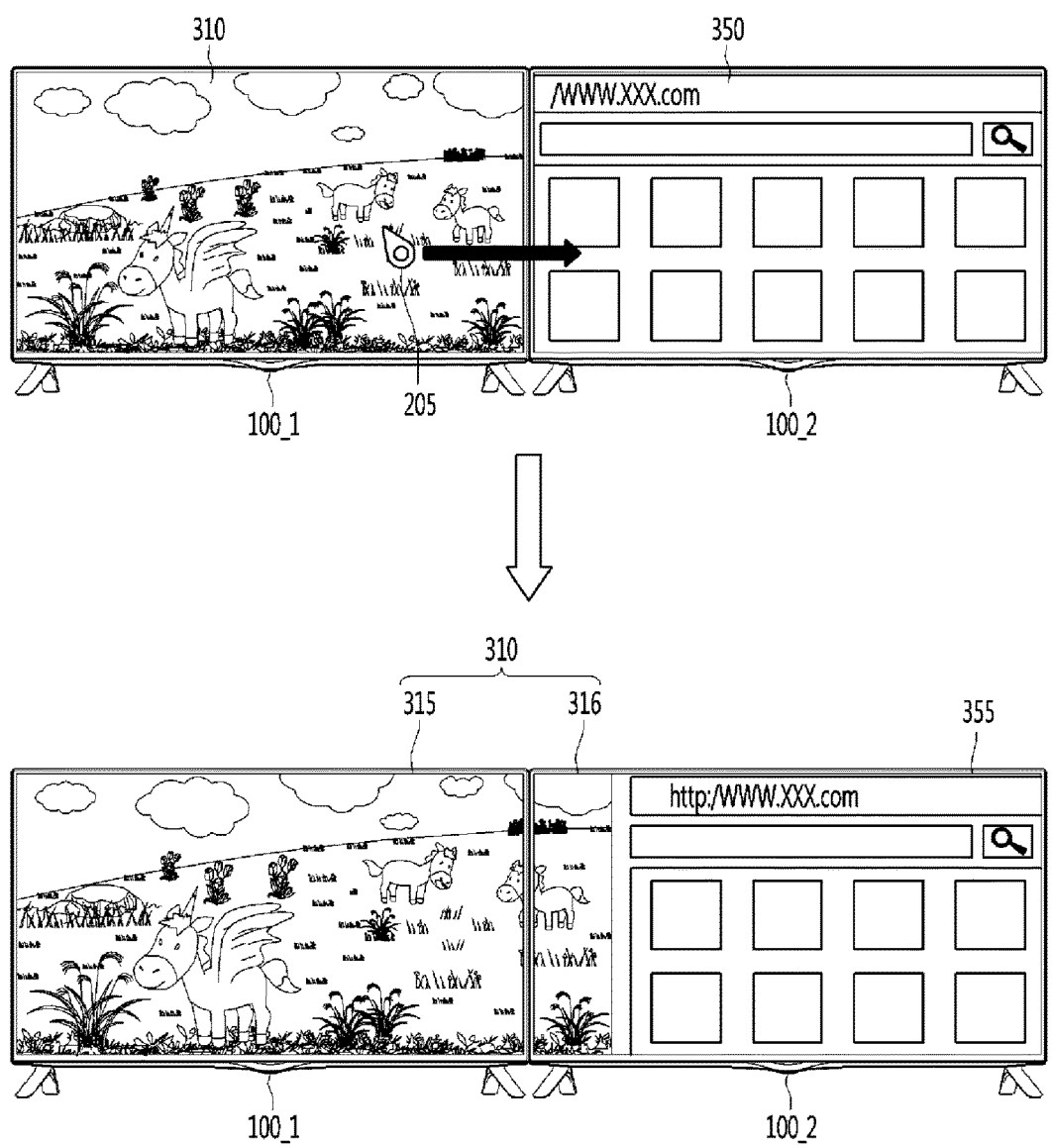

FIG. 39 is an illustrative diagram of a screen size adjustment operation according to another embodiment of the present invention.

Figure 40A:
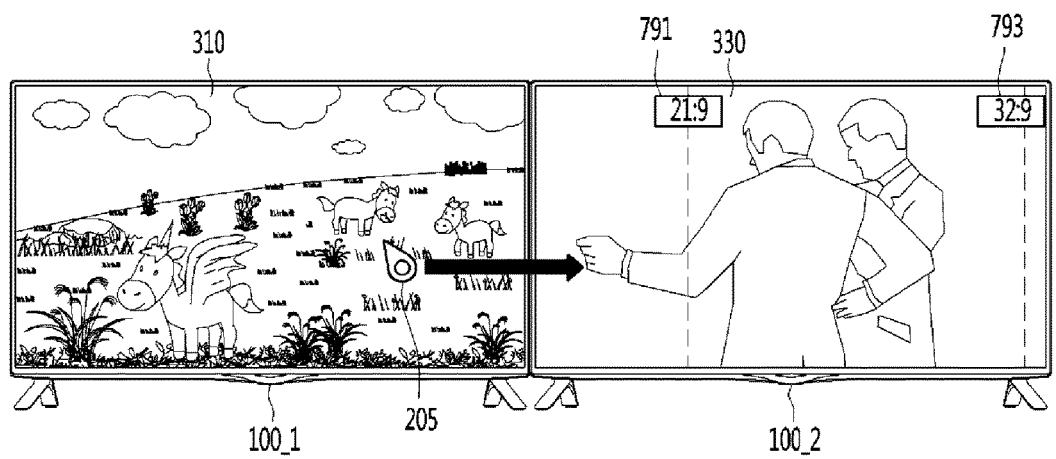

FIG. 40A illustrates a reference line indicating an aspect ratio to be adjusted according to an embodiment of the present invention.

Figure 40B:
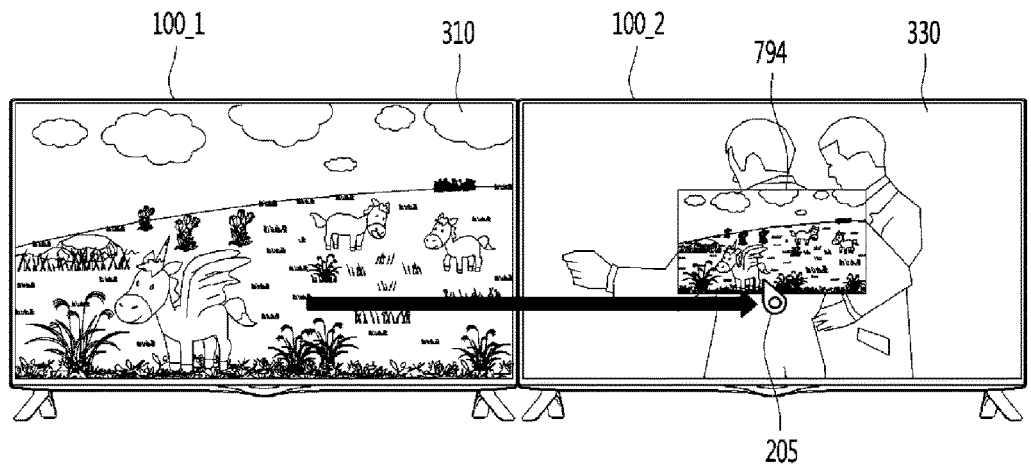

FIG. 40B illustrates a thumbnail image indicating a preview video which corresponds to an aspect ratio to be adjusted according to an embodiment of the present invention.

Figure 41:
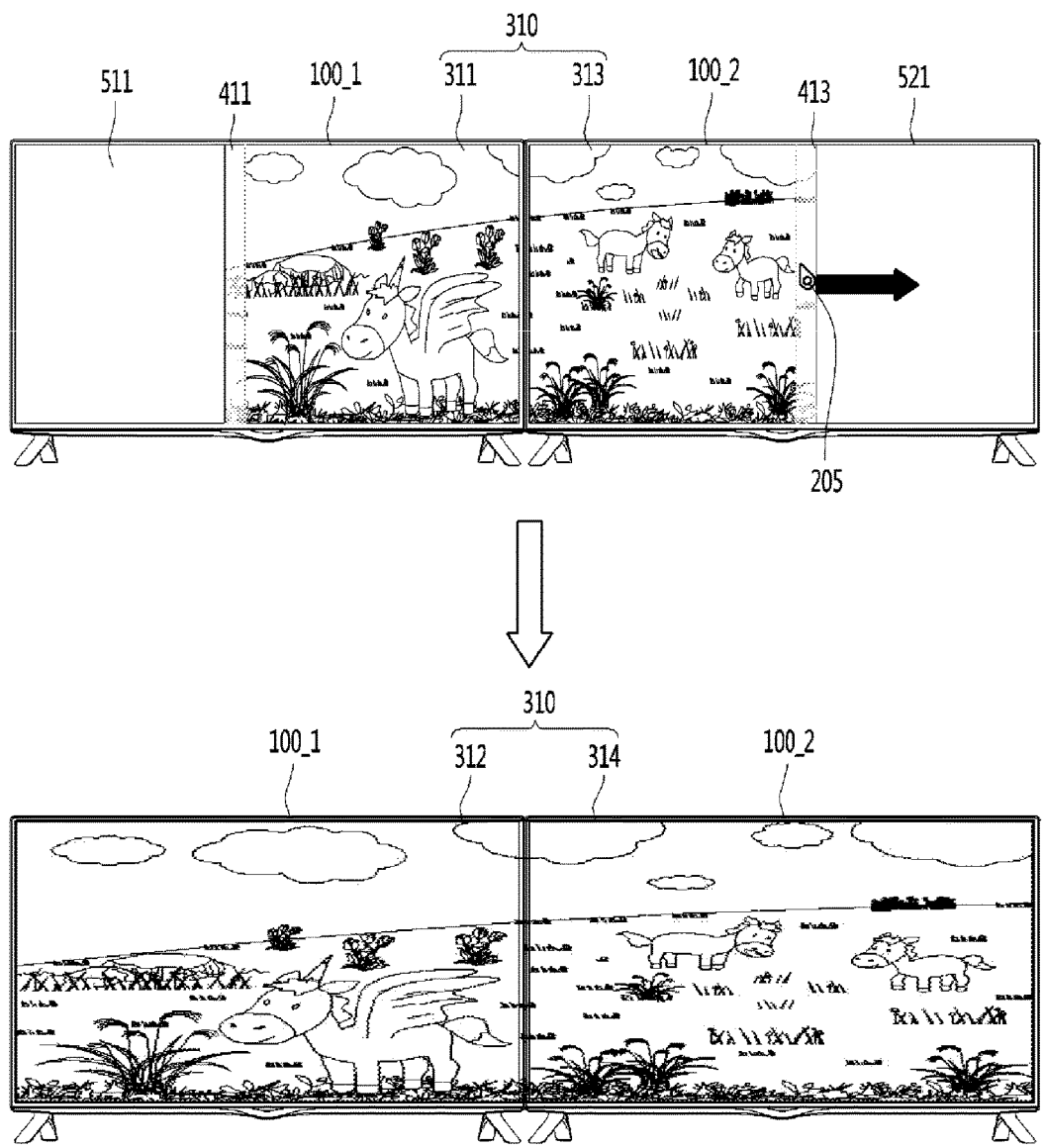

FIG. 41 is an illustrative diagram of a size adjustment operation of a combined screen according to an embodiment of the present invention.

Figure 42:
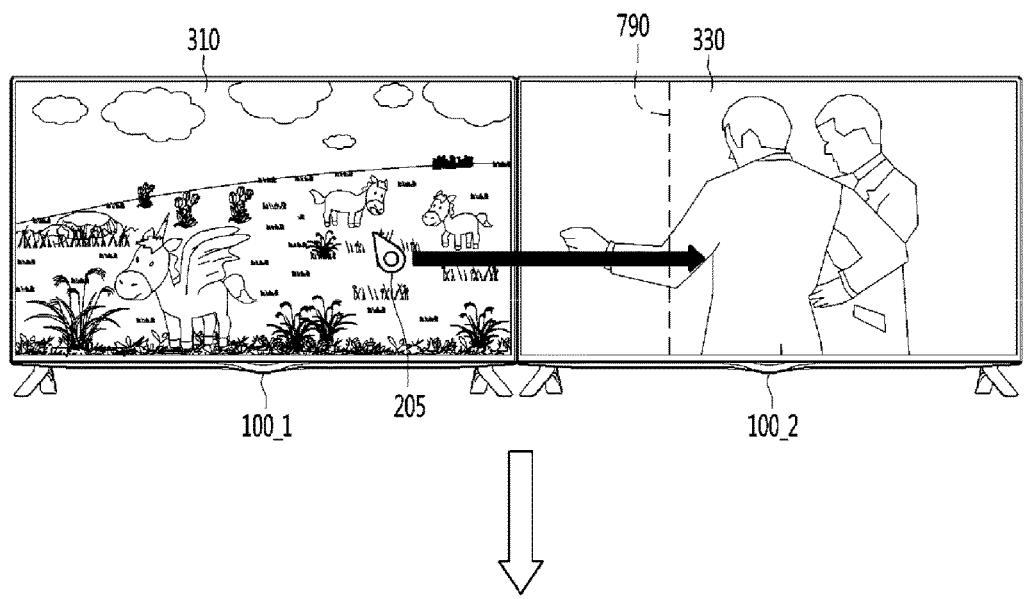
Figure 42:
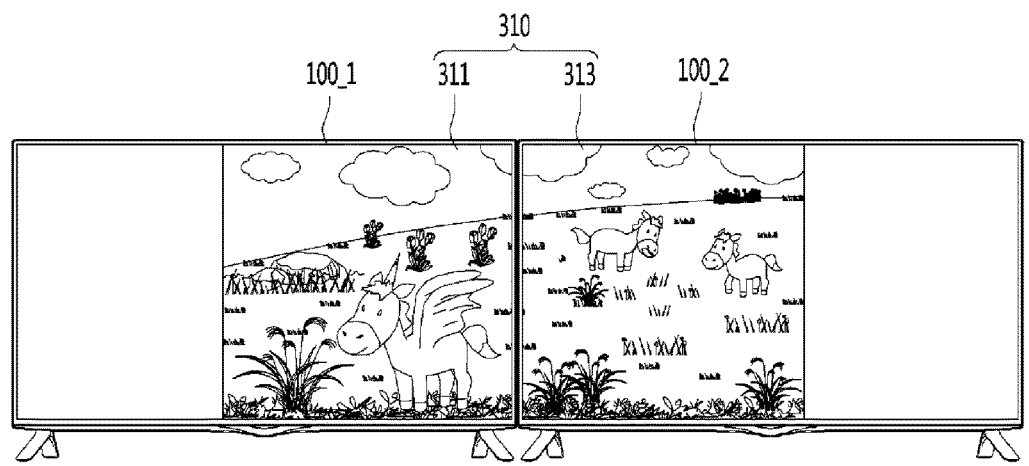

FIG. 42 is an illustrative diagram of a combined screen display operation according to an embodiment of the present invention.

Figure 43:
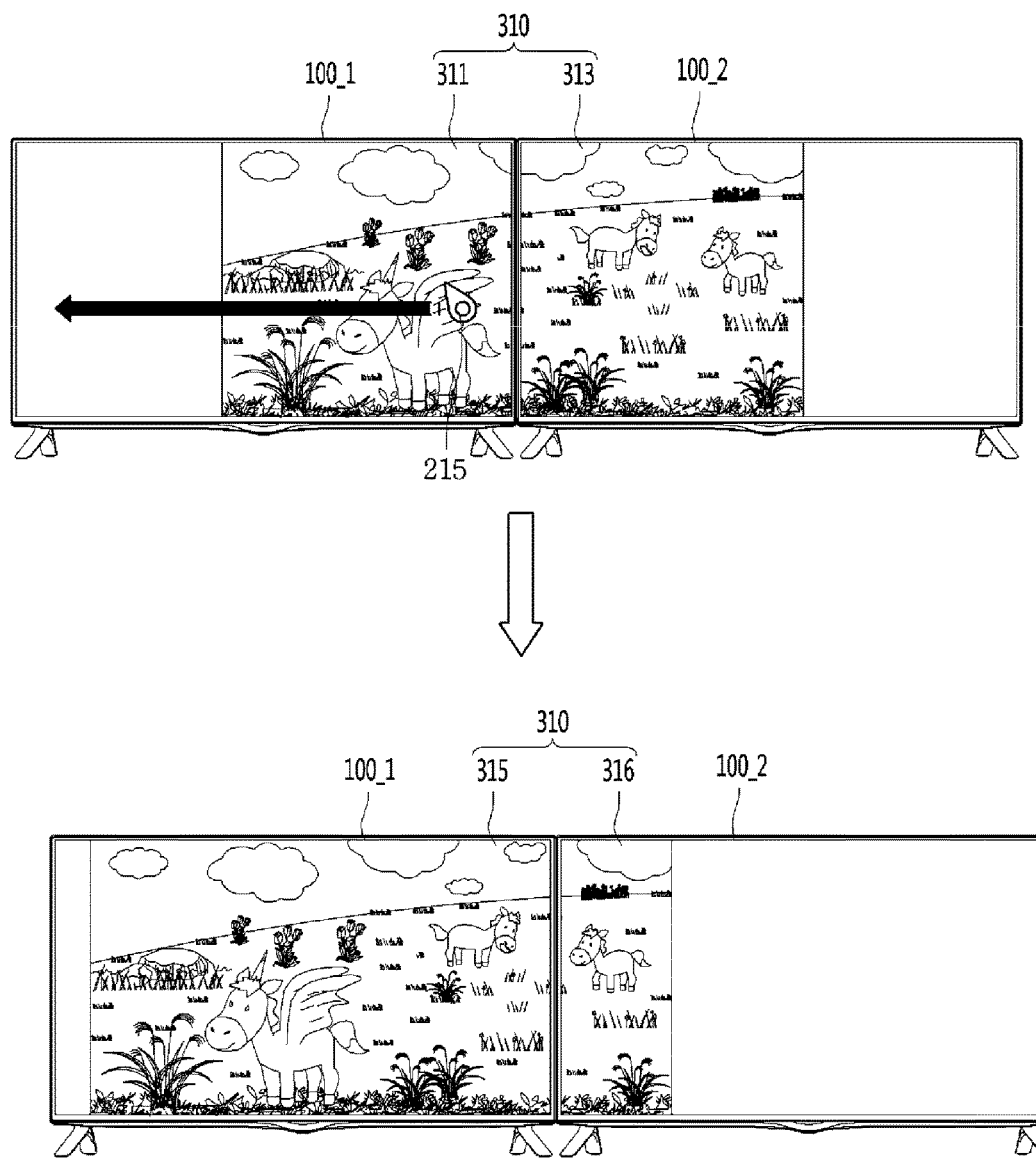

FIG. 43 is an illustrative diagram of a combined screen movement operation according to an embodiment of the present invention.

Figure 44:
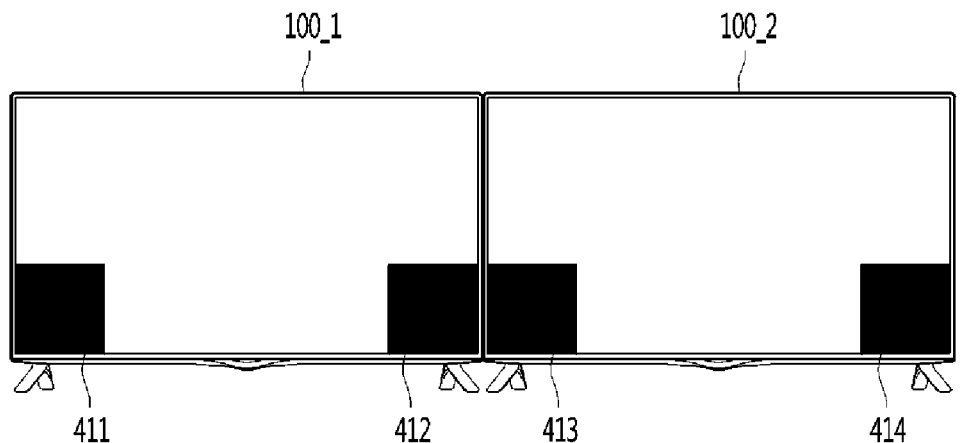

FIG. 44 illustrates a speaker volume adjustment region corresponding to a position of a pointer according to an embodiment of the present invention.

Figure 45:
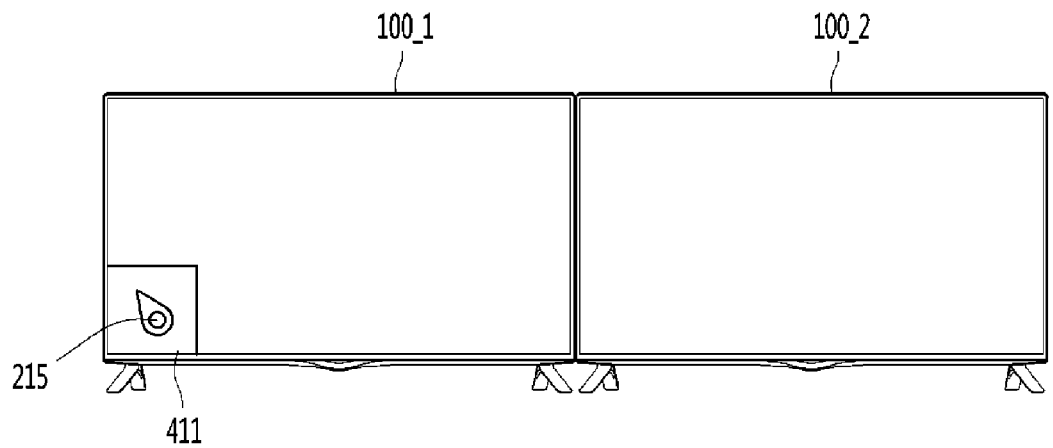
Figure 45:
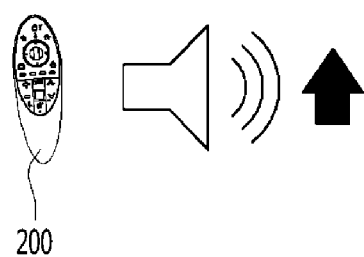

FIG. 45 illustrates a volume adjustment input with respect to a first left speaker according to an embodiment of the present invention.

Figure 46:
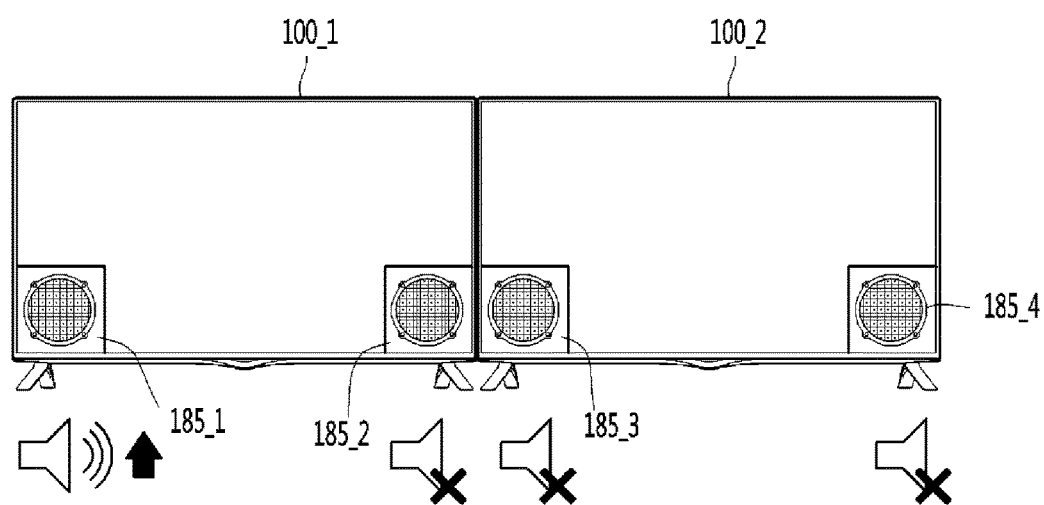

FIG. 46 illustrates a volume adjustment operation with respect to a first left speaker according to an embodiment of the present invention.

Figure 47:
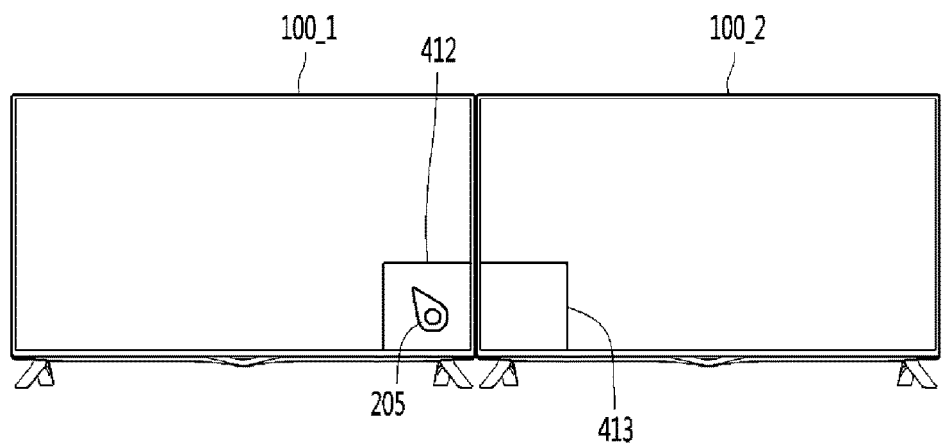
Figure 47:
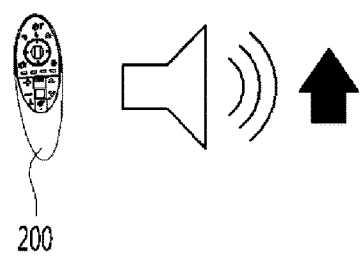

FIG. 47 illustrates a volume adjustment input with respect to a first right speaker and a second left speaker according to an embodiment of the present invention.

Figure 48:
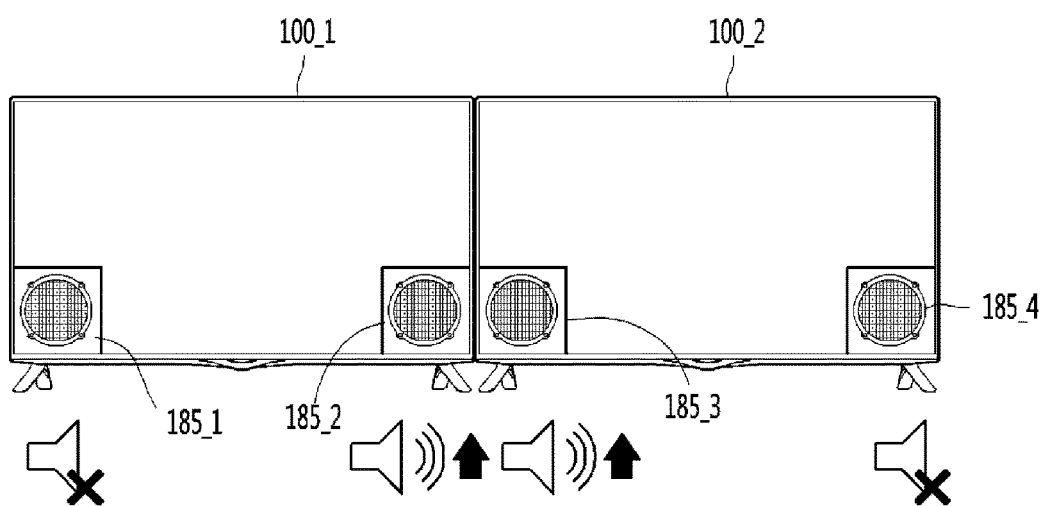

FIG. 48 illustrates a volume adjustment operation with respect to a first right speaker and a second left speaker according to an embodiment of the present invention.

Figure 49:
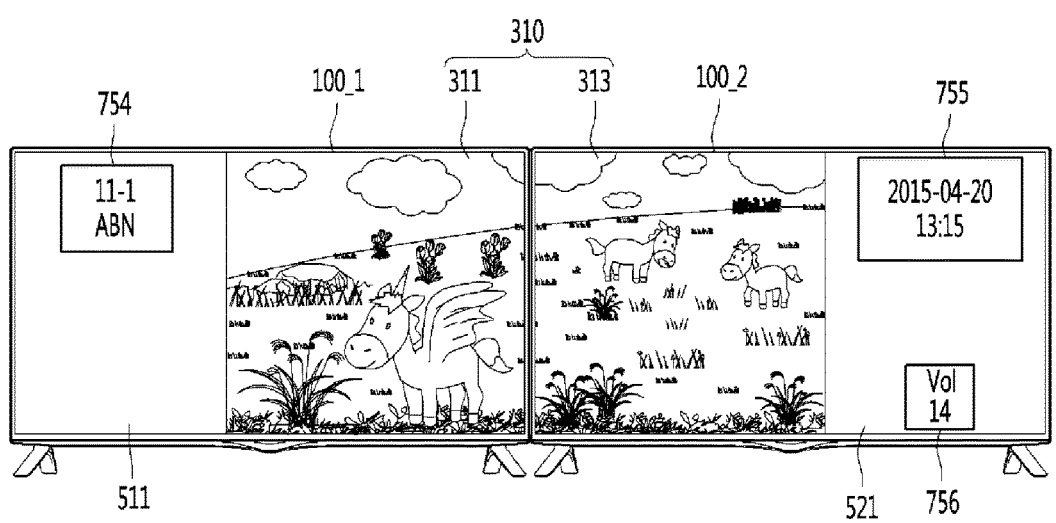

FIG. 49 illustrates a screen on which an infobox is displayed according to an embodiment of the present invention.

Figure 50:
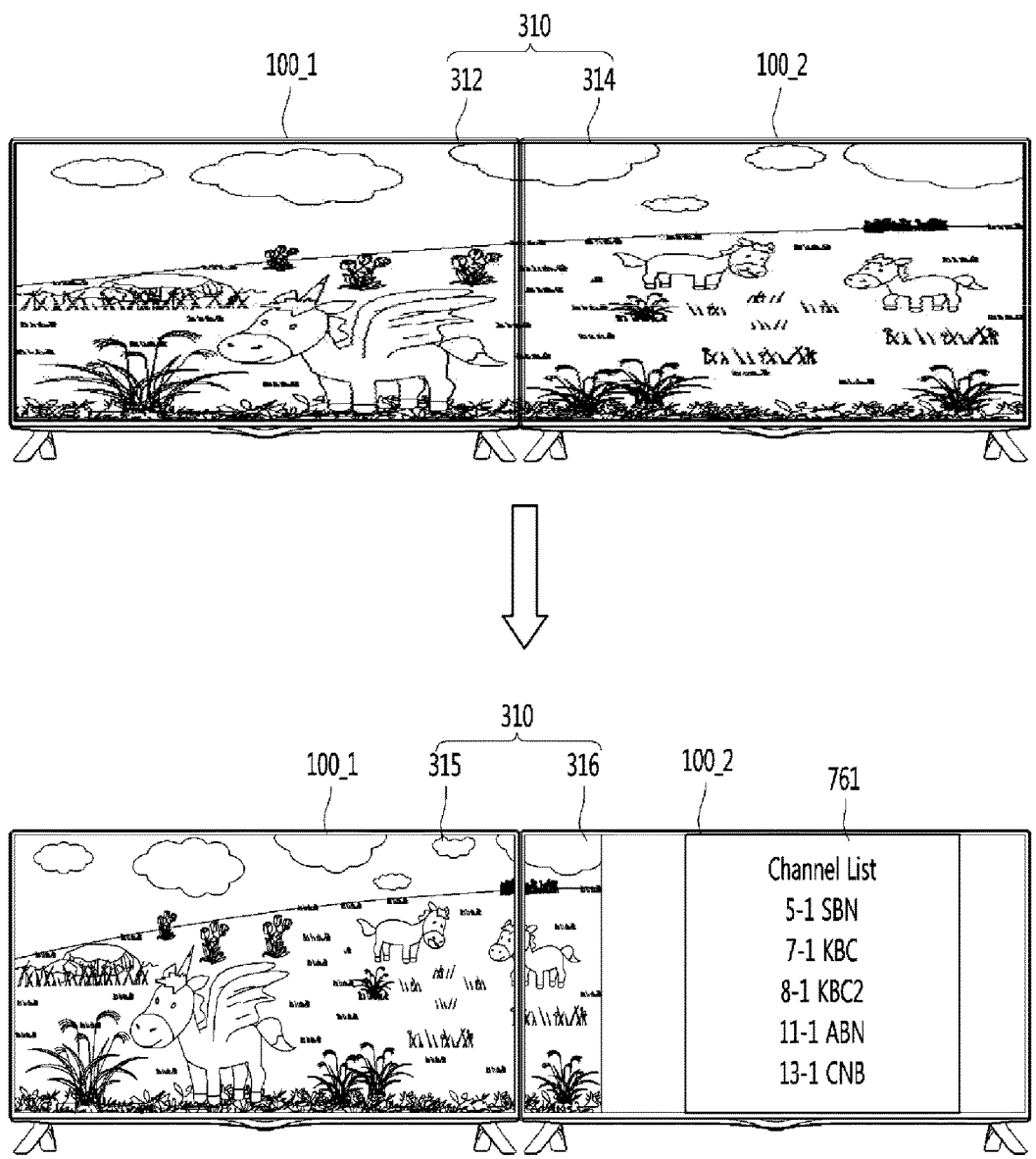

FIG. 50 illustrates a channel list display operation according to an embodiment of the present invention.

Figure 51:
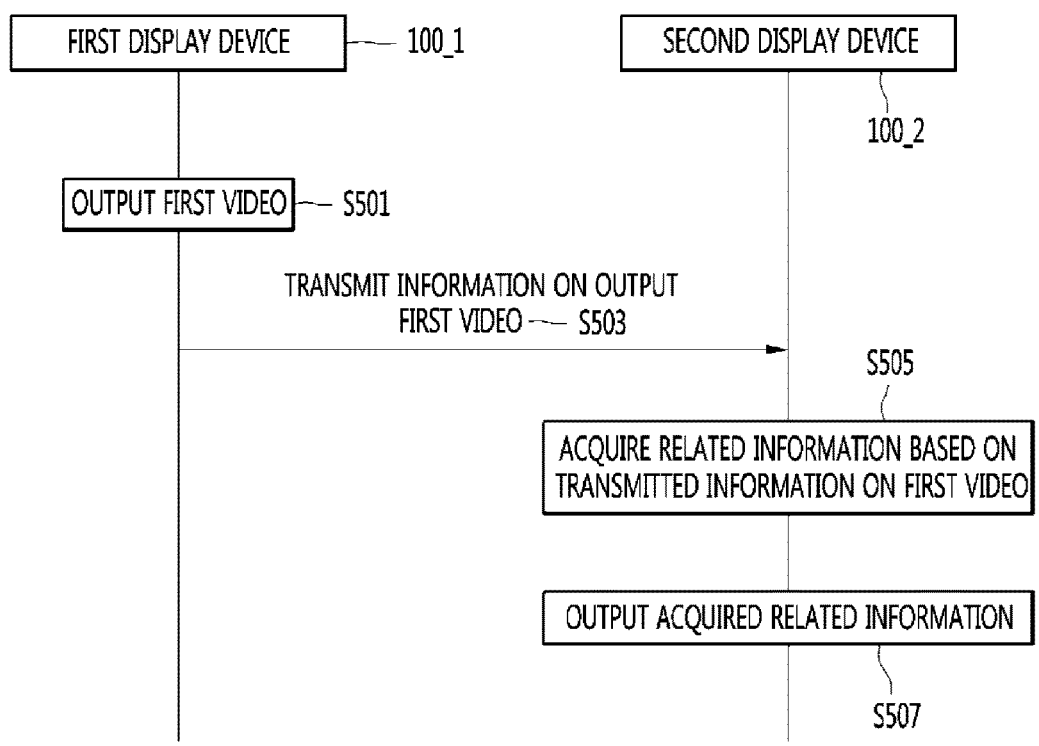

FIG. 51 is a flowchart of a process of displaying related information according to an embodiment of the present invention.

Figure 52:
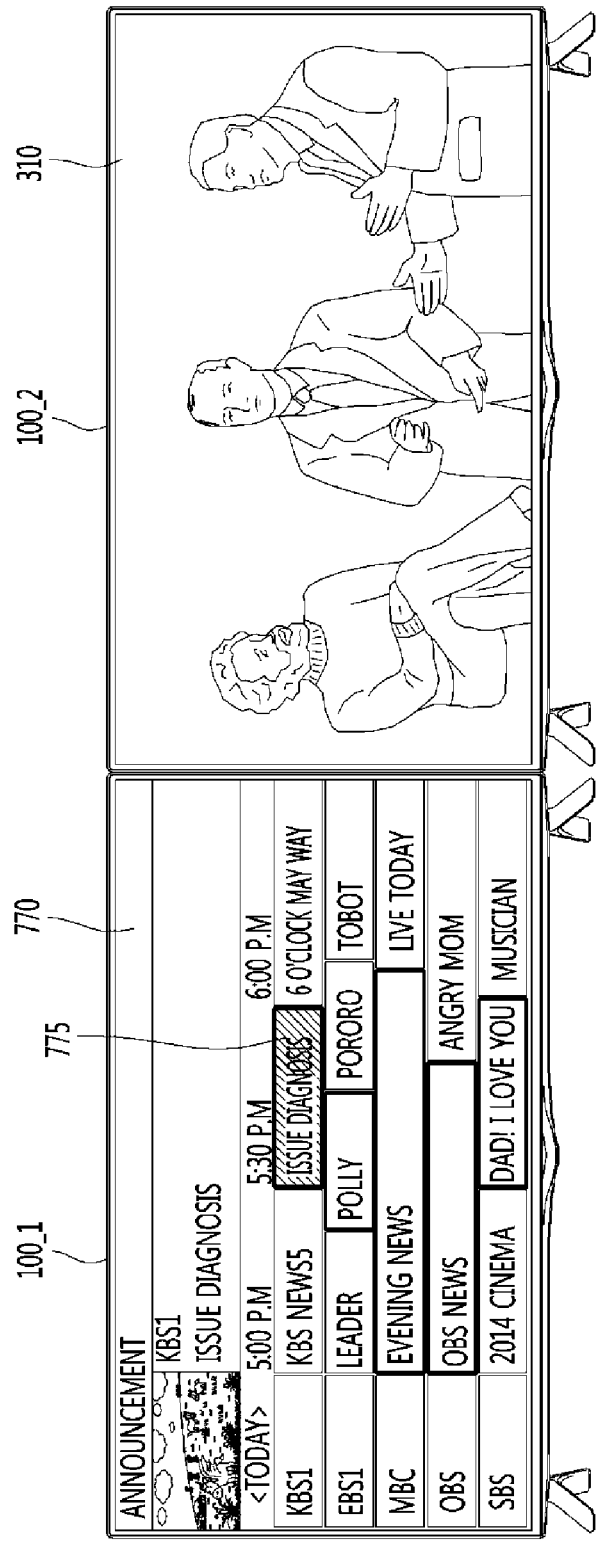

FIG. 52 is an illustrative diagram of an electronic program guide (EPG) display according to an embodiment of the present invention.

Figure 53:
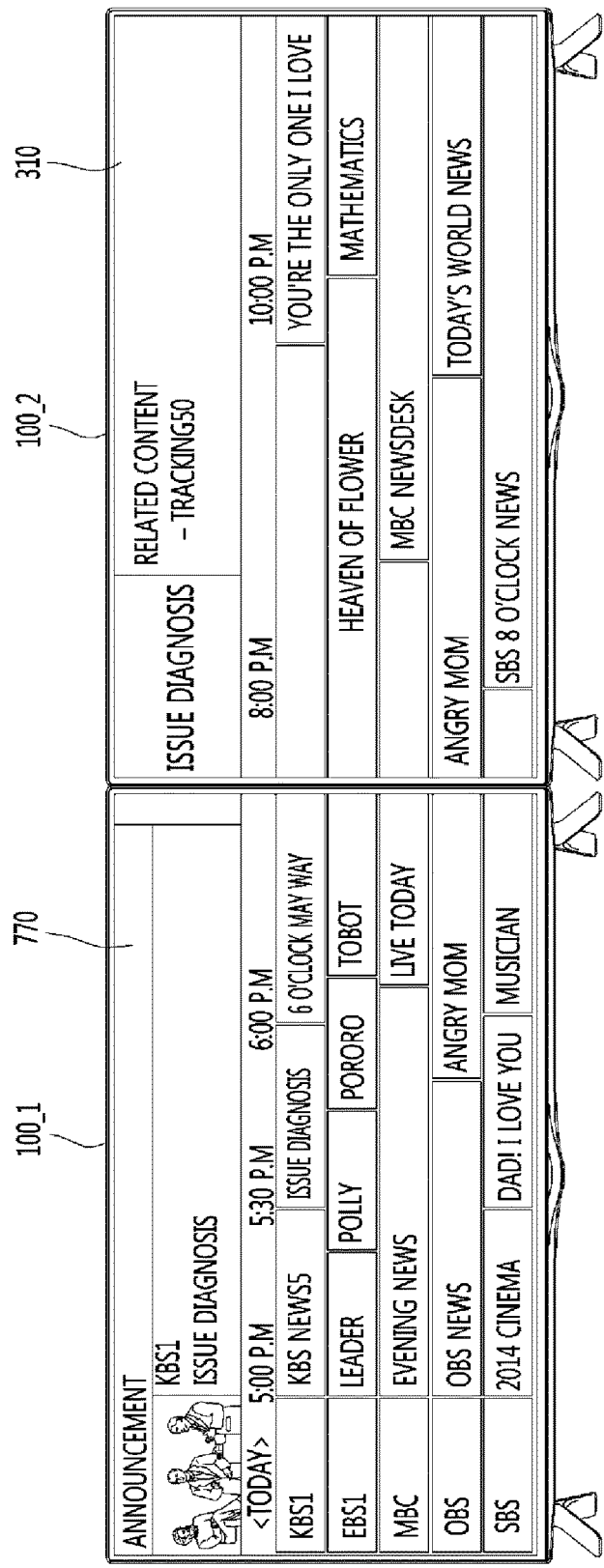

FIG. 53 illustrates a combined screen displaying an EPG according to an embodiment of the present invention.

Figure 54A:
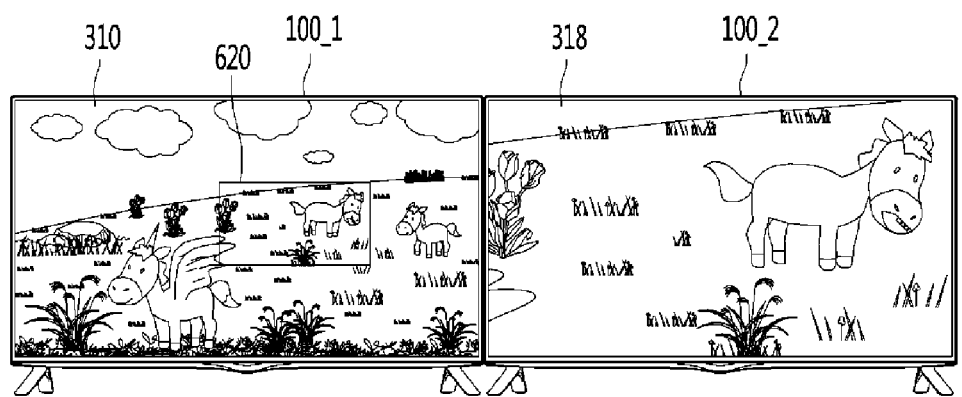

FIG. 54A illustrates a magnified video display according to an embodiment of the present invention.

Figure 54B:
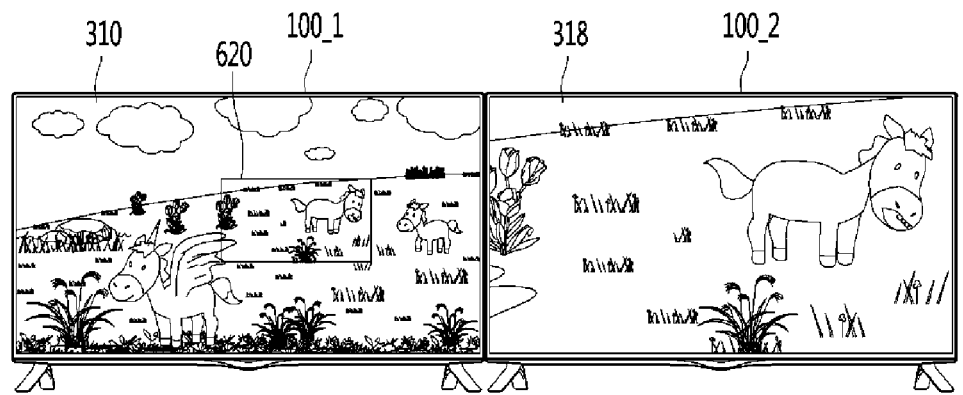
Figure 54B:
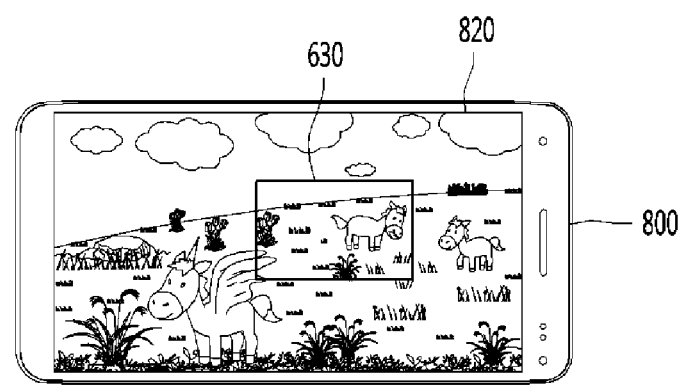

FIG. 54B is an illustrative diagram illustrating a magnified region selection through a terminal according to an embodiment of the present invention.

Figure 54C:
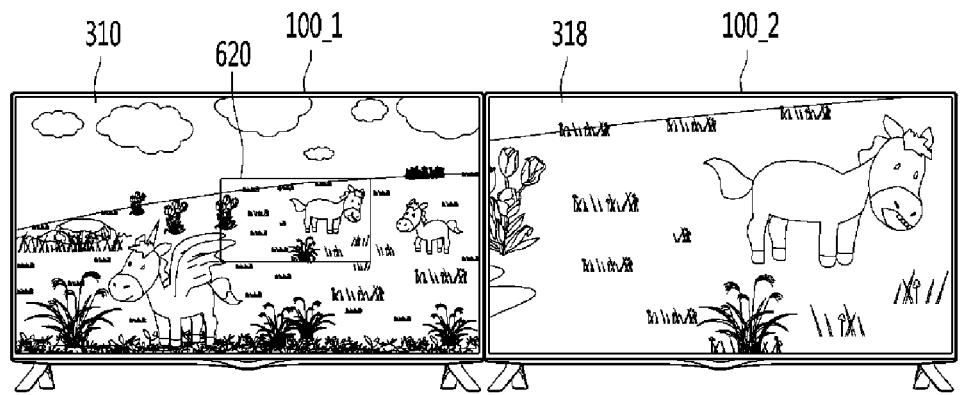
Figure 54C:
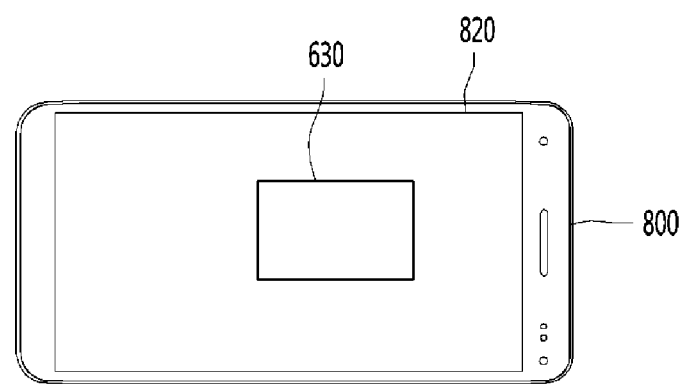

FIG. 54C is an illustrative diagram illustrating a magnified region selection through a terminal according to another embodiment of the present invention.

Figure 55:
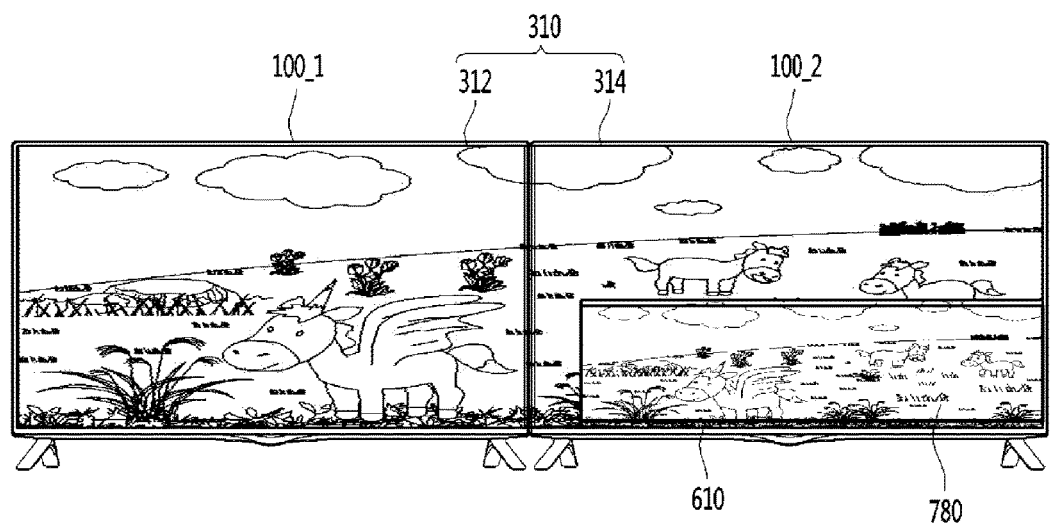

FIG. 55 is an illustrative diagram of an output video selection according to an embodiment of the present invention.

Figure 56:
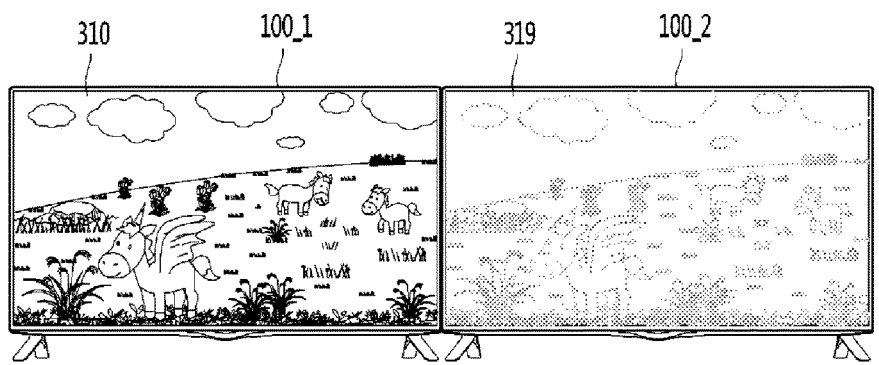

FIG. 56 is an illustrative diagram of a screen setup according to an embodiment of the present invention.

Figure 57:
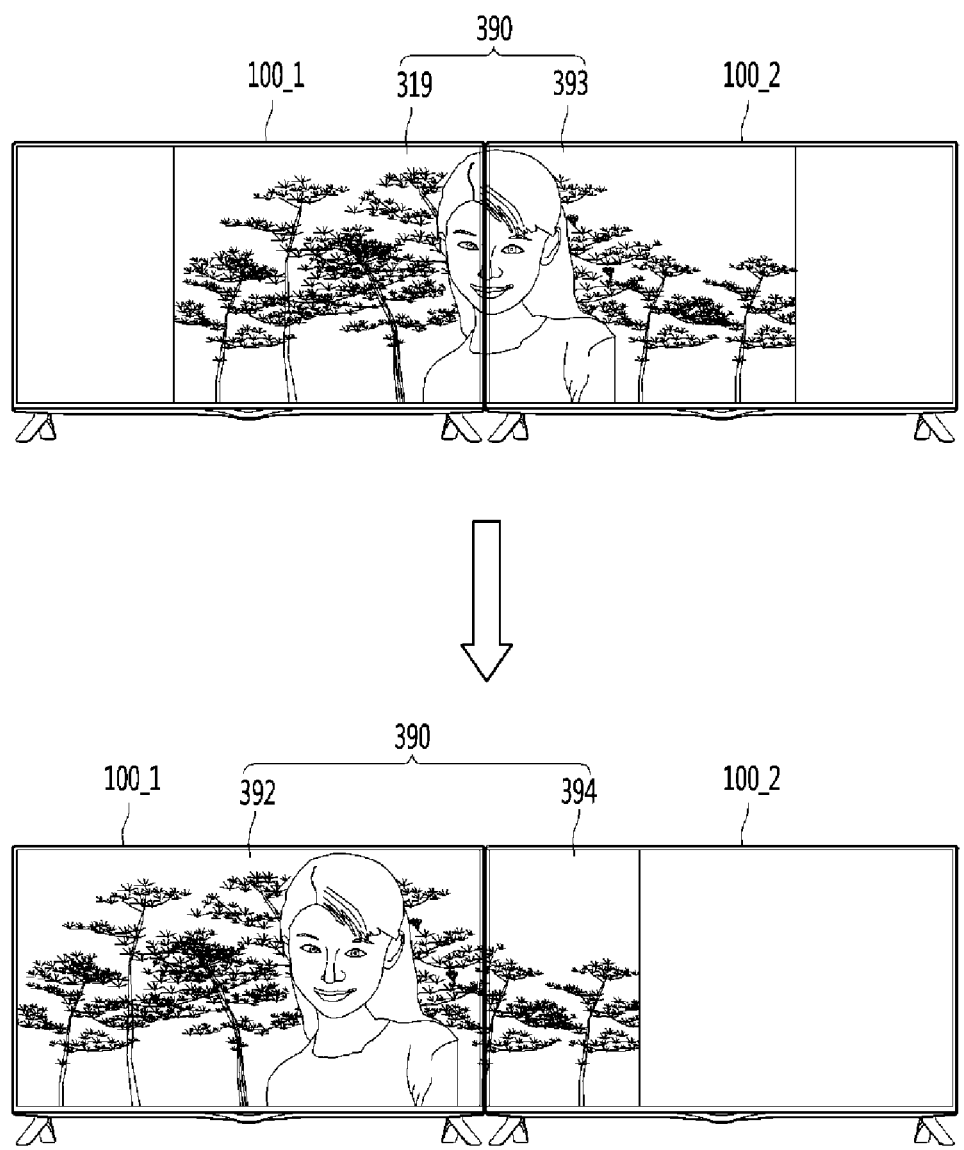

FIG. 57 is an illustrative diagram of a movement of an image displayed on a combined screen according to an embodiment of the present invention.

Figure 58:
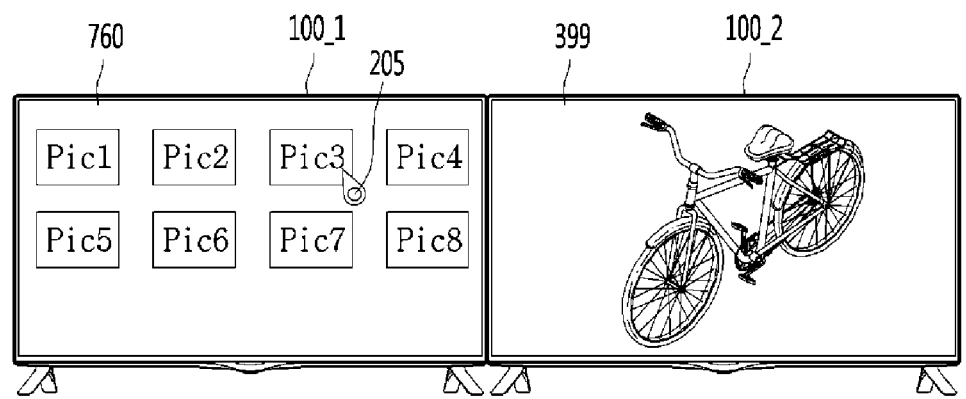
Figure 58:
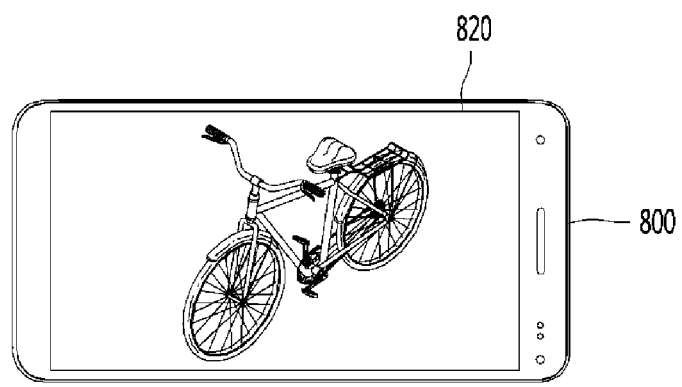

FIG. 58 is an illustrative diagram of an image display screen according to an embodiment of the present invention.

Figure 59:
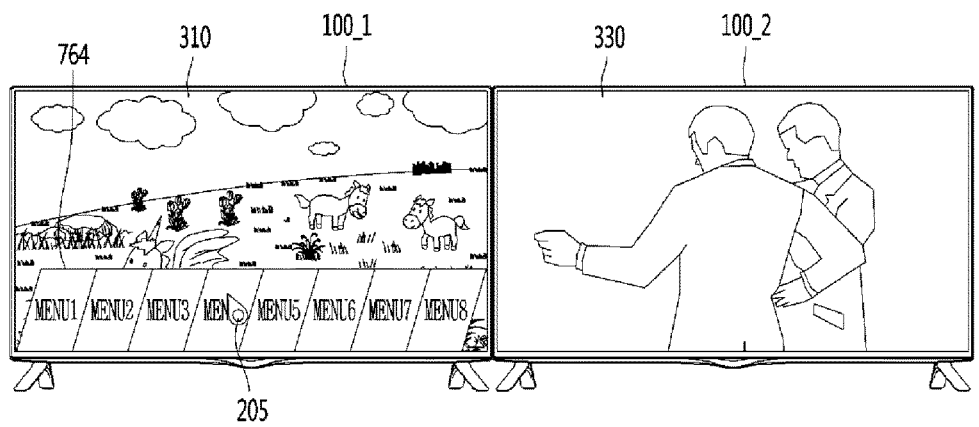

FIG. 59 is an illustrative diagram of a menu screen according to an embodiment of the present invention.

Figure 60:
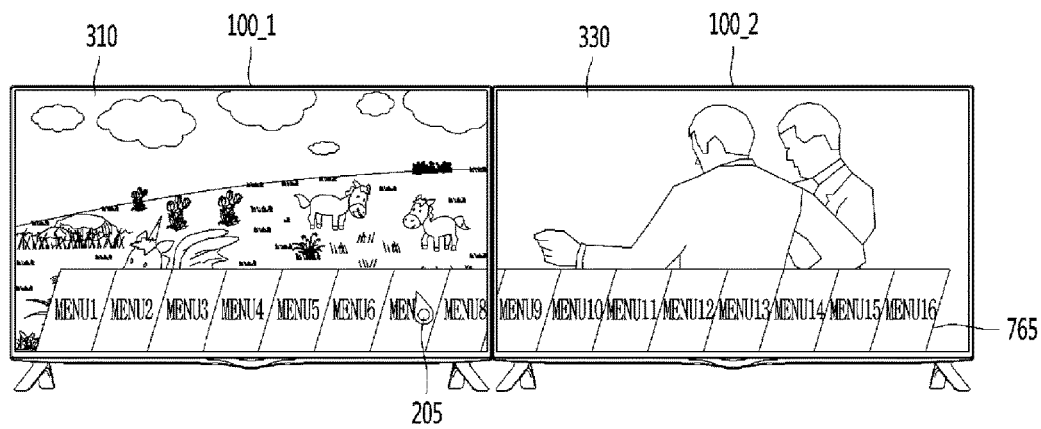

FIG. 60 is an illustrative diagram of a menu screen according to another embodiment of the present invention.

Figure 61:
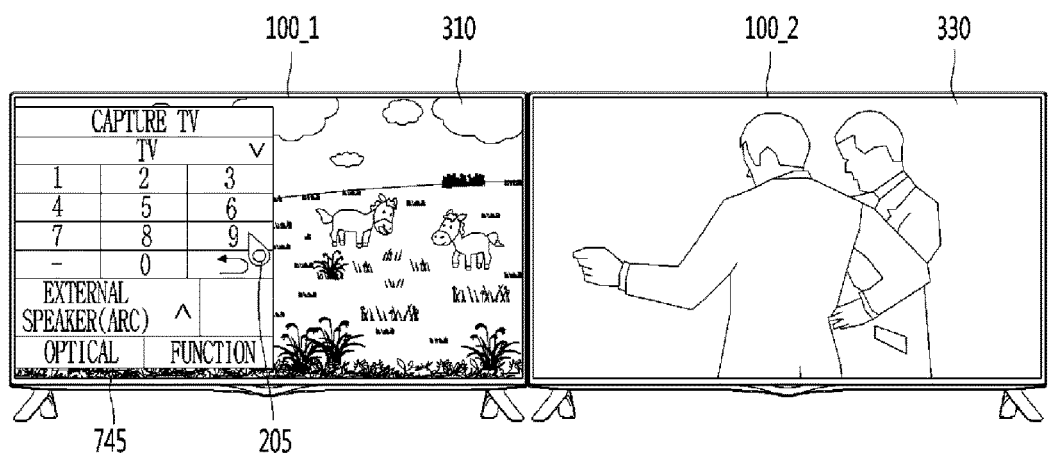

FIG. 61 illustrates an input key display screen according to an embodiment of the present invention.

Figure 62:
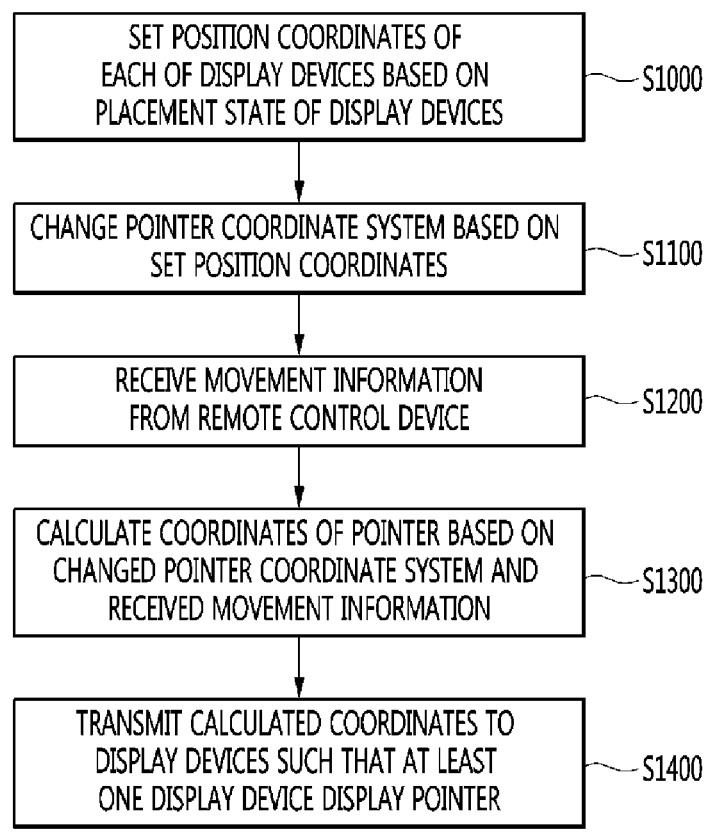

FIG. 62 is a flowchart showing a process of displaying a pointer of a display device according to an embodiment of the present invention.

Figure 63:
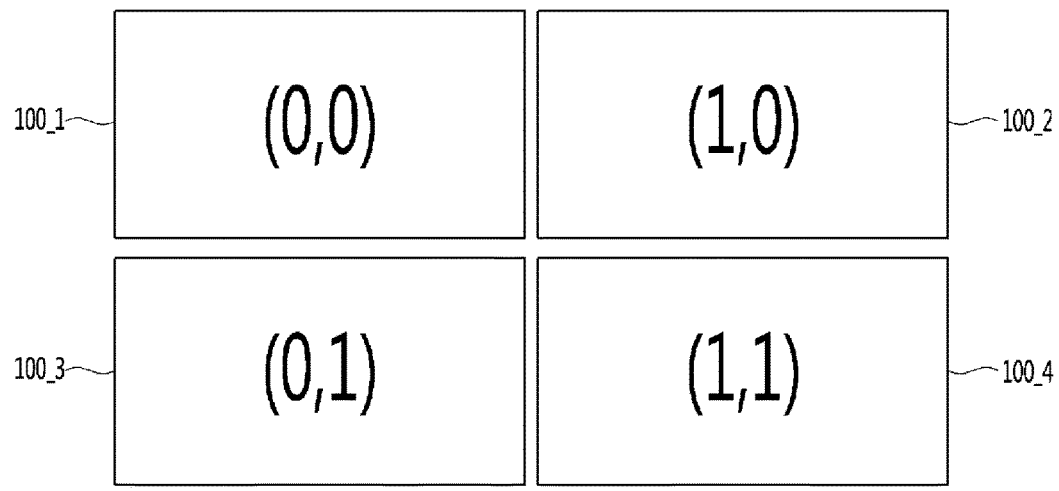

FIG. 63 is an illustrative diagram of position coordinates set based on a placement state of display devices.

Figure 64:
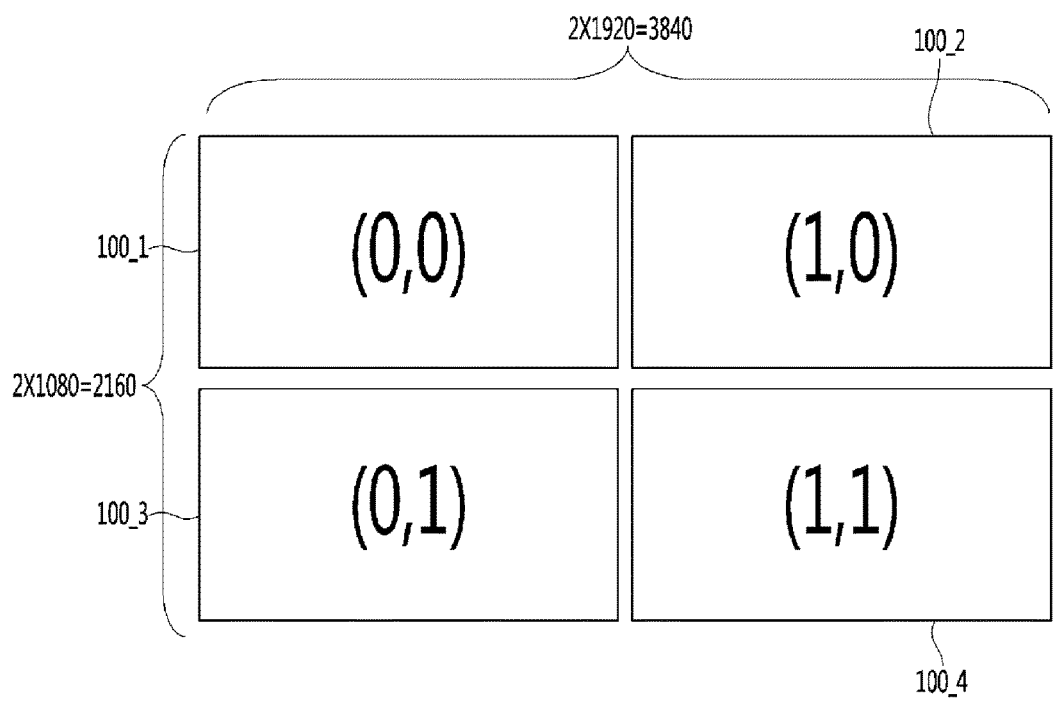

FIG. 64 is an illustrative diagram of a process of changing a pointer coordinate system based on position coordinates set with respect to each of display devices.

Figure 65:
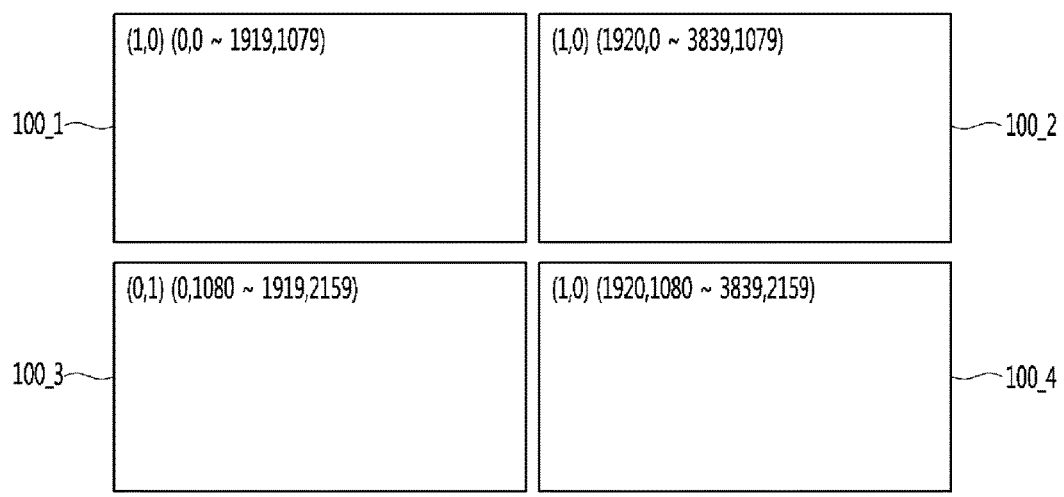

FIG. 65 is an illustrative diagram illustrating a pointer coordinate range set with respect to each of the display devices based on the changed pointer coordinate system.

Figure 66A:
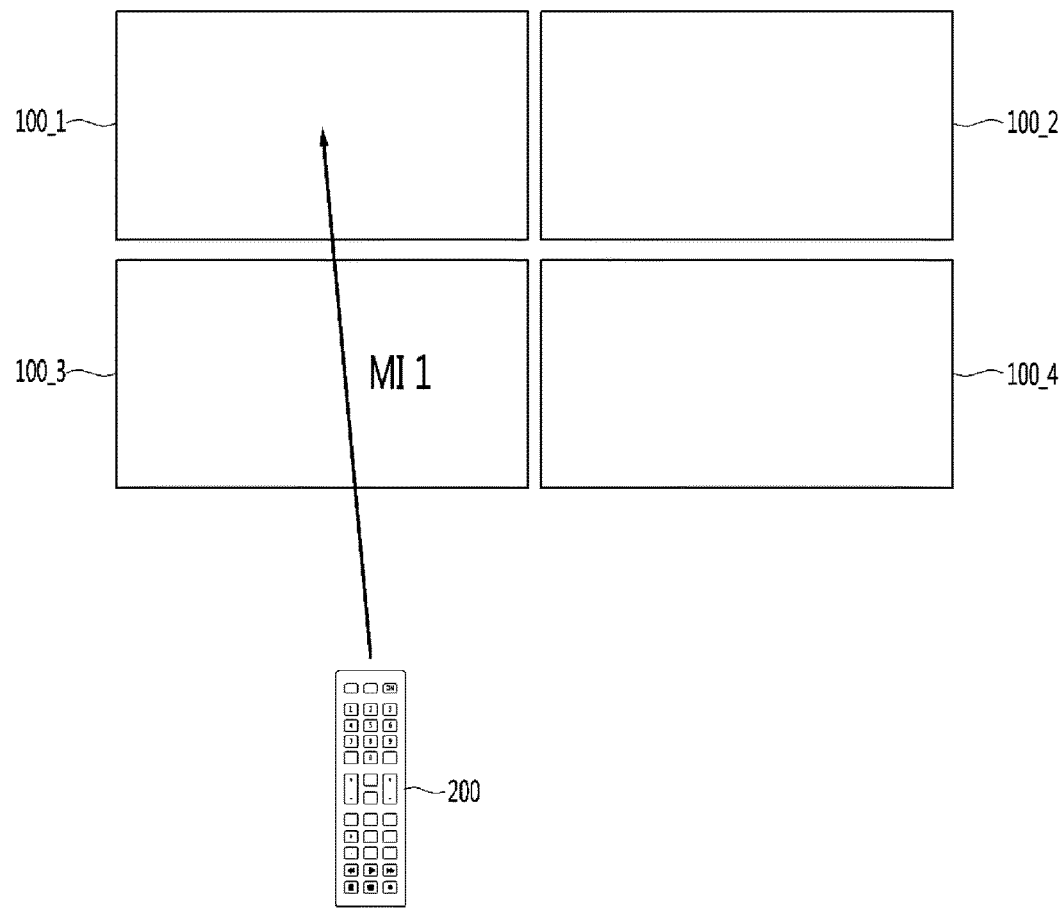
Figure 66B:
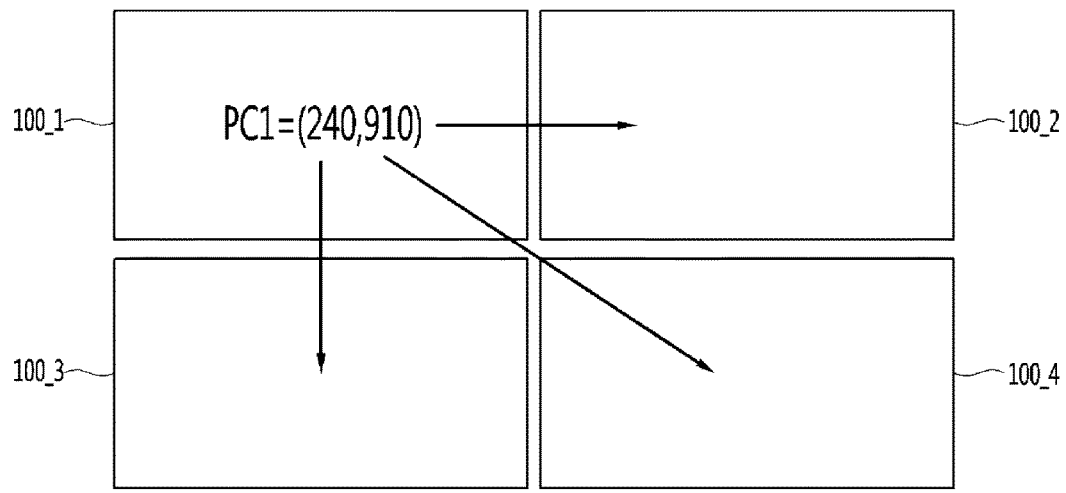
Figure 66C:
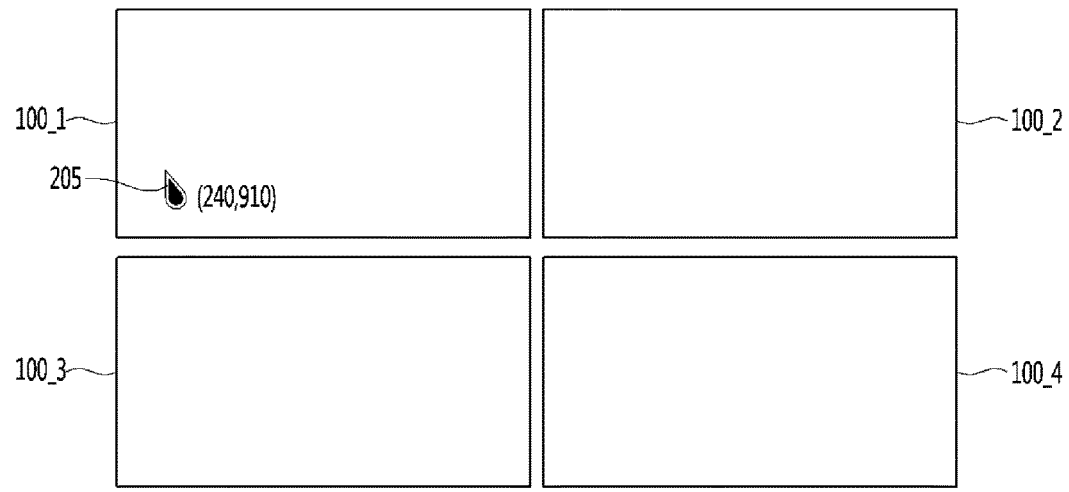

FIGS. 66A to 66C illustrate an embodiment according to a pointer display operation of the display device shown in FIG. 62.

Figure 67A:
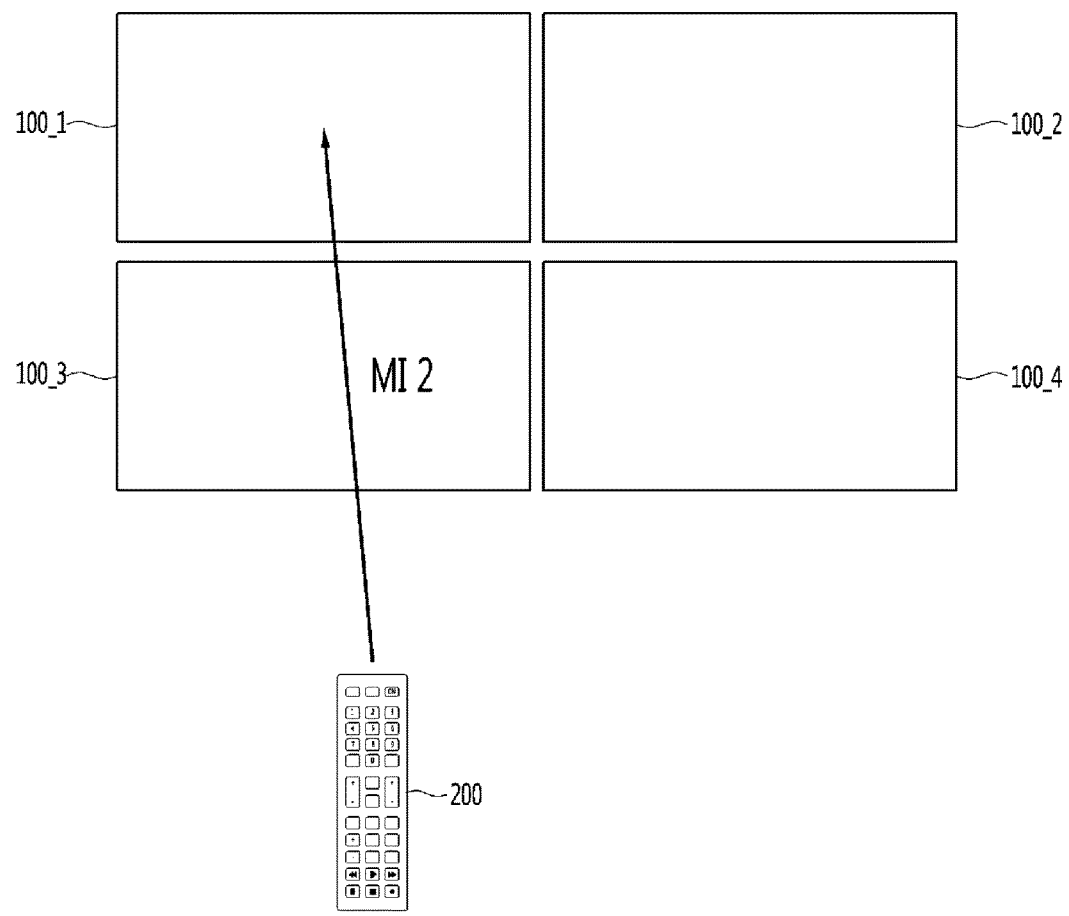
Figure 67B:
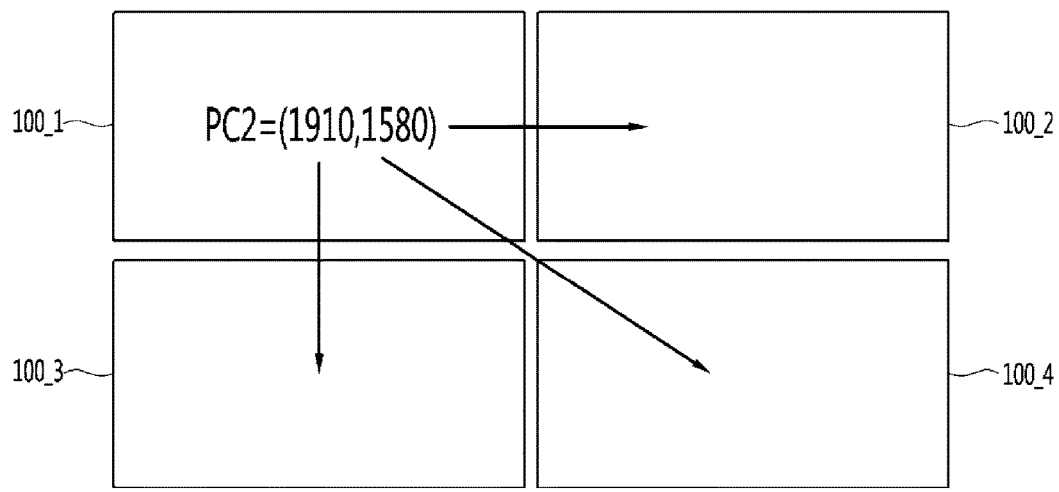
Figure 67C:
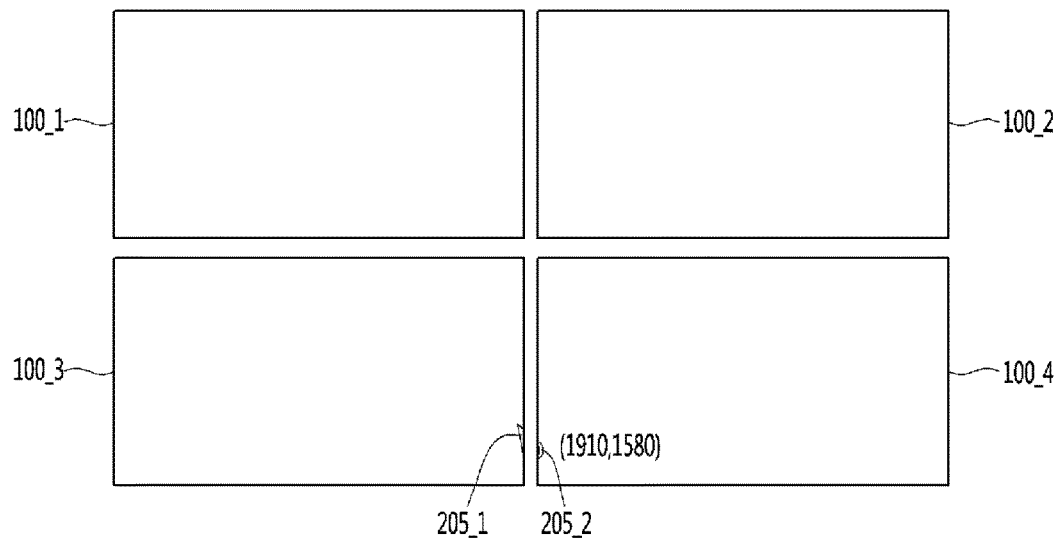

FIGS. 67A to 67C illustrate an embodiment according to a pointer display operation of the display device shown in FIG. 62.

Figure 68:
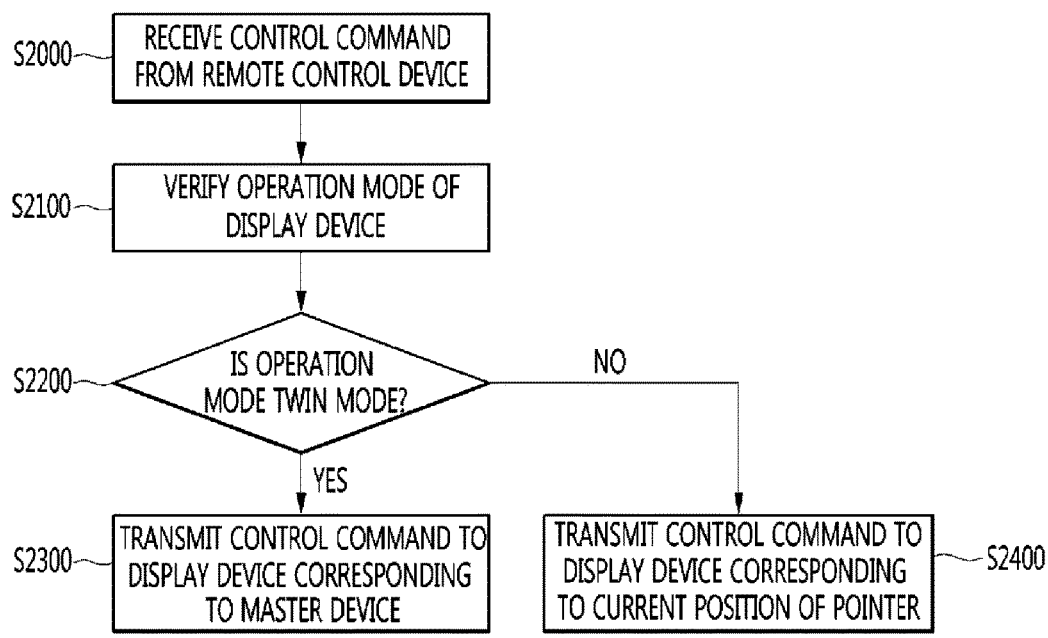

FIG. 68 is a flowchart showing a process of processing a control command received from a remote control device through a display device according to an embodiment of the present invention.

Figure 69A:
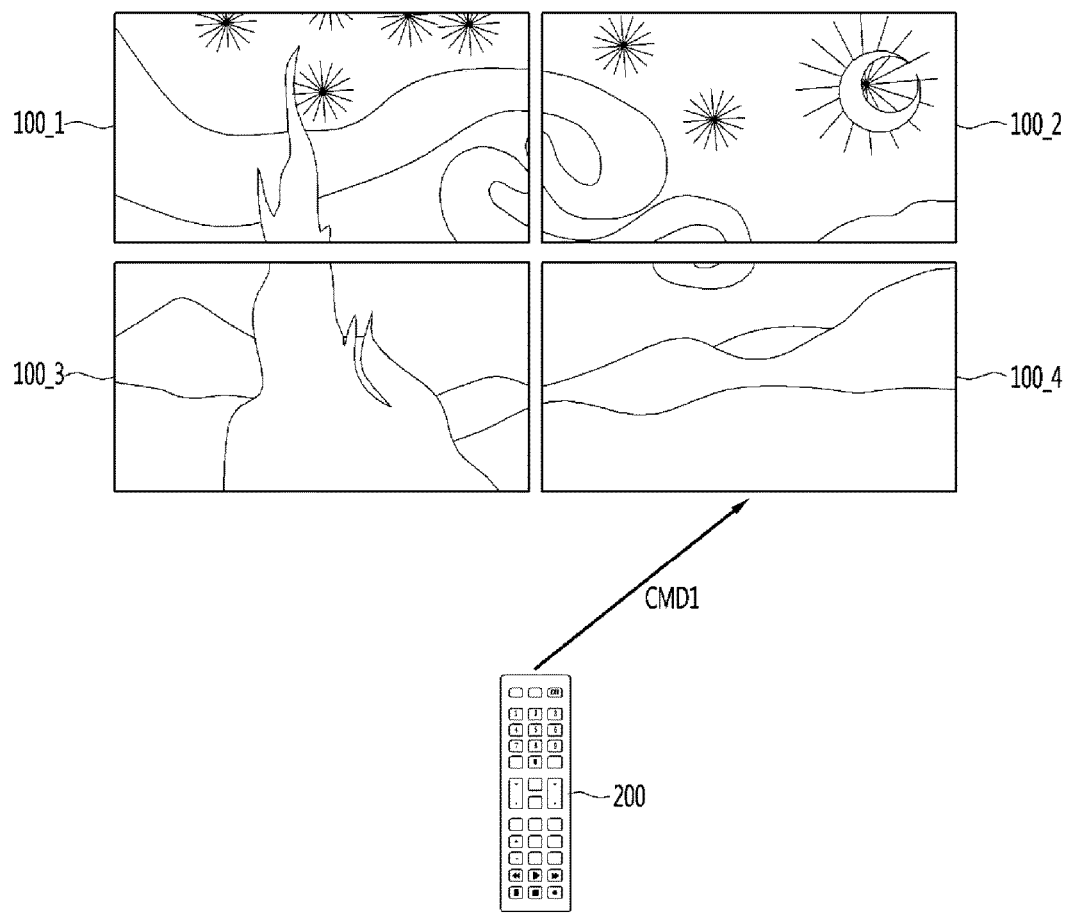
Figure 69B:
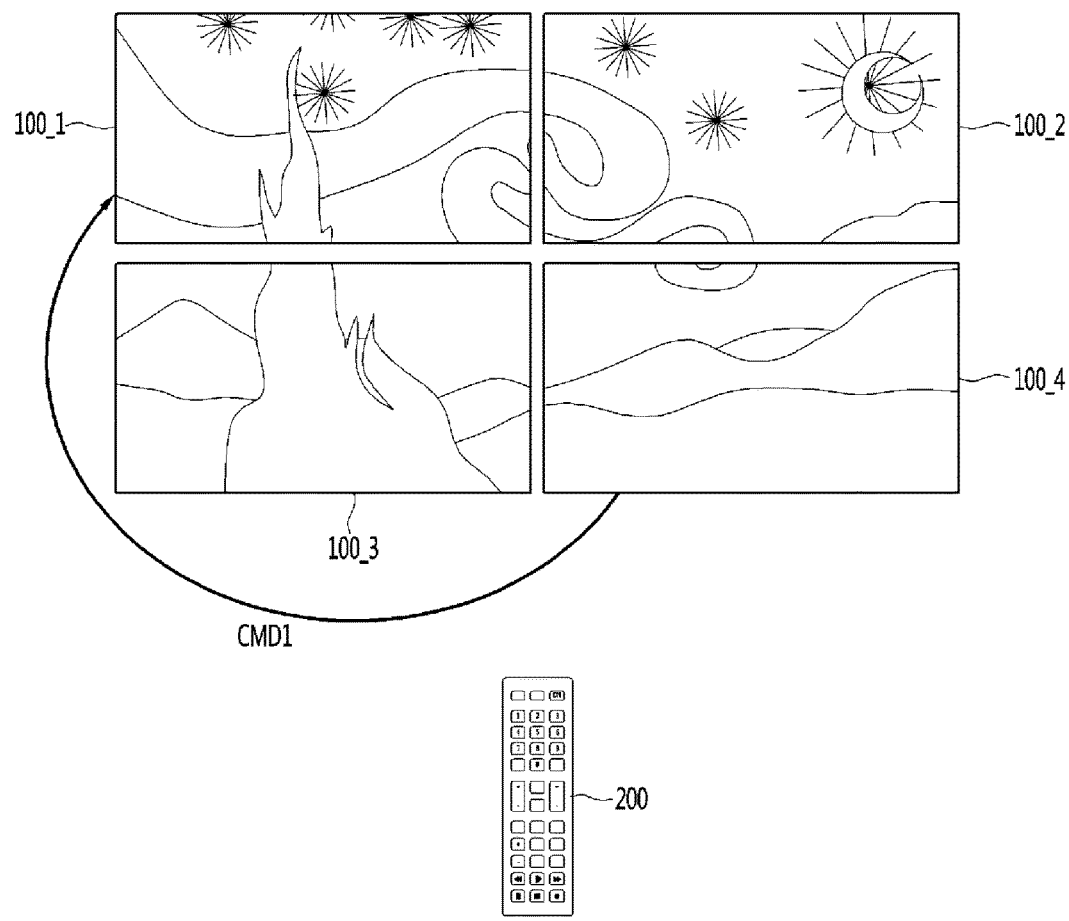

FIGS. 69A and 69B illustrate an embodiment according to an operation of the display device shown in FIG. 68.

Figure 70A:
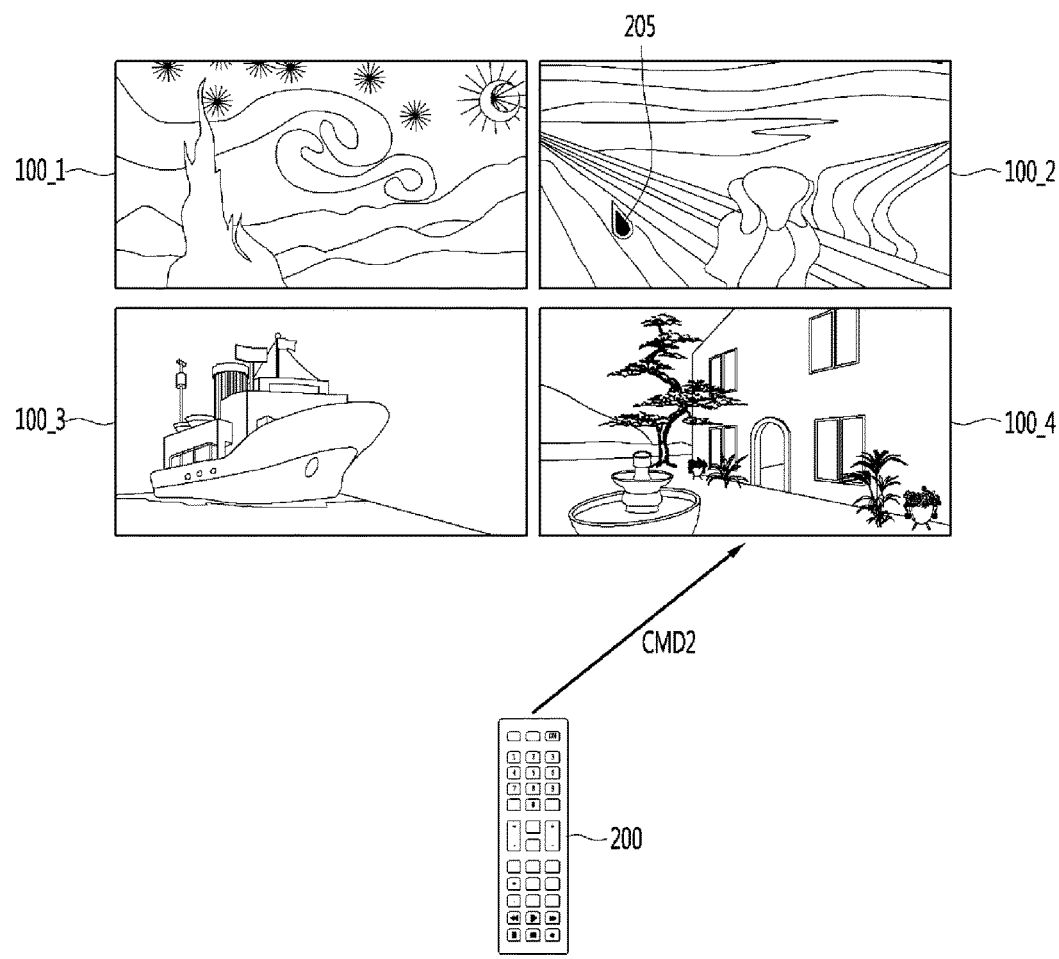
Figure 70B:
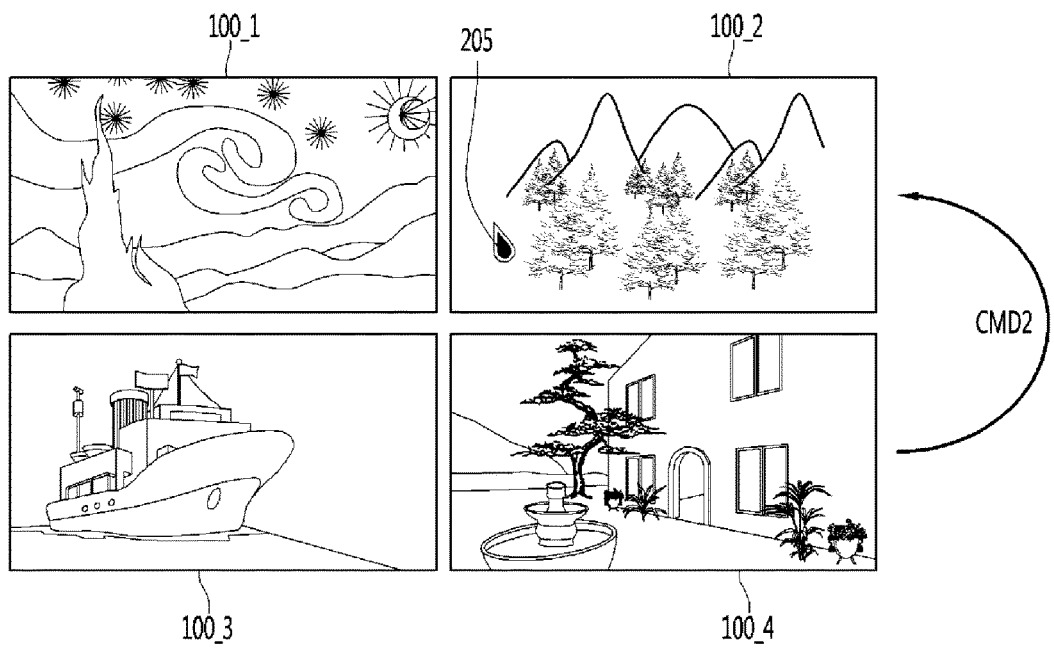

FIGS. 70A and 70B illustrate an embodiment according to an operation of the display device shown in FIG. 68.

DETAILED DESCRIPTION OF THE EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS can be used.

Accordingly, since various applications are freely added or deleted on a general purpose OS kernel, a display device described in this present invention, for example, can perform various user-friendly functions. The display device, in more detail, can be network TV, HBBTV, smart TV, LED TV, OLED TV, and so on and in some cases, can be applied to a smartphone.

Figure 1:
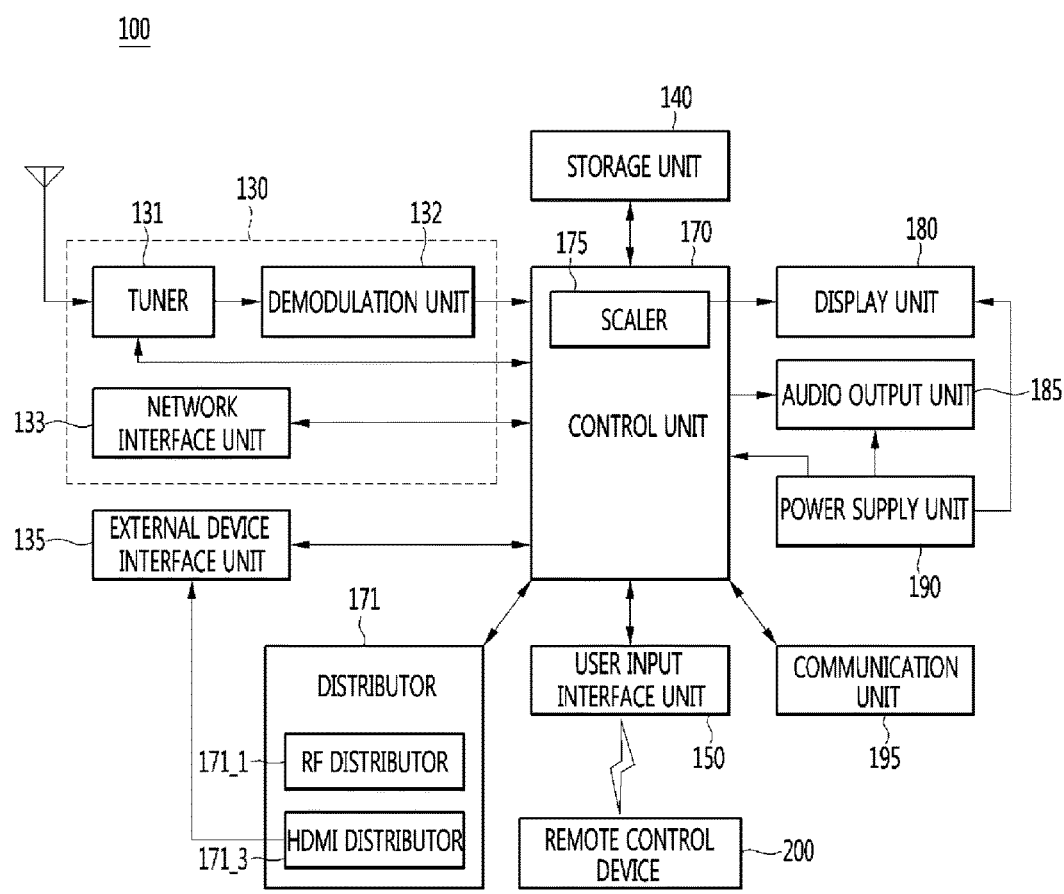
FIG. 1 is a block diagram of a configuration of a display device according to an embodiment of the present invention.

FIG. 1 is a block diagram illustrating a configuration of a display device according to an embodiment of the present invention.

Referring to FIG. 1, a display device 100 may include a broadcast reception unit 130, an external device interface unit 135, a storage unit 140, a user input interface unit 150, a control unit 170, a distributor 171, a display unit 180, an audio output unit 185, a power supply unit 190, and a communication unit 195.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one of image and audio output from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be output through the display unit 180. A sound signal of an external device inputted through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system but this is just exemplary.

The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the public, through network.

The storage unit 140 can store signal-processed image, voice, or data signals stored by a program in order for each signal processing and control in the control unit 170.

Additionally, the storage unit 140 can perform a function for temporarily store image, voice, or data signals output from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be output to the audio output unit 185. Additionally, voice signals processed in the control unit 170 can be inputted to an external output device through the external device interface unit 135.

Besides that, the control unit 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output unit 185.

Moreover, the control unit 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

The control unit 170 may include a scaler 175. The scaler 175 may scale an image obtained from the outside to a resolution that can be output from the display unit 180, and transmit the scaled image to the display unit 180.

The display unit 180 can convert image signals, data signals, or OSD signals, which are processed in the control unit 170, or images signals or data signals, which are received in the external device interface unit 135, into R, G, and B signals to generate driving signals.

The distributor 171 may distribute a content obtained from the outside to the display device 100 and another display device. The distributor 171 may include RF distributor 171_1 and/or HDMI distributor 171_3. The distributor 171 will be described later in detail.

The communication unit 195 may exchange information with other display devices through wired or wireless communication. The communication unit 195 may include a short-range communication module. The short-range communication module is for short range communication. The short-range communication module may support short range communication using at least one of Bluetooth, Radio Frequency Identification (RFID), infrared data association (IrDA), ultra wideband (UWB), ZigBee, near field communication (NFC), wireless-fidelity (Wi-Fi), Wi-Fi Direct, wireless universal serial bus (Wireless USB) technology. The communication unit 195 may be included in the control unit 170.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
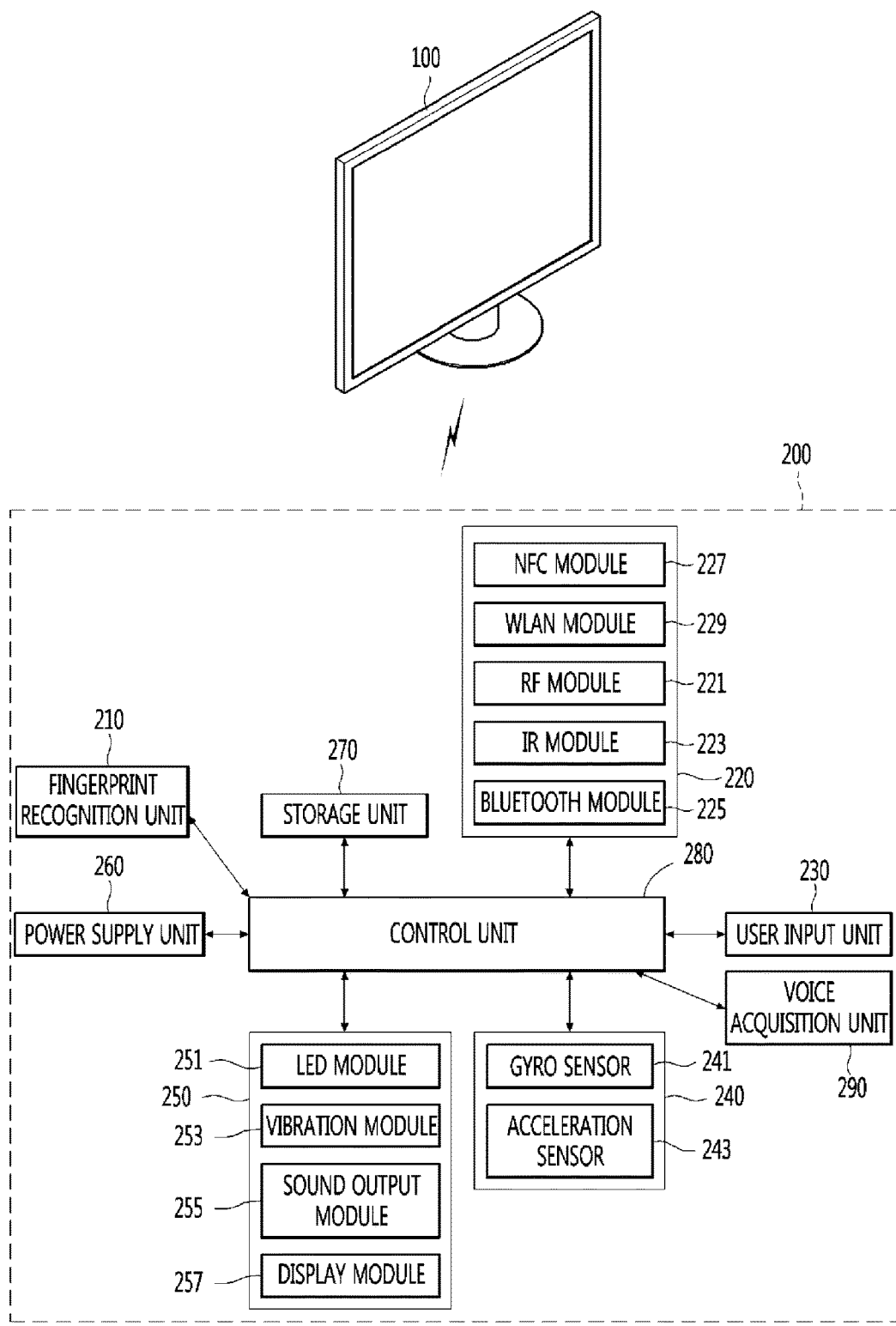
FIG. 2 is a block diagram of a remote control device according to an embodiment of the present invention.
Figure 3:
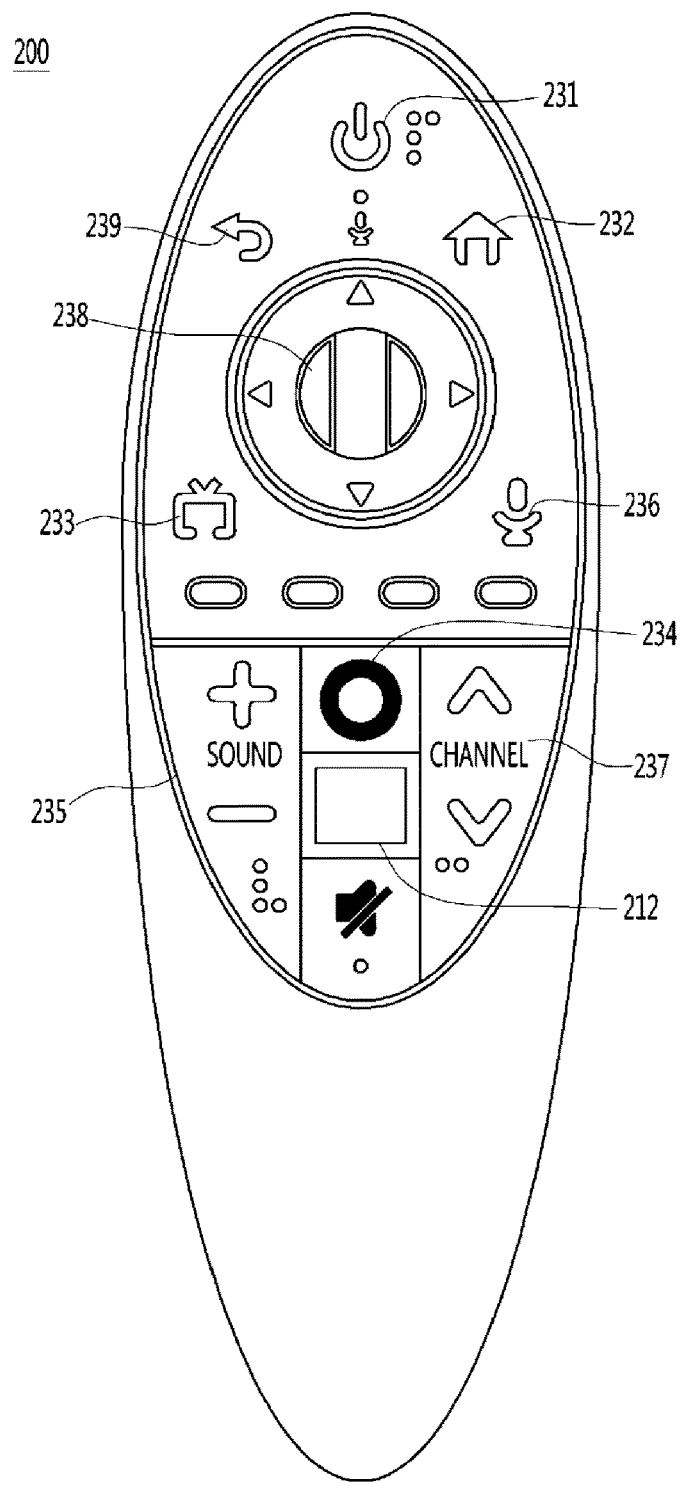
FIG. 3 is a diagram illustrating an actual configuration example of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 220 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 220.

Additionally, the voice acquisition unit 290 of the remote control device 200 can obtain voice.

The voice acquisition unit 290 can include at least one microphone 291 and obtain voice through the microphone 291.

Figure 4:
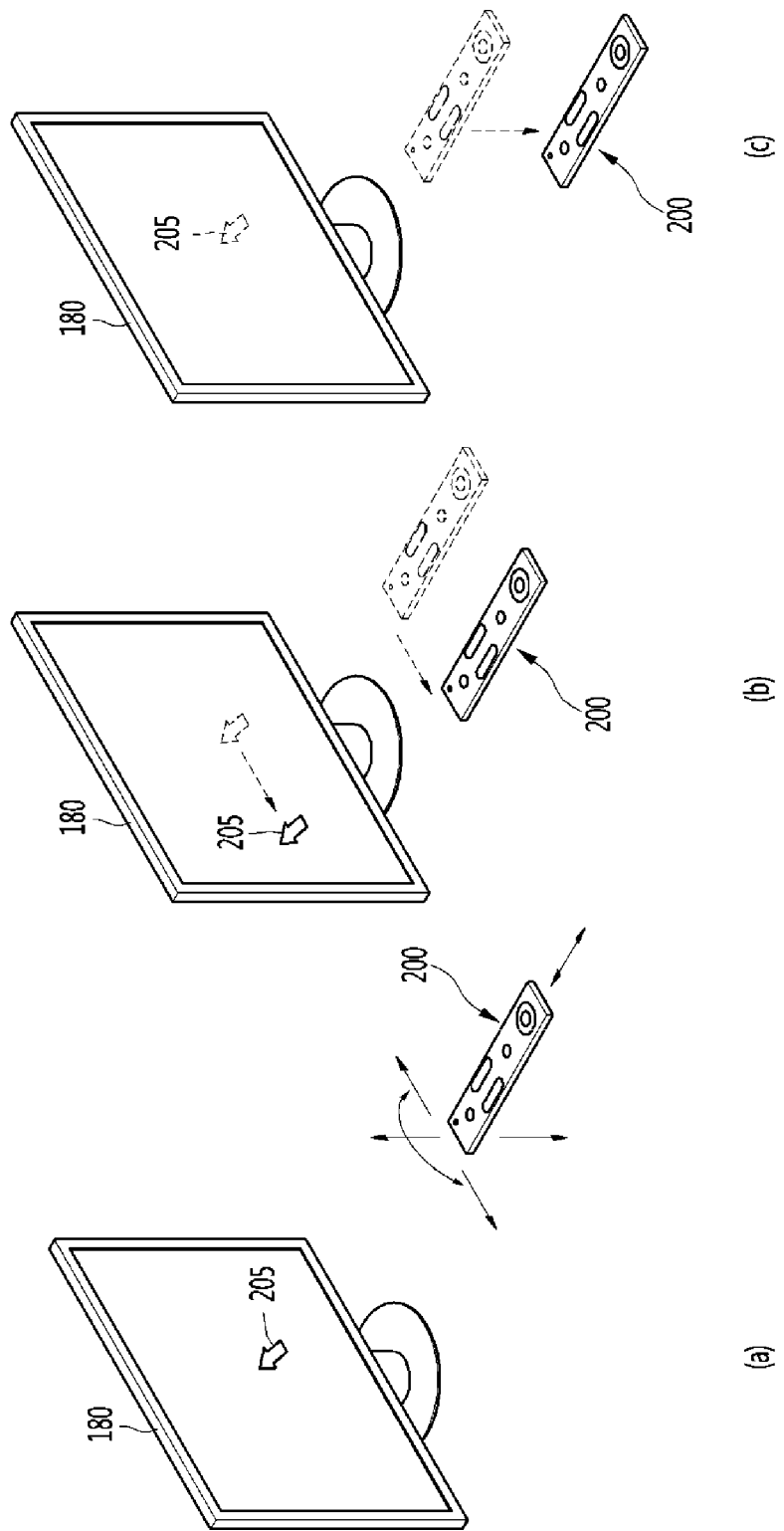
FIG. 4 is a diagram illustrating an example in which a remote control device is used according to an embodiment of the present invention.

Then, FIG. 4 is described.

FIG. 4 is a view of utilizing a remote control device according to an embodiment of the present invention.

(a) of FIG. 4 illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as shown in the drawing, the remote control device 200 can be referred to as a spatial remote controller.

(b) of FIG. 4 illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

(c) of FIG. 4 illustrates that while a specific button in the remote control device 200 is pressed, a user moves the remote control device 200 away from the display unit 180. Thus, a selection area in the display unit 180 corresponding to the pointer 205 can be zoomed in and displayed largely. On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Next, a display system according to an embodiment of the present invention will be described with reference to FIG. 5.

(a) of FIG. 5 is a diagram illustrating a configuration of a display system according to the embodiment of the present invention, and (b) of FIG. 5 is a diagram illustrating a detailed configuration of control units respectively included in display devices.

Referring to (a) of FIG. 5, a display system 1 can include a first display device 100_1, a second display device 100_2, and a remote control device 200. In the display system 1, the first display device 100_1 may mean a first display unit, and the second display device 100_2 may mean a second display unit. Therefore, the first display device 100_1 may be described to refer to the first display unit, and the second display device 100_2 may be described to refer to the second display unit. Hereinafter, the display system 1 will be described with the first display device 100_1 and the second display device 100_2.

The first display device 100_1 and the second display device 100_2 can be connected to each other through the same network and can be disposed such that one side surfaces thereof closely contact each other. The first display device 100_1 and the second display device 100_2 can acquire the same content. The first display device 100_1 and the second display device 100_2 can output acquired content on one combined screen by linking screens thereof to each other. For example, the first display device 100_1 can display a first partial video of a content video on the screen thereof, and the second display device 100_2 can display the remaining second partial video except for the first partial video on the screen thereof.

The first display device 100_1 and the second display device 100_2 can operate in a twin mode. The twin mode can be a mode in which a first screen of the first display device 100_1 and a second screen of the second display device 100_2 are linked to each other and used as one combined screen. The first screen can be a screen corresponding to a region occupied by a display unit 180 of the first display device 100_1, and the second screen can be a screen corresponding to a region occupied by a display unit 180 of the second display device 100_2. In an embodiment, at least one of the first display device 100_1 and the second display device 100_2 can operate in the twin mode by receiving an input through a button provided in a user input unit 230 of a remote control device 200. For example, when the first display device 100_1 receives a control command for a twin mode operation from the remote control device 200, the first display device 100_1 can transmit the control command for the twin mode operation to the second display device 100_2 connected thereto.

As the first display device 100_1 and the second display device 100_2 are connected to each other, one can operate as a master device, and the other can operate as a slave device. The master device can control an operation of the slave device. Among of the first display device 100_1 and the second display device 100_2, a device including a control unit having a better specification can become the master device.

The master device can transmit a control command to the slave device, and the operation of the slave device can be controlled according to the control command received from the master device. This will be described with reference to (b) of FIG. 5.

The description in (b) of FIG. 5 assumes that the first display device 100_1 operates as the master device, and the second display device 100_2 operates as the slave device. A first control unit 170_1 of the first display device 100_1 can include a control command reception unit 910_1, a twin service management unit 920_1, an input manager 930_1, and a webkit 940_1. A second control unit 170_2 of the second display device 100_2 can include a twin service management unit 920_2, an input manager 930_2, and a webkit 940_2.

The control command reception unit 910_1 can receive a control command from the remote control device 200 during an operation in the twin mode. The control command can be a screen link request described later.

The twin service management unit 920_1 can receive the control command from the control command reception unit 910-1 and transmit the received control command to the twin service management unit 920_2 included in the second control unit 170_2. For example, when the screen link request is transmitted to the twin service management unit 920_2, the second control unit 170_2 can link a screen thereof to a screen of the first display device 100_1 according to the screen link request.

When the first display device 100_1 and the second display device 100_2 are connected to each other, the twin service management units 920_1 and 920_2 can transmit and receive mutual device information.

The input managers 930_1 and 930_2 can receive a control command from the twin service management unit 920_1 and perform a function corresponding to the received control command.

The webkits 940_1 and 940_2 are an open source application program framework providing a foundation for creating web browsers.

Display devices 100 are illustrated in FIG. 5 as being provided in two, but an embodiment of the present invention is not necessarily limited thereto and can be applied to even a case where the display devices 100 are provided in three or more.

Next, an operating method of a display system according to an embodiment of the present invention will be described with reference to FIG. 6.

FIG. 6 is a ladder diagram illustrating an operating method of a display system according to an embodiment of the present invention.

Referring to FIG. 6, a first display device 100_1 and a second display device 100_2 are connected to each other (S101). The first display device 100_1 and the second display device 100_2 can be wiredly or wirelessly connected to each other through communication units 195.

In an embodiment, when the first display device 100_1 and the second display device 100_2 are wirelessly connected to each other, the first display device 100_1 and the second display device 100_2 can be connected to each other through an internet protocol sharer (IP sharer). That is, when the first display device 100_1 and the second display device 100_2 are wirelessly connected to each other through the IP sharer on the same network, Wi-Fi can be used as a wireless communication standard.

In another embodiment, when the first display device 100_1 and the second display device 100_2 are wirelessly connected to each other, the first display device 100_1 and the second display device 100_2 can be connected to each other through an Alljoyn technology. The Alljoyn technology can be technology of enabling a direct communication to be performed between devices without a repeater (for example, an IP sharer). A wireless communication technology used through Alljoyn can be any one of a Wi-Fi Direct standard and a Bluetooth standard.

As the first display device 100_1 and the second display device 100_2 are connected to each other, one can operate as a master device, and the other can operate as a slave device. The master device can control an operation of the slave device. The master device can transmit a control command to the slave device, and the operation of the slave device can be controlled according to the control command received from the master device.

In an embodiment, according to a user input, among the first display device 100_1 and the second display device 100_2, one can be set as the master device, and the other can set as the slave device.

In another embodiment, among the first display device 100_1 and the second display device 100_2, a display device connected to a remote control device 200 can be set as the master device, and a display device, which is not connected to the remote control device 200, can be set as the slave device.

In the following embodiments, the descriptions assume that a first display device 100_1 is set as the master device, and a second display device 100_2 is set as the slave device.

The connected first display device 100_1 and second display device 100_2 share their own device information (S103). That is, in a moment when the first display device 100_1 and the second display device 100_2 are connected to each other, the first display device 100_1 and the second display device 100_2 can transmit and receive the mutual device information through the communication units 195 respectively provided therein.

Here, the device information can include at least one of identification information, specification information, and channel information of each of the display devices 100.

The identification information of each of the display devices 100 can include information, such as an IP address and a model name, which is capable of identifying each of the display devices 100 when the display devices 100 are connected to each other through an IP.

The specification information of each of the display devices 100 can include at least one of performance information of a control unit 170, and size information and definition information of a display unit 180, and ability information of a scaler.

The channel information can be information on a channel of a broadcast program. In an embodiment, the control unit 170 of each of the display devices 100 can receive the channel information through a tuner 131. Channel information stored in the first display device 100_1 can be different from channel information stored in the second display device 100_2. Each of the display devices 100 can update or synchronize channel information based on channel information received from the other display device 100. In another embodiment, the first display device 100_1 can receive a portion of channel information, and the second display device 100_2 can receive the rest of the channel information. The display devices 100 can share the received channel information and store one piece of completed channel information.

According to another embodiment of the present invention, in addition to the sharing of pieces of the device information, the first display device 100_1 can periodically transmit scanned channel information to the second display device 100_2. The second display device 100_2 can update channel information based on the channel information received from the first display device 100_1.

After that, the control unit 170 of the first display device 100_1 acquires first content (S105) and plays the acquired first content through the display unit 180 (S107), and the control unit 170 of the second display device 100_2 acquires second content (S105) and plays the acquired second content through the display unit 180 (S107).

In an embodiment of the present invention, content can be multimedia content such as a video, an image, and text.

For example, each of the first content and the second content can be a broadcast program. In this case, the first content can be received through the tuner 131 provided in the first display device 100_1, and the second content can be received through the tuner 131 provided in the second display device 100_2. When each of the first content and the second content is the broadcast program, the first content and the second content can be the same broadcast program or be respectively different broadcast programs.

In another embodiment, when the first content is the same as the second content, each of the display devices 100 can acquire content through a distributor 171. The distributor 171 can be provided in the first display device 100_1 that is the master device, but is not necessarily limited thereto. The distributor 171 can be provided separately from the first display device 100_1. The distributor 171 can include at least one of a radio frequency (RF) distributor 171_1 and a high definition multimedia interface (HDMI) distributor 171_3.

The RF distributor 171_1 can distribute RF signals received from the outside to the first display device 100_1 and the second display device 100_2. The HDMI distributor 171_3 can distribute video signals and audio signals provided from peripheral devices to the first display device 100_1 and the second display device 100_2. The same video signal and the same audio signal can be input in the first display device 100_1 and the second display device 100_2 through the distributor 171 as described above.

In another embodiment, when the first content is the same as the second content, each of the display devices 100 can acquire content through a network interface unit 133. For example, the control unit 170 of the first display device 100_1 can receive content through the network interface unit 133 from a content provider server (CP server) that provides content. The control unit 170 of the first display device 100_1 can transmit the received content through the communication unit 195 by using a multicast method. The control unit 170 of the first display device 100_1 can receive content transmitted through the multicast method, and the second display device 100_2 can also receive content transmitted through the multicast method.

Embodiments, in which the first display device 100_1 and the second display device 100_2 acquire and play the same content, will be described with reference to the following drawings.

FIGS. 7 and 8 are diagrams illustrating examples in which display devices acquire the same content by a physical input.

FIG. 7 is a diagram illustrating an example in which a first display device and a second display device acquire the same content through an RF distributor according to an embodiment of the present invention, and FIG. 8 is a diagram illustrating an example in which the first display device and the second display device acquire the same content through an HDMI distributor according to another embodiment of the present invention.

First, referring to FIG. 7, the RF distributor 171_1 can receive RF signals transmitted from the outside through an antenna connected to the first display device 100_1. The RF distributor 171_1 can distribute the received RF signals to the first display device 100_1 and the second display device 100_2. The RF signals can include a broadcast signal. The RF distributor 171_1 can be included in any one of the first display device 100_1 and the second display device 100_2, but is not necessarily limited thereto. The RF distributor 171_1 can exist as a separate element.

Next, FIG. 8 is described.

Referring to FIG. 8, the HDMI distributor 171_3 can receive video signals and audio signals output from peripheral devices 300 (300_1 and 300_2). The HDMI distributor 171_3 can distribute the received video signals and the received audio signals to the first display device 100_1 and the second display device 100_2. That is, the first display device 100_1 and the second display device 100_2 can receive the same video signal and the same audio signal. An external device interface unit 135 of each of the display devices 100 can receive the video signal and the audio signal received from the HDMI distributor 171_3 and transmit the received video signal and the received audio signal to the control unit 170.

The HDMI distributor 171_3 can be included in any one of the first display device 100_1 and the second display device 100_2, but is not necessarily limited thereto. The HDMI distributor 171_3 can exist as a separate element.

Next, FIG. 9 is described.

FIG. 9 is a diagram illustrating an example in which a first display device and a second display device acquire the same content through a CP server according to an embodiment of the present invention.

Referring to FIG. 9, the first display device 100_1 can receive content from a CP server 500 through streaming. The control unit 170 of the first display device 100_1 can transmit the content received from the CP server 500 through the communication unit 195 to the outside through a multicast method. The first display device 100_1 itself can receive content transmitted through the multicast method. The second display device 100_2 can also receive content transmitted through the multicast method.

Next, FIG. 10 is described.

FIG. 10 is a diagram illustrating an example in which a first display device and a second display device acquire the same content through a CP server according to another embodiment of the present invention. Referring to FIG. 10, the first display device 100_1 and the second display device 100_2 can receive the same content from the CP server 500 through streaming. Specifically, when a request for playing first content is received, the first display device 100_1 can transmit information to the second display device 100_2 while receiving the first content from the CP server 500 through streaming, the information indicating an access route through which the first content is capable of being received. The second display device 100_2 can access the CP server 500 and receive the first content from the CP server 500 through streaming based on the received information indicating the access route.

FIG. 6 is described again.

The control unit 170 of the first display device 100_1 receives a screen link request from the remote control device 200 (S109). The control unit 170 of the first display device 100_1 can receive the screen link request from the remote control device 200 through a user input interface unit 150. The screen link request can be a request for linking a screen of the first display device 100_1 and a screen of the second display device 100_2 and displaying the first content displayed on the first display device 100_1 on the linked screens. The control unit 170 of the first display device 100_1 can control the display units 180 to respectively display a portion of the first content on the screen of the first display device 100_1 and the rest of the first content on the screen of the second display device 100_2 according to the screen link request.

In an embodiment of the present invention, an example in which the first display device 100_1 receives the screen link request has been described, but the present invention is not necessarily limited thereto. The second display device 100_2 can also receive the screen link request. When the second display device 100_2 receives the screen link request, the control unit 170 of the second display device 100_2 can control the display units 180 to respectively display a portion of the second content on the screen of the second display device 100_2 and the rest of the second content on the screen of the first display device 100_1.

After the screen link request is received, the control unit 170 of the first display device 100_1 verifies whether the second display device 100_2 plays the same content as the first content (S111). In an embodiment, when content is a broadcast program, the control unit 170 of the first display device 100_1 can receive the channel information of the device information received from the second display device 100_2 and verify whether the first content and the second content currently displayed in the display devices 100 are the same as each other. Specifically, when a channel number corresponding to the first content is the same as a channel number corresponding to the second content, the control unit 170 of the first display device 100_1 can verify that the second display device 100_2 plays the same content as the first content. On the contrary, when the channel number corresponding to the first content is not the same as the channel number corresponding to the second content, the control unit 170 of the first display device 100_1 can verify that the second display device 100_2 plays different content from the first content.

When the second display device 100_2 plays the same content as the first content, the control unit 170 of the first display device 100_1 transmits the screen link request to the second display device 100_2 (S113).

When the second display device 100_2 plays the different content from the first content, the control unit 170 of the first display device 100_1 transmits, to the second display device 100_2, a content change request for playing the first content and the screen link request (S115). In an embodiment, when content is a broadcast program, the content change request can be a channel change request indicating a channel change. Specifically, when the channel number of the second content displayed in the second display device 100_2 is different from the channel number of the first content displayed in the first display device 100_1, the control unit 170 of the first display device 100_1 can transmit the channel change request for changing to the channel number of the first content to the second display device 100_2 through the communication unit 195. The second display device 100_2 can be tuned to the same channel as the first display device 100_1 according to the channel change request.

The control unit 170 of the first display device 100_1 and the control unit 170 of the second display device 100_2 synchronize and play the first content according to the received screen link request (S117).

Hereinafter, an embodiment in which content is synchronized and displayed according to the screen link request will be described.

FIG. 11 is a diagram illustrating an example of a combined screen output according to a screen link request when a first display device and a second display device play the same content according to an embodiment of the present invention.

Referring to (a) of FIG. 11, a first display device 100_1 displays first content 310 on a screen, and a second display 100_2 also displays the first content 310 on a screen. A pointer 205 moving so as to correspond to a movement of a remote control device 200 is placed on the screen of the first display device 100_1. A control unit 170 of the first display device 100_1 can receive a screen link request from the remote control device 200. In an embodiment, the screen link request can be generated by an action in which a user pushes a button provided in a user input unit 230 of the remote control device 200 for a preset time.

When the first display device 100_1 receives the screen link request, the control unit 170 of the first display device 100_1 can transmit the screen link request to the second display device 100_2. As shown in (b) of FIG. 11, the control unit 170 of the first display device 100_1 can output a partial video 311 of the first content 310 through a display unit 180 of the first display device 100_1 according to the received screen link request, and the second display device 100_2 can output the remaining video 313 of the first content 310 through a display unit 180 thereof according to the received screen link request. Accordingly, a whole video of content can be output on a combined screen in which the screens of the two display devices 100 are combined into one. For example, when the user pushes the button provided in the user input unit 230 of the remote control device 200 for two seconds in a state in which the pointer 205 is placed on the screen of the first display device 100_1, linked screens can be provided as shown in (b) of FIG. 11. As the screens of the display devices 100 are linked to each other, the user can view content on a larger screen.

Meanwhile, a scaler 175 included in the control unit 170 of each of the display devices 100 can scale the video of the first content 310 to the definition in which the display unit 180 is capable of outputting the video, and transmit the scaled video to the display unit 180.

According to another embodiment of the present invention, the definition of the display unit 180 provided in the first display device 100_1 can be different from that of the display unit 180 provided in the second display device 100_2. The definition of each display device can be shared in operation S103 illustrated in FIG. 6. When it is determined that the definition of the display unit 180 provided in the first display device 100_1 is different from that of the display unit 180 provided in the second display device 100_2, the control unit 170 of the first display device 100_1 can perform control to output content based on the display unit 180 having lower definition. For example, the definition supported by the display unit 180 provided in the first display device 100_1 is ultra high definition (UHD), and the definition supported by the display unit 180 provided in the second display device 100_2 is high definition (HD), the control unit 170 of the first display device 100_1 can control the display unit 180 of the first display device 100_1 and the display unit 180 of the second display device 100_2 to output content at the HD according to the screen link request.

Next, FIGS. 12 and 13 are described.

FIGS. 12 to 13 are diagrams illustrating an example of a screen output according to a screen link request when a first display device and a second display device respectively play different pieces of content.

First, FIG. 12 is described.

Referring to (a) of FIG. 12, the first display device 100_1 displays first content 310 o13n a screen, and the second display device 100_2 displays second content 330 on a screen. The pointer 205 moving so as to correspond to the movement of the remote control device 200 is placed on the screen of the first display device 100_1. The control unit 170 of the first display device 100_1 can receive a screen link request from the remote control device 200. Since pieces of content displayed on the screens are different from each other, the control unit 170 of the first display device 100_1 can transmit a content change request and the screen link request to the second display device 100_2.

The second display device 100_2 can change played content from the second content 330 to the first content 310 according to the received content change request.

The control unit 170 of the first display device 100_1 can control the display units 180 to respectively display a partial video 311 of the first content 310 on the display unit 180 of the first display device 100_1 and the remaining video 313 of the first content 310 on the display unit 180 of the second display device 100_2 according to the screen link request.

A user can view any one piece of content on a large screen only through a simple operation while viewing different pieces of content on screens of display devices.

Next, FIG. 13 is described.

Referring to (a) of FIG. 13, the first display device 100_1 displays first content 310 on a screen, and the second display device 100_2 displays second content 330 on a screen. The pointer 205 moving so as to correspond to the movement of the remote control device 200 is placed on the screen of the second display device 100_2. The control unit 170 of the first display device 100_1 can determine that the pointer 205 is placed on the screen of the second display device 100_2, based on size information of the first display device 100_1 and size information of the second display device 100_2. This will be described later.

In a state in which the pointer 205 is placed on the screen of the second display device 100_2, the control unit 170 of the first display device 100_1 can receive a screen link request from the remote control device 200. The control unit 170 of the first display device 100_1 can recognize that pieces of content displayed on the screens are different from each other, and change played content from the first content 310 to the second content 330. That is, content displayed according to a screen link can be determined based on a screen on which the pointer 205 is placed.

As shown in (b) of FIG. 13, the control unit 170 of the first display device 100_1 can control the display units 180 to respectively display a partial video 331 of the second content 330 on the display unit 180 of the first display device 100_1 and the remaining video 333 of the second content 330 on the display unit 180 of the second display device 100_2 according to the screen link request.

A user can view any one piece of content with a large screen only through a simple operation while viewing different pieces of content on screens of display devices.

Next, a process of recognizing that a pointer 205 is placed on a screen of a second display device 100_2 will be described with reference to FIGS. 14 and 15.

FIG. 14 is a flowchart illustrating a process of recognizing that a pointer 205 is placed on a screen of a second display device according to an embodiment of the present invention.

Referring to FIG. 14, a control unit 170 of a first display device 100_1 acquires size information of a connected second display device 100_2 (S301). The size information of the second display device 100_2 can be acquired through operation S103 of sharing the device information illustrated in FIG. 6. The size information can include inch information of the second display device 100_2.

The control unit 170 of the first display device 100_1 generates a twin virtual region based on the acquired size information of the second display device 100_2 (S303). The twin virtual region can be a region virtually generated so as to grasp whether the pointer 205 is placed on the screen of the second display device 100_2. The twin virtual region can include a real region corresponding to the screen of the first display device 100_1 and a virtual region corresponding to the screen of the second display device 100_2. The virtual region can be generated by using the size information of the second display device 100_2. The twin virtual region will be described with reference to FIG. 15.

The control unit 170 of the first display device 100_1 verifies whether the pointer 205 is placed on the virtual region included in the twin virtual region (S305), and when the pointer 205 deviates from the real region and is placed on the virtual region, the control unit 170 calculates coordinate values corresponding to a position of the pointer 205 (S307).

The control unit 170 of the first display device 100_1 transmits the calculated coordinate values to the second display device 100_2 (S309). Hereinafter, operations S301 to S309 will be described in detail with reference to FIG. 15.

FIG. 15 is a diagram illustrating an example in which a position of a pointer is detected through a twin virtual region according to an embodiment of the present invention.

Referring to FIG. 15, a twin virtual region 600 can include a real region 610 corresponding to the screen of the first display device 100_1 and a virtual region 630 generated based on the size information of the second display device 100_2. The control unit 170 of the first display device 100_1 can acquire coordinate values of the twin virtual region 600 by using coordinate values of the real region 610 and coordinate values of the virtual region 630 acquired based on the size information of the second display device 100_2. A maximum X-coordinate value of the real region 610 is assumed to be x1 (i.e., 1,920).

When the pointer 205 deviates from the real region 610 and is placed in the virtual region 630, the control unit 170 of the first display device 100_1 can acquire virtual coordinate values of (x2, y2)=(2,420, 200) of the pointer 205 placed in the virtual region 630 of the twin virtual region 600. The control unit 170 of the first display device 100_1 can verify the deviation of the pointer 205 from the real region 610 and a movement distance of the remote control device 200 at the same time. The control unit 170 of the first display device 100_1 can acquire the virtual coordinate values of (x2, y2)=(2,420, 200) of the pointer 205 by using coordinate values corresponding to the movement distance of the remote control device 200. The control unit 170 of the first display device 100_1 can calculate an X-coordinate value of 500 by subtracting the maximum X-coordinate value of 1,920 of the real region 610 from the acquired X-coordinate value of 2,420. That is, the control unit 170 of the first display device 100_1 can acquire the calculated X-coordinate value of 500 and the existing Y-coordinate value of 200 and transmit the calculated X-coordinate value of 500 and the existing Y-coordinate value of 200 to the second display device 100_2. The first display device 100_1 and the second display device 100_2 can grasp a point at which the pointer 205 is placed on the screens thereof, as the coordinate values of 500 and 200.

Next, a method of performing synchronization so as to play the same content acquired by a first display device 100_1 and a second display device 100_2 on a combined screen according to a screen link request will be described with reference to FIGS. 16 and 17.

FIG. 16 is a diagram illustrating a configuration of a control unit according to another embodiment of the present invention, and FIG. 17 is a diagram illustrating a process of performing synchronization so as to play content.

In particular, FIGS. 16 and 17 illustrate an embodiment in which a first display device 100_1 and a second display device 100_2 acquire the same contact through a distributor 171.

Referring to FIG. 16, a control unit 170_1 of a first display device 100_1 can include a video division unit 172_1, a frame identifier insertion unit 174_1, a frame cutting unit 176_1, a scaler 175_1, and a time synchronization unit 177_1. A control unit 170_2 of the second display device 100_2 can also include a video division unit 172_2, a frame identifier insertion unit 174_2, a frame cutting unit 176_2, a scaler 175_2, and a time synchronization unit 177_2.

The video division units 171_1 and 172_2 can divide a video of content received from the distributor 171 into a plurality of frames.

The frame identifier insertion units 174_1 and 174_2 can respectively insert frame identifiers capable of identifying each frame into the plurality of frames. Each of the frame identifier insertion units 174_1 and 174_2 can insert the same frame identifier into the same frames. As shown in (b) of FIG. 17, the frame identifier insertion units 174_1 and 174_2 can insert the same frame identifier such as T0, T1, or, T2 into the same frames.

In order to display only a portion of each of the frames on a display unit 180 of each of the display devices 100, the frame cutting units 176_1 and 176_2 can cut a frame. Specifically, as shown in (c) of FIG. 17, the frame cutting unit 176_1 can cut off a right half region of each of the frames except for a left half region thereof, and the frame cutting unit 176_2 can cut off a left half region of each of the frames except for a right half region thereof.

The scalers 175_1 and 175_2 can scale each of the cut frames in accordance with the definition of each of the display units 180. Specifically, as shown in (c) of FIG. 17, the frame cutting unit 175_1 can scale each of the cut frames in accordance with the definition of a first display unit 180_1, and the frame cutting unit 175_2 can scale each of the cut frames in accordance with the definition of a second display unit 180_2.

The time synchronization units 177_1 and 177_2 can synchronize playbacks of the frames by using the frame identifiers respectively inserted into the frames. That is, the time synchronization units 177_1 and 177_2 can compare the frame identifiers of the scaled frames through communication therebetween and respectively output corresponding frames to the display units 180 when the frame identifiers of the scaled frames are the same. Therefore, since timings of the frames are synchronized with one another, a video of content can be displayed on one large screen as shown in (d) of FIG. 17.

Next, an embodiment, in which a placement of a first display device 100_1 and a second display device 100_2 is automatically or manually set for normally linking a screen of the first display device 100_1 and s screen of the second display device 100_2, will be described.

(a) of FIG. 18 illustrates a state in which the first display device 100_1 and the second display device 100_2 are normally disposed, and (b) of FIG. 18 illustrates a state in which the first display device 100_1 and the second display device 100_2 are abnormally disposed. That is, it is assumed that a normal placement is a placement in which the first display device 100_1 is disposed on a left side and the second display device 100_2 is disposed on a right side.

When the first display device 100_1 and the second display device 100_2 are abnormally disposed, a screen link can also be abnormally performed. Accordingly, as shown in (b) of FIG. 18, a playback of content may not be smoothly displayed on one large screen.

FIG. 19 is a diagram illustrating an example in which a placement of the first display device 100_1 and the second display device 100_2 is manually set according to an embodiment of the present invention.

Referring to FIG. 19, each of the first display device 100_1 and the second display device 100_2 can display a plurality of placement setting items for placement setting. The plurality of placement setting items can include a left placement item 710 and a right placement item 720. When the left placement item 710 displayed on the screen of the first display device 100_1 is selected through a button input of a remote control device 200, the first display device 100_1 can be set to be disposed on a left side. When the right placement item 730 displayed on the screen of the second display device 100_2 is selected through a button input of the remote control device 200, the second display device 100_2 can be set to be disposed on a right side.

In an embodiment, the displacement items can be displayed when each of display devices 100 enters a twin mode.

FIG. 20 is a diagram illustrating a method of checking a placement state of display devices through a speaker provided in each of the display devices and a microphone provided in a remote control device according to another embodiment of the present invention.

Referring to FIG. 20, the first display device 100_1 can include a first left speaker 185_1 and a first right speaker 185_2, and the second display device 100_2 can include a second left speaker 185_3 and a second right speaker 185_4. It is assumed that the remote control device 200 is located on the front of the first display device 100_1 and the second display device 100_2, and the first display device 100_1 and the second display device 100_2 are disposed so as to closely contact each other.

The control units 170 of the display devices 100 can sequentially output test voice signals speakers provided in the display devices 100. For example, the test voice signals can be output in order of the first left speaker 185_1, the first right speaker 185_2, the second left speaker 185_3, and the second right speaker 185_4. The test voice signals can have the same intensity.

A microphone 291 of the remote control device 200 can receive the test voice signals output from the speakers. A control unit 280 of the remote control device 200 can calculate gains of the test voice signals based on the received test voice signals. For example, due to a difference in distances between the speakers and the remote control device 200, among a gain (G1) of the test voice signal output from the first left speaker 185_1 and a gain (G4) of the test voice signal output from the second right speaker 185_4, one can be a maximum gain, and the other can be a minimum gain. In addition, since the first display device 100_1 and the second display device 100_2 closely contact each other, a gain (G2) of the test voice signal output from the first right speaker 185_2 can be similar to a gain (G3) of the test voice signal output from the second left speaker 185_3. The first display device 100_1 can receive the gains of the test voice signals from the remote control device 200 and can grasp a position thereof and a position of the second display device 100_2 based on the received gains. For example, when the remote control device 200 is located at the closest distance from the first left speaker 185_1, the test voice signal output from the first left speaker 185_1 can have the greatest intensity, and the test voice signal output from the second right speaker 185_4 can have the smallest intensity. Each of the first display device 100_1 and the second display device 100_2 recognizes a position of each of speakers provided therein. Therefore, since the test voice signal output from the first left speaker 185_1 has the greatest intensity, the display device 100_1 can recognize that the first display device 100_1 is disposed on the left of the second display device 100_2, and since the test voice signal output from the second right speaker 185_4 can have the smallest intensity, the display device 100_1 can recognize that the second display device 100_2 is disposed on the right thereof. In this case, the first display device 100_1 can check that the placement of each of the display devices 100 is normal. When the placement of each of the display devices 100 is abnormal, the first display device 100_1 can display a screen placement guide window 731 as shown in FIG. 22 described later.

Next, FIG. 21 is described.

FIG. 21 is a diagram illustrating a method of checking a placement state of display devices through a camera provided in each of the display devices according to another embodiment of the present invention.

Referring to FIG. 21, the first display device 100_1 can be provided with a first camera 191_1 on an upper side thereof, and the second display device 100_2 can be provided with a second camera 191_2 on an upper side thereof. The first camera 191_1 and the second camera 191_2 can capture images of an object A located on the front thereof. The first display device 100_1 can grasp the placement of each of the display devices 100 by analyzing the images captured respectively by the cameras. That is, since a first image of the object A captured by the first camera 191_1 and a second image of the object A captured by the second camera 191_2 are captured at different angles, the first display device 100_1 can check the placement state of each of the display devices 100 by analyzing the first image and the second image.

Meanwhile, the display device 100 can further include a proximity sensor 160 on a side surface thereof. The proximity sensor 160 can be provided on one side surface through which the display device 100 corresponds to the other display device 100. For example, the proximity sensor 160 can be provided on each of a left surface and a right surface of the display device 100. Therefore, when the other display device 100 closely contacts the display device 100, the proximity sensor 160 can sense the other display device 100 closely contacting the display device 100. In an embodiment, when the control unit 170 of the first display device 100_1 senses through the proximity sensor 160 provided in the first display device 100_1 that the second display device 100_2 closely contacts the first display device 100_1, the first display device 100_1 can operate in a twin mode in which the first display device 100_1 and the second display device 100_2 are capable of being used as a combined screen as described above.

FIG. 22 is a diagram illustrating a placement guide window output when a placement state of the first display device and the second display device is abnormal according to an embodiment of the present invention.

In FIGS. 20 to 22, when the placement state of the first display device 100_1 and the second display device 100_2 is abnormal, the display devices 100 can respectively display placement guide windows 731 and 733. A user can change a placement of a display device through a placement guide window.

Next, an embodiment in which a screen link is performed will be described when a first display device 100_1 and a second display device 100_2, which are to be connected to each other, have different sizes (inches).

FIG. 23 is a diagram illustrating a process of performing a screen link when a size of a first display device is different from that of a second display device according to an embodiment of the present invention.

In FIG. 23, it is assumed that a size of a display unit 180 provided in a first display device 100_1 is smaller than that of a display unit 180 provided in a second display device 100_2.

Referring to (a) of FIG. 23, when the same content is input in display devices 100, the first display device 100_1 can display a partial video 311 of content 310, and the second display device 100_2 can the remaining video 313 of the content 310 according to a screen link request. Since the size of the second display device 100_2 is larger than that of the first display device 100_1, a user can feel inconvenience in viewing content.

Since a control unit 170 of the first display device 100_1 is capable of knowing the size information of the second display device 100_2 stored through operation S103 of sharing the device information, the control unit 170 can control the second display device 100_2 to automatically adjust a size of the remaining video 313 of the content 310 based on the size of the first display device 100_1. Specifically, the control unit 170 of the first display device 100_1 can transmit, to the second display device 100_2, a control command for adjusting the size of the remaining video 313 of the content 310 based on the size of the display unit 180 in the first display device 100_1 and outputting the adjusted size. The second display device 100_2 can scale the remaining video 313 of the content 310 through a scaler according to the received control command such that the size of the remaining video 313 corresponds to the size of the display unit 180 in the first display device 100_1. The second display device 100_2 can output the scaled remaining video 313 as shown in FIG. (b) of 23.

According to another embodiment of the present invention, in order to adjust a video deviation generated due to a difference in the sizes of the display devices 100, a deviation correction guideline 810, which is generated based on the size of the first display device 100_1, can be displayed on the second display device 100_2 as shown in (b) of FIG. 23. A user can adjust the remaining video 313 of the content 310 through the pointer 205 such that the remaining video 313 is displayed in accordance with the deviation correction guideline 810.

Next, embodiments, in which an optimized voice is automatically output according to a sound channel of each of display devices 100, will be described.

FIGS. 24 to 27 are diagrams illustrating various embodiments in which a voice is automatically adjusted and output according to a sound channel of each of display devices.

Figure 24:
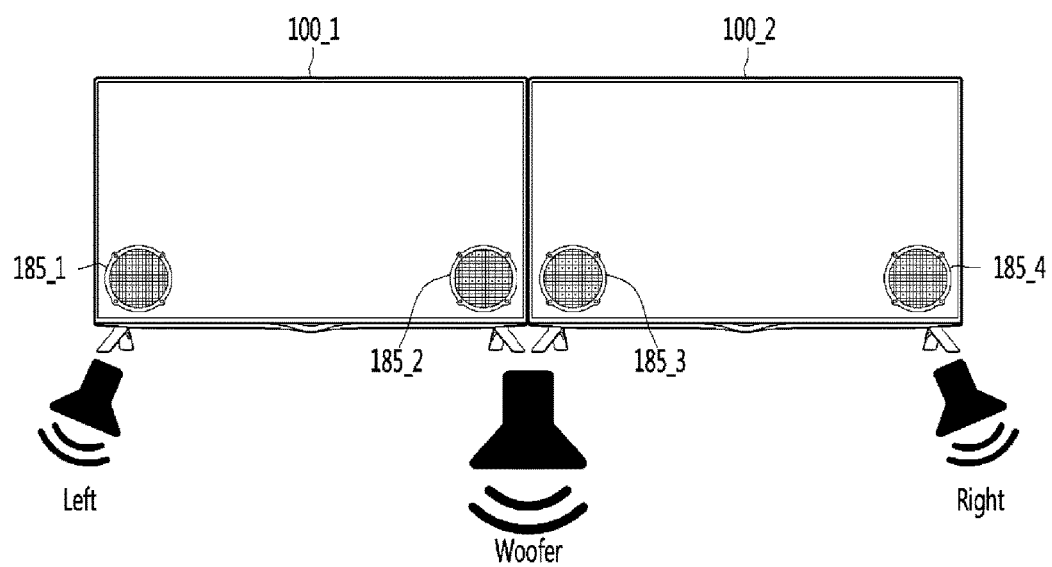
Figure 25:
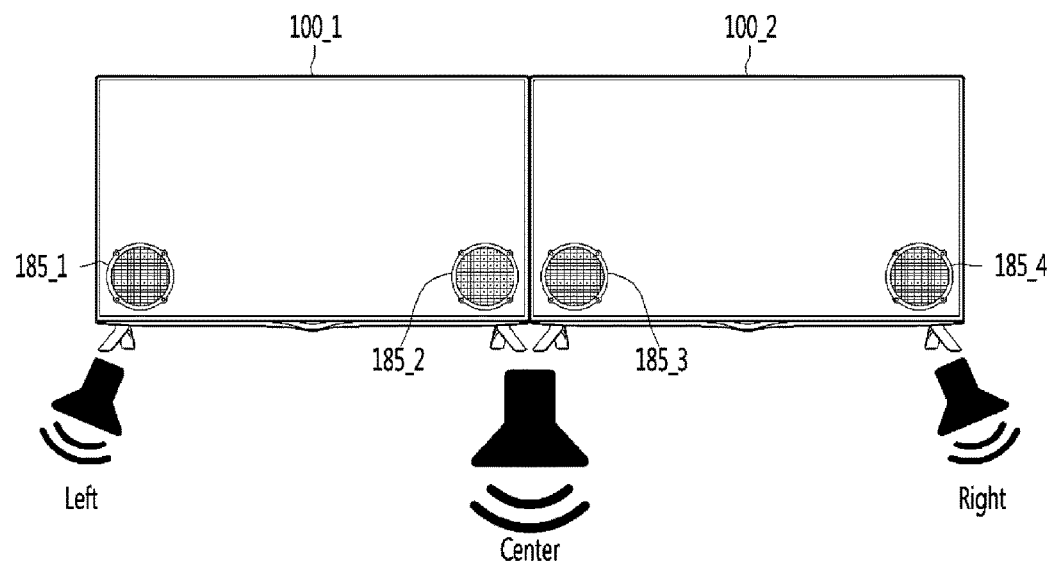

In FIGS. 24 and 25, it is assumed that a sound channel of each of display devices 100 is 2.1 channel, and screens thereof are linked to each other to output content. When the sound channel is 2.1 channel, each of the display devices 100 can include two speakers and one woofer.

Referring to FIG. 24, a first left speaker 185_1 can output an original left audio, and a second right speaker 185_4 can output an original right audio. A first right speaker 185_2 and a second left speaker 185_3 can output a low frequency register to make the same effect as if a woofer outputs an audio, thereby outputting a 2.1 channel sound.

Referring to FIG. 25, the first left speaker 185_1 can output an original left audio, and the second right speaker 185_4 can output an original right audio. The first right speaker 185_2 and the second left speaker 185_3 can mix the original left audio and the original right audio to output the mixed audio. The mixed audio of the original left audio and the original right audio can be referred to as a center audio. Therefore, the first right speaker 185_2 and the second left speaker 185_3 can output the center audio that is the mixed audio. This can make effect of outputting a 3.0 channel sound.

Figure 26:
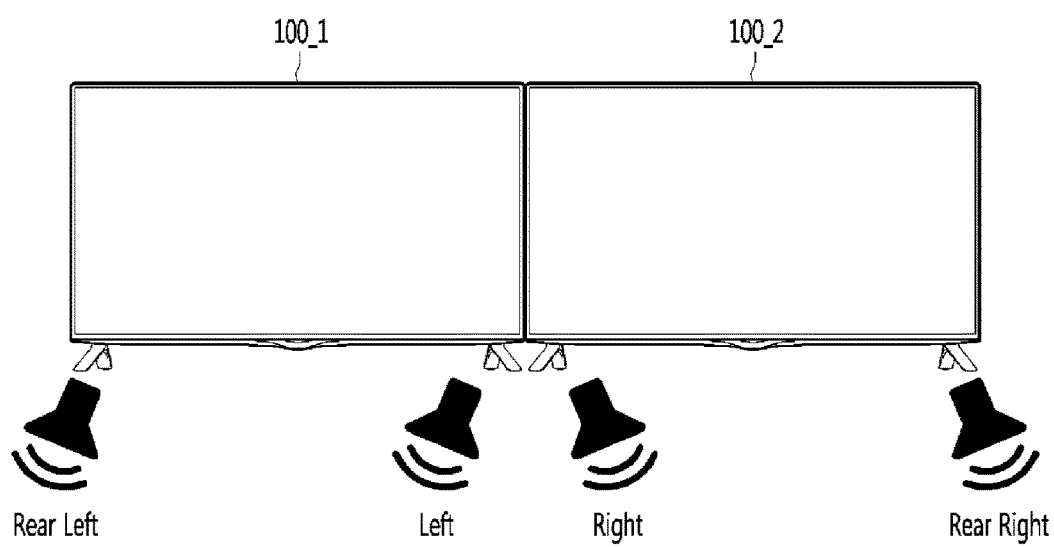
Figure 27:
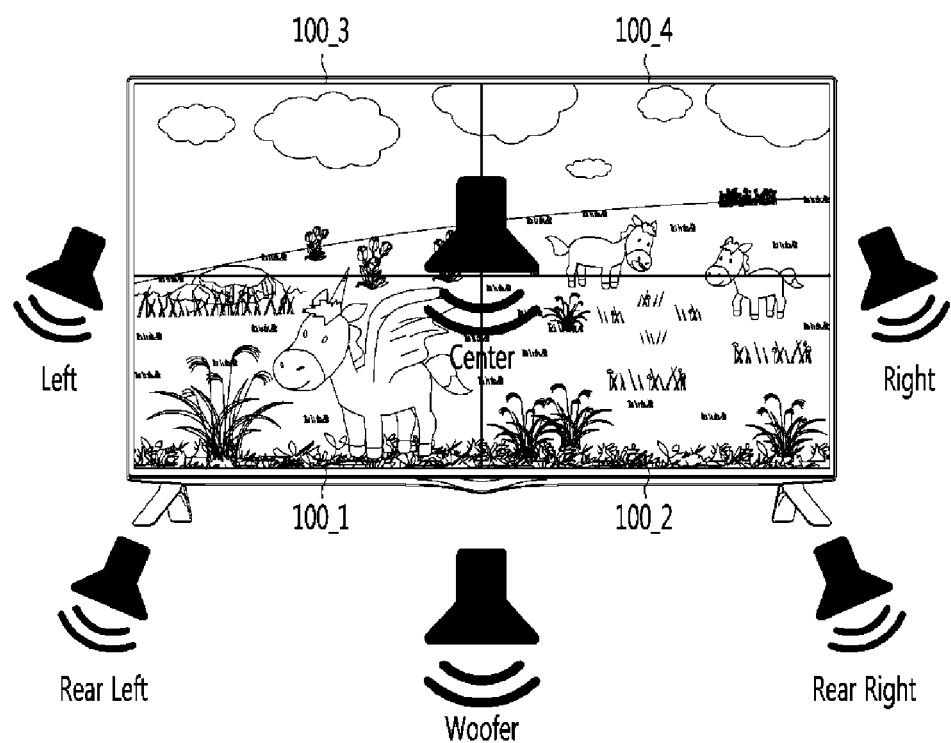

In FIGS. 26 and 27, it is assumed that the sound channel of each of the display devices 100 is 5.1 channel, and the screens thereof are linked to each other to output content. When the sound channel is 5.1 channel, each of the display devices 100 can include two speakers on the front thereof and two speakers on the rear thereof, one speaker on the center thereof, and a subwoofer having a reinforced low register audio. Audios output from the speakers on the front of each of the display devices 100 can be ignored. An audio output from a speaker disposed on the rear left side of the first display device 100_1 can be a left audio outputted so as to correspond to linked screens, and an audio output from a speaker disposed on the rear right side of the second display device 100_2 can be a right audio outputted so as to correspond to the linked screens. In addition, an audio output from a speaker disposed on the rear right side of the first display device 100_1 can be a left audio outputted so as to correspond to the linked screens, and an audio output from a speaker disposed on the rear right side of the second display device 100_2 can be a right audio outputted so as to correspond to the linked screens. This can make effect of outputting a virtual 4.0 channel sound.

Next, FIG. 27 is described.

FIG. 27 is a diagram illustrating an embodiment in which, when four display devices 100_1 to 100_4 are connected to one another, and screens thereof are linked to one another, a virtual 5.1 channel sound is outputted. That is, as described in the embodiment of FIG. 25, the third display device 100_3 and the fourth display device 100_4 can output a virtual 3.0 channel sound, and the first display device 100_1 and the second display device 100_2 can output a virtual 2.1 channel sound. This can make effect of outputting a virtual 5.1 channel sound by connecting four display devices.

Next, embodiments, in which, when a physical placement is distorted between a first display device and a second display device, a placement guideline is provided for guiding the alignment of the first display device and the second display device, will be described in FIG. 28 and FIG. 29.

FIG. 28 is a case where a display panel of each of display devices 100 is a flat panel, and FIG. 29 is a case where a display panel of each of the display devices 100 is a curved panel.

Referring to (a) of FIG. 28, a first display device 100_1 and a second display device 100_2 are in a state in which an angle between close contact surfaces thereof is distorted. When the first display device 100_1 and the second display device 100_2 enter a twin mode, the first display device 100_1 and the second display device 100_2 can respectively output a first placement guideline 801 and a second placement guideline 803 on screens thereof, respectively. The first and second placement guidelines 801 and 803 can be a line output so as to enable a user to easily perform a physical close contact between the display devices 100. The user can align the display devices 100 such that the first and second placement guidelines 801 and 803 are in line as shown in (b) of FIG. 28. An embodiment of FIG. 28 can also be applied to the curved panel shown in FIG. 29. The user can easily and accurately align the display devices 100 through a guideline manually.

In another embodiment, an embodiment, in which a diagonal guideline is provided for aligning a physical placement between the first display device and the second display device, will be described.

FIG. 30 illustrates screens on which diagonal guidelines are displayed according to an embodiment of the present invention.

FIG. 31 illustrates screens on which diagonal guidelines are aligned according to an embodiment of the present invention.

Referring to FIG. 30, the first display device 100_1 and the second display device 100_2 can respectively output a first diagonal guideline 811 and a second diagonal guideline 813 on screens thereof, respectively. The first diagonal guideline 811 and the second diagonal guideline 813 can be a line output so as to enable a user to easily perform a physical close contact between the display devices 100, and be a line for aligning the display devices 100 to physically and closely contact each other in a forward and backward direction. The user can align the display devices 100 such that the first and second diagonal guidelines 811 and 803 are in line as shown in FIG. 31. Therefore, the first display device 100_1 and the second display device 100_2 aligned such that the first and second diagonal guidelines 811 and 803 are in line can be aligned to closely contact each other in the forward and backward direction. Meanwhile, the above-described contents about the diagonal guidelines can be applied to the display devices 100 to which the curved panel is applied. In the case of the display devices 100 to which the curved panel is applied, a diagonal guideline corresponding to a curved curvature of the curved panel may be output on a screen.

Next, when a video with respect to one piece of content is displayed on a combined screen of display devices 100, a correction of an output video will be described.

First, when the display devices 100 display a combined screen displaying a partial video of one piece of content and the remaining video thereof, a screen distortion generated due to a bezel corresponding to a close contact surface of each of the display devices 100 will be described.

FIG. 32 illustrates a combined screen according to an embodiment of the present invention.

Referring to FIG. 32, a first display device 100_1 and a second display device 100_2 can display second content 330 that is one piece of content. For example, a display unit 180 of the first display device 100_1 can display a partial video 331 of the second content 330, and a display unit 180 of the second display device 100_2 can display the remaining video 333 of the second content 330. In this case, due to a right bezel of the first display device 100_1 and a left bezel of the second display device 100_2, which respectively correspond to surfaces through which the first display device 100_1 and the second display device 100_2 closely contact with each other, the partial video 331 of the second content 330 and the remaining video 333 thereof can not be smoothly displayed. Such a screen distortion phenomenon can hinder a user from viewing content as the bezel of each of the display devices 100 becomes thicker.

FIG. 33 is a flowchart of a video correction process of displaying a combined screen according to an embodiment of the present invention.

Referring to FIG. 33, when a first display device 100_1 and a second display device 100_2 display one piece of content on a combined screen (S401), the first display device 100_1 and the second display device 100_2 respectively delete partial screen regions corresponding to bezel regions from a partial video and the remaining video of one piece of the content (S403). The first display device 100_1 and the second display device 100_2 respectively display the partial video and the remaining video, from which the partial screen regions are deleted (S405).

This will be described with reference to FIGS. 34 and 35.

FIG. 34 illustrates partial screen regions corresponding to bezel regions according to an embodiment of the present invention.

FIG. 35 illustrates a combined screen in which the partial screen regions are deleted according to an embodiment of the present invention.

Referring to FIG. 34, the first display device 100_1 and the second display device 100_2 can display second content 330 that is one piece of content. The display unit 180 of the first display device 100_1 can display a partial video 331 of the second content 330, and the display unit 180 of the second display device 100_2 can display the remaining video 333 of the second content 330. The control unit 170 of the first display device 100_1 can delete a first partial region 415, i.e., a partial region corresponding to the bezel region from the partial video 331 of the second content 330. The control unit 170 of the second display device 100_2 can delete a second partial region 417, i.e., a partial region corresponding to the bezel region from the remaining video 333 of the second content 330. Here, the deleted first partial region 415 can have a size corresponding to a size of a right bezel in the first display device 100_1, and the deleted second partial region 417 can have a size corresponding to a size of a left bezel in the second display device 100_2. As shown in FIG. 35, the control unit 170 of the first display device 100_1 can display the partial video 331 of the second content 330 on the display unit 180 of the first display device 100_1, the first partial region 415 being deleted from the partial video 331. The control unit 170 of the second display device 100_2 can display the remaining video of the second content 330 on the display unit 180 of the second display device 100_2, the second partial region 417 being deleted from the remaining video 333. As described above, since each of the display devices 100 deletes a partial region of an output video to display the output video, it is possible to correct a screen distortion generated due to a bezel corresponding to a close contact surface of each of the display devices 100. Meanwhile, the control unit 170 of each of the display devices 100 may delete a partial region of a video output so as to correspond to a bezel thickness of each of the display devices 100.

Next, when a plurality of display devices 100 operate in a twin mode, an operation according to a user input with respect to a pointer will be described.

FIG. 36 is a flowchart illustrating an operating method of a display device according to a user input with respect to a pointer of the display device according to an embodiment of the present invention.

Referring to FIG. 36, each of a plurality of display devices 100 operates in a twin mode (S510).

For example, a first display device 100_1 and a second display device 100_2 can operate in the twin mode.

The twin mode may be a mode in which a first screen of the first display device 100_1 and a second screen of the second display device 100_2 are linked to each other and used as one combined screen or be a mode in which different screens are respectively displayed on the first screen of the first display device 100_1 and the second screen of the second display device 100_2. Since this has been described in detail, a detailed description thereof will be omitted.

At least one display device 100 of the plurality of display devices 100 can acquire a pointer display input for displaying a pointer 205 (S520).

At least one display device 100 of the plurality of display devices 100 operating in the twin mode can acquire the pointer display input for displaying the pointer 205 on a screen thereof. Here, at least one display device 100 acquiring the pointer display input for displaying the pointer 205 may be a display device 100 of the plurality of display devices 100, which operates as a master device, or be a display device 100 of the plurality of display devices 100, which operates as a slave device.

In an embodiment, when at least one display device 100 of the plurality of display devices 100 operating in the twin mode receives a signal with respect to a movement of a remote control device 200 from the remote control device 200, at least one display device 100 can acquire the received signal with respect to the movement of the remote control device 200 as the pointer display input for displaying the pointer 205.

In another embodiment, when at least one display device 100 of the plurality of display devices 100 operating in the twin mode receives an operation signal with respect to an operation of a user input unit 230 in the remote control device 200 from the remote control device 200, at least one display device 100 can acquire the received operation signal of the remote control device 200 as the pointer display input for displaying the pointer 205.

In another embodiment, at least one display device 100 of the plurality of display devices 100 operating in the twin mode can recognize a movement of a specific body part of a user through a camera and acquire the recognized movement of the specific body part of the user as the pointer display input for displaying the pointer 205. For example, the specific body part of the user may be the user's hand.

In another embodiment, when at least one display device 100 of the plurality of display devices 100 operating in the twin mode receives an acquired signal with respect to a specific voice of a user from the remote control device 200, at least one display device 100 can acquire the received signal of the specific voice of the user as the pointer display input for displaying the pointer 205.

Meanwhile, when at least one display device 100 of the plurality of display devices 100 operating in the twin mode acquires the pointer display input for displaying the pointer 205, at least one display device 100 may transmit a signal with respect to the acquired pointer display input to the other display device 100. For example, at least one display device 100 of the plurality of display devices 100 acquiring the pointer display input can transmit the signal with respect to the acquired pointer display input to the other display device 100 through a twin service management unit 920. Since this has been described in detail, a detailed description thereof will be omitted.

One display device 100 of the plurality of display devices 100 plays the pointer 205 on a screen of a display unit 180 (S530) and acquires a user input with respect to the displayed pointer 205 (S540).

One display device 100 of the plurality of display devices 100 operating in the twin mode can display the pointer 205 on the screen of the display unit 180.

In an embodiment, when the plurality of display devices 100 operating in the twin mode are configured with a first display device 100_1 and a second display device 100_2, the pointer 205 can be displayed on a screen of a display unit 180 in the first display device 100_1.

In another embodiment, when the plurality of display devices 100 operating in the twin mode are configured with the first display device 100_1 and the second display device 100_2, the pointer 205 can be displayed on a screen of a display unit 180 in the second display device 100_2.

Meanwhile, one display device 100 of the plurality of display devices 100 operating in the twin mode, which displays the pointer 205, can be a preset display device, and a position of the pointer 205 displayed on the screen of the display unit 180 in one display device 100 may be a preset position on the screen of the display unit 180.

The plurality of display devices 100 operating in the twin mode can acquire a user input with respect to the pointer 205 displayed on one display device 100 of the plurality of display devices 100.

Here, the user input with respect to the pointer 205 can include at least one of an input for moving the pointer 205, a selection input with respect to a point corresponding to the pointer 205, a drag input with respect to the pointer 205, and a drag and drop input with respect to the pointer 205. The selection input with respect to the point corresponding to the pointer 205 can include at least one of a click input with respect to the point corresponding to the pointer 205, a double click input with respect to the point corresponding to the pointer 205, and a press and hold input with respect to the point corresponding to the pointer 205.

Meanwhile, when one display device 100 of the plurality of display devices 100 operating in the twin mode acquires the user input with respect to the pointer 205 displayed thereon, the one display device 100 may transmit a signal with respect to the acquired user input to the other display device 100. For example, the display device 100 of the plurality of display devices 100, which acquires the user input with respect to the pointer 205 displayed thereon, can transmit the signal with respect to the acquired user input to the other display device 100 through the twin service management unit 920. Since this has been described in detail, a detailed description thereof will be omitted.

When the pointer 205 is displayed, at least one display device 100 of the plurality of display devices 100 operating in the twin mode can display guide information on the screen thereof, the guide information notifying that a combined screen according to a twin mode operation is capable of being displayed.

An embodiment thereof will be described with reference to FIG. 37A.

FIG. 37A illustrates a screen displaying guide information on a combined screen display according to an embodiment of the present invention.

Referring to FIG. 37A, a control unit 170 of a first display device 100_1 can display first content 310 on a first display unit 180_1, and a control unit 170 of a second display device 100_2 can display second content 330 on a second display unit 180_2. When the control unit 170 of the first display device 100_1 acquires a pointer display input for displaying a pointer 205, the control unit 170 can display the pointer 205 on a screen displaying the first content 310. The control unit 170 of the first display device 100_1 can display, on the first display unit 180_1, a guide window 741 notifying that a combined screen according to a twin mode operation can be displayed. For example, the control unit 170 of the first display device 100_1 can display guide information and an arrow with respect to a drag direction on the guide window 741, the guide information notifying that, when a partial region of the screen displaying the first content 310 is dragged to a screen displaying the second content 330 by using the pointer 205, the screens can be converted into a combined screen, i.e., a large screen. When the pointer 205 is displayed on the second display unit 180_2, the control unit 170 of the second display device 100_2 may display, on the second display unit 180_2, a guide window 741 notifying that the combined screen can be displayed.

Another embodiment will be described with reference to FIG. 37B.

FIG. 37B is an illustrative diagram of a combined screen icon display according to an embodiment of the present invention.

Referring to FIG. 37B, the control unit 170 of the first display device 100_1 can display first content 310 on the first display unit 180_1, and the control unit 170 of the second display device 100_2 can display second content 330 on the second display unit 180_2. When the control unit 170 of the first display device 100_1 acquires a pointer display input for displaying the pointer 205, the control unit 170 can display the pointer 205 on a screen displaying the first content 310. The control unit 170 of the first display device 100_1 can display, on the first display unit 180_1, a combined screen icon 742 for displaying a combined screen according to a twin mode operation. When at least one of the first display device 100_1 and the second display device 100_2 acquires a user input for clicking the combined screen icon 742 with the pointer 205, the first content 310 can be displayed on a large screen, i.e., the combined screen. In addition, the control unit 170 of the first display device 100_1 can display a video zoom-in icon 744 on the first display unit 180_1. When at least one of the first display device 100_1 and the second display device 100_2 acquires a user input for clicking the video zoom-in icon 744 with the pointer 205, a magnified video with respect to a selected region of the first content 310 can be displayed on the second display device 100_2. This will be described later. Meanwhile, when the pointer 205 is placed on the second display unit 180_2, the control unit 170 of the second display device 100_2 can display the combined screen icon 742 and the video zoom-in icon 744 described above and perform an operation corresponding to a user input with respect to the displayed combined screen icon 742 or the displayed video zoom-in icon 744.

FIG. 37C is an illustrative diagram of a combined screen icon display according to another embodiment of the present invention.

Referring to FIG. 37C, the control unit 170 of the first display device 100_1 can display first content 310 on the first display unit 180_1, and the control unit 170 of the second display device 100_2 can display second content 330 on the second display unit 180_2. When the control unit 170 of the first display device 100_1 acquires a pointer display input for displaying the pointer 205, the control unit 170 can display the pointer 205 on a screen displaying the first content 310. The control unit 170 of the first display device 100_1 can display, on the first display unit 180_1, a combined screen icon 748 for displaying a combined screen according to a twin mode operation. When at least one of the first display device 100_1 and the second display device 100_2 acquires a user input for clicking the combined screen icon 748 with the pointer 205, the first content 310 can be displayed on a large screen, i.e., the combined screen. In addition, the control unit 170 of the first display device 100_1 can display a content list icon 749 on the first display unit 180_1. When at least one of the first display device 100_1 and the second display device 100_2 acquires a user input for clicking the content list icon 749 with the pointer 205, a content list with respect to one or more pieces of content can be displayed on the second display device 100_2. Here, the display of the content list can include a display of information on an electronic program guide (EPG) with respect to a broadcast channel. Meanwhile, when the pointer 205 is placed on the second display unit 180_2, the control unit 170 of the second display device 100_2 can display the combined screen icon 748 and the content list icon 749 described above and perform an operation corresponding to a user input with respect to the displayed combined screen icon 748 or the displayed content list icon 749.

On the other hand, the plurality of display devices 100 according to the present invention may display guide information on at least one of the plurality of display devices 100, the guide information notifying that the plurality of display devices 100 can respectively display split screens displaying different videos during a display of the combined screen.

FIG. 37D is an illustrative diagram of a split screen icon display according to an embodiment of the present invention.

Referring to FIG. 37D, the control unit 170 of the first display device 100_1 can display a partial video 312 of first content 310 on a whole screen of the first display unit 180_1, and the control unit 170 of the second display device 100_2 can display the remaining video 314 of the first content 310 on a whole screen of the second display unit 180_2. When the control unit 170 of the first display device 100_1 acquires a pointer display input for displaying the pointer 205, the control unit 170 can display the pointer 205 on a screen displaying the first content 310. The control unit 170 of the first display device 100_1 can display, on the second display unit 180_2, a split screen icon 743 for allowing the plurality of display devices 100 to respectively output different videos. When at least one of the first display device 100_1 and the second display device 100_2 acquires a user input for clicking the split screen icon 743 with the pointer 205, different videos can be displayed on the first display device 100_1 and the second display device 100_2, respectively. Here, at least one display device 100 of the first display device 100_1 and the second display device 100_2 can display the first content 310. In addition, the second display device 100_2 can display a video zoom-in icon 744, and when the second display device 100_2 acquires a user input for clicking the video zoom-in icon 744 with the pointer 205, a magnified video with respect to a selected region of the first content 310 can be displayed on the second display device 100_2. This will be described later. In addition, the second display device 100_2 can display a record icon 746 for recording played content, and when the second display device 100_2 acquires a user input for clicking the record icon 746 with the pointer 205, the second display device 100_2 can record the first content 310. In addition, the first display device 100_1 can display a playback time icon 747 for displaying videos having different playback times with respect to the same content. When the first display device 100_1 acquires a user input for clicking the playback time icon 747 with the pointer 205, videos having different playback times with respect to the first content 310 can be respectively displayed on the first display device 100_1 and the second display device 100_2. This will be described later.

As described above, according to a user or a designer, a guide window with respect to the guide information described above may be displayed on the second content 330 displayed by the first display device 100_1 as well as the second display device 100_2.

FIG. 36 will be described again.

At least one display device 100 of the plurality of display devices 100 performs an operation corresponding to the acquired user input with respect to the pointer 205 (S550).

At least one display device 100 of the plurality of display devices 100 can perform various operations related to the display device 100 through the operation corresponding to the acquired user input with respect to the pointer 205.

For example, at least one display device 100 of the plurality of display devices 100 can perform at least one of a combined screen display operation with respect to one piece of content or one application, a screen size adjustment operation with respect to a combined screen or each of a plurality of screens output in a twin mode, a screen movement operation with respect to the combined screen or each of the plurality of screens output in the twin mode, and a volume adjustment operation of an audio output unit 185 through the operation corresponding to the acquired user input with respect to the pointer 205. Here, the volume adjustment operation of the audio output unit 185 may mean an operation of adjusting a gain of a voice signal.

This will be described in detail through a specific embodiment.

In a first embodiment, a screen size adjustment will be described with reference to FIGS. 38 to 41 as an operation corresponding to a user input with respect to a pointer 205.

FIG. 38 is an illustrative diagram of a screen size adjustment operation according to an embodiment of the present invention.

Referring to FIG. 38, a first control unit 170_1 of a first display device 100_1 can display first content 310 on a first display unit 180_1 and display a pointer 205 on a screen with respect to the displayed first content 310. A second control unit 170_2 of a second display device 100_2 can display second content 330 on a second display unit 180_2. At least one of the first control unit 170_1 and the second control unit 170_2 can acquire a user input for dragging and dropping the displayed pointer 205 from a partial region of the screen with respect to the first content 310 to a screen with respect to the second content 330. Accordingly, the first control unit 170_1 of the first display device 100_1 can display a partial video 315 of the first content 310 on a screen of the first display unit 180_1 in response to a drag distance of the user input for dragging and dropping. Here, the partial video 315 of the first content 310 displayed on the first display unit 180_1 may be a partial screen of a video, in which a screen size is magnified compared to that before the user input for dragging and dropping. The second control unit 170_2 of the second display device 100_2 can display the remaining video 316 of the first content 310 and the second content 330 on a screen of the second display unit 180_2 in response to the drag distance of the user input for dragging and dropping. Here, a video with respect to the second content 330 displayed on the second display unit 180_2 may be a video, in which a screen size is reduced compared to that before the user input for dragging and dropping. The video with respect to the second content, in which the screen size is reduced, may have an aspect ratio equal to or different from that before the magnification.

Meanwhile, the screen size adjustment operation corresponding to the user input with respect to the pointer 205 can be applied to a screen with respect to content as well as a screen with respect to an application. This will be described with reference to FIG. 39.

FIG. 39 is an illustrative diagram of a screen size adjustment operation according to another embodiment of the present invention.

Referring to FIG. 39, the control unit 170 of the first display device 100_1 can display first content 310 on the first display unit 180_1 and display the pointer 205 on a screen with respect to the displayed first content 310. The control unit 170 of the second display device 100_2 can display a web browser screen 350 with respect to a web browser application on the second display unit 180_2. Here, the web browser screen 350 can be a web browser screen with respect to a PC version or a whole screen version.

At least one of the first control unit 170_1 and the second control unit 170_2 can acquire a user input for dragging and dropping the displayed pointer 205 from a partial region of the screen with respect to the first content 310 to the web browser screen 350. Accordingly, the control unit 170 of the first display device 100_1 can display a partial video 315 of the first content 310 on a screen of the first display unit 180_1 in response to a drag distance of the user input for dragging and dropping. Here, the partial video 315 of the first content 310 displayed on the first display unit 180_1 may be a partial screen of a video, in which a screen size is magnified compared to that before the user input for dragging and dropping. The control unit 170 of the second display device 100_2 can display the remaining video 316 of the first content 310 and a changed web browser screen 355 on the screen of the second display unit 180_2 in response to the drag distance of the user input for dragging and dropping. Here, the changed web browser screen 355 may be a web browser screen with respect to a mobile version or a reduced screen version.

Meanwhile, at least one display device 100 of the plurality of display devices 100 operating in the twin mode can display a reference line indicating an aspect ratio to be adjusted on the display unit 180 in response to a user input for adjusting a screen size.

This will be described with reference to FIG. 40A.

FIG. 40A illustrates a reference line indicating an aspect ratio to be adjusted according to an embodiment of the present invention.

Referring to FIG. 40A, the control unit 170 of at least one display device 100 of the plurality of display devices 100 operating in the twin mode can display one or more reference lines 791 and 793 indicating an aspect ratio to be adjusted on the display unit 180 in response to a user input for adjusting a screen size. Here, the user input for adjusting the screen size may be a user input for dragging and dropping the pointer 205. Therefore, when the control unit 170 of at least one display device 100 of the plurality of display devices 100 operating in the twin mode acquires the user input for dragging the pointer 205, the control unit 170 can display one or more reference lines 791 and 793 indicating the aspect ratio to be adjusted on the display unit 180. Specifically, when the control unit 170 of at least one of the first display device 100_1 and the second display device 100_2 acquires a user input for dragging the pointer 205 displayed on the first display unit 180_1, the control unit 170 can display a first reference line 791 and a second reference line 793 on the second display unit 180_2. Here, the first reference line 791 may be a reference line indicating a point at which a screen with respect to selected content is capable of being displayed at an aspect ratio of 21:9 according to the user input for dragging and dropping the pointer 205, and the second reference line 793 may be a reference line indicating a point at which the screen with respect to the selected content is capable of being displayed at an aspect ratio of 32:9 according to the user input for dragging and dropping the pointer 205. The control unit 170 of the second display device 100_2 may display an aspect ratio to be adjusted, i.e., "21:9" on the first reference line 791 displayed on the second display unit 180_2 and display an aspect ratio name pointing to a screen according to an aspect ratio of 21:9. In addition, the control unit 170 of the second display device 100_2 may display an aspect ratio to be adjusted, i.e., "32:9" on the second reference line 793 displayed on the second display unit 180_2 and display an aspect ratio name pointing to a screen according to an aspect ratio of 32:9.

When the control unit 170 of at least one of the first display device 100_1 and the second display device 100_2 acquires a user input for dragging and dropping the pointer 205, which corresponds to a displayed reference line, the control unit 170 can display a screen corresponding to a dragged region at an aspect ratio corresponding to the reference line.

In an embodiment, when the control unit 170 of at least one of the first display device 100_1 and the second display device 100_2 acquires a user input for dragging and dropping the pointer 205 to the first reference line 791, the first display device 100_1 and the second display device 100_2 can display a screen having an aspect ratio of 21:9 with respect to the first content 310. Here, the screen having the aspect ratio of 21:9 with respect to the first content 310 may be the combined screen described above.

In another embodiment, when the control unit 170 of at least one of the first display device 100_1 and the second display device 100_2 acquires a user input for dragging and dropping the pointer 205 to the second reference line 793, the first display device 100_1 and the second display device 100_2 can display a screen having an aspect ratio of 32:9 with respect to the first content 310. Here, the screen having the aspect ratio of 32:9 with respect to the first content 310 may be the combined screen described above.

In addition, at least one display device 100 of the plurality of display devices 100 operating in the twin mode can display a thumbnail image on the display unit 180 in response to a user input for adjusting a screen size, the thumbnail image indicating a preview video which corresponds to an aspect ratio to be adjusted.

This will be described with reference to FIG. 40B.

FIG. 40B illustrates a thumbnail image indicating a preview video which corresponds to an aspect ratio to be adjusted according to an embodiment of the present invention.

Referring to FIG. 40B, the control unit 170 of at least one display device 100 of the plurality of display devices 100 operating in the twin mode can display a thumbnail image 794 on the display unit 180 in response to a user input for adjusting a screen size, the thumbnail image 794 indicating a preview video which corresponds to an aspect ratio to be adjusted. Here, the user input for adjusting the screen size may be a user input for dragging and dropping the pointer 205. The control unit 170 of at least one display device 100 of the plurality of display devices 100 operating in the twin mode can display a video displayed on the thumbnail image 794 indicating the preview video by adjusting an aspect ratio of the video in response to the user input for dragging and dropping.

The descriptions of the reference lines indicating the aspect ratio to be adjusted and the thumbnail image indicating the preview video are examples for description, and the present invention is not limited thereto. Therefore, reference lines having various ratios and or a thumbnail image can be applied to the present invention according to a user or a designer.

Meanwhile, when a combined screen is displayed with respect to one piece of content or one application, the plurality of display devices 100 operating in the twin mode can adjust a size of the combined screen through an operation corresponding to a user input with respect to the pointer 205. For example, each of the plurality of display devices 100 acquires a user input for dragging and dropping a partial region of the left or the right of the combined screen with the pointer 205, the size of the combined screen can be adjusted in response to the acquired user input. Here, the partial region of the left or the right of the combined screen can mean a partial region from a left outermost side or a right outermost side of the combined screen. In addition, the user input with respect to the pointer 205 may be a user input with respect to a key such as an arrow key of the remote control device 200.

This will be described with reference to FIG. 41.

FIG. 41 is an illustrative diagram of a size adjustment operation of a combined screen according to an embodiment of the present invention.

Referring to FIG. 41, the control unit 170 of the first display device 100_1 can output a partial video 311 of first content 310 through the display unit 180 of the first display device 100_1, and the control unit 170 of the second display device 100_2 can output the remaining video 313 of the first content 310 through the display unit 180 of the second display device 100_2. Therefore, a whole video of the first content 310 can be output on a combined screen in which screens of the two display devices 100 are combined into one. The control unit 170 of at least one of the first display device 100_1 and the second display device 100_2 can acquire a user input for dragging and dropping a right partial region 413 of the combined screen with respect to the first content 310 with the pointer 205. The control unit 170 of at least one of the first display device 100_1 and the second display device 100_2 can adjust a size of the combined screen with respect to the first content 310 in response to the acquired user input for dragging and dropping. For example, the first control unit 170 of at least one of the first display device 100_1 and the second display device 100_2 can display the first content 310 on whole screens of the first display unit 180_1 and the second display unit 180_2 in response to a drag distance of the user input for dragging and dropping. Therefore, the control unit 170 of the first display device 100_1 can display a partial video 312 of the first content 310 on the whole screen of the first display unit 180_1, and the control unit 170 of the second display device 100_2 can display the remaining video 314 of the first content 310 on the whole screen of the second display unit 180_2.

In a second embodiment, a combined screen display operation with respect to one piece of content or an application will be described with reference to FIG. 42 as an operation corresponding to a user input with respect to the pointer 205.

FIG. 42 is an illustrative diagram of a combined screen display operation according to an embodiment of the present invention.

Referring to FIG. 42, the control unit 170 of the first display device 100_1 can display first content 310 on the first display unit 180_1 and display the pointer 205 on a screen with respect to the displayed first content 310. The control unit 170 of the second display device 100_2 can display second content 330 on the second display unit 180_2. At least one of the first control unit 170_1 and the second control unit 170_2 can acquire a user input for dragging and dropping the displayed pointer 205 so as to cross a change reference line 790 of a screen with respect to the second content 330 from a partial region of the screen with respect to the first content 310 as a user input for displaying a combined screen with respect to the first content 310. The control unit 170 of the first display device 100_1 can output a partial video 311 of the first content 310 on the first display unit 180_1 of the first display device 100_1, and the control unit 170 of the second display device 100_2 can output the remaining video 313 of the first content 310 on the second display unit 180_2 of the second display device 100_2. Therefore, a whole video of the first content 310 can be output on a combined screen in which screens of the two display devices 100 are combined into one. Here, the change reference line 790 may or may not be displayed on the first display unit 180_1 or the second display unit 180_2. Meanwhile, when at least one of the first control unit 170_1 and the second control unit 170_2 receives a user input for dragging and dropping the pointer 205 so as not to cross the change reference line 790 of the screen with respect to the second content 330 from the partial region of the screen with respect to the first content 310, at least one of the first control unit 170_1 and the second control unit 170_2 may not display the combined screen with respect to the first content 310.

In a third embodiment, a screen movement operation with respect to a combined screen or each of a plurality of screens output in a twin mode will be described with reference to FIG. 43 as an operation corresponding to a user input with respect to the pointer 205.

FIG. 43 is an illustrative diagram of a combined screen movement operation according to an embodiment of the present invention.

Referring to FIG. 43, the control unit 170 of the first display device 100_1 can output a partial video 311 of first content 310 on the first display unit 180_1 of the first display device 100_1, and the control unit 170 of the second display device 100_2 can output the remaining video 313 of the first content 310 on the second display unit 180_2 of the second display device 100_2. Therefore, a whole video of the first content 310 can be output on a combined screen in which screens of the two display devices 100 are combined into one. The control unit 170 of at least one of the first display device 100_1 and the second display device 100_2 can acquire a user input for dragging and dropping a partial region of a combined screen with respect to the first content 310 with the pointer 205. The control unit 170 of at least one of the first display device 100_1 and the second display device 100_2 can move the combined screen with respect to the first content 310 in response to the acquired user input for dragging and dropping. The first display device 100_1 and the second display device 100_2 can move a video with respect to the first content 310 in a left direction corresponding to the user input for dragging and dropping, and output the moved video on the display units 180. Therefore, the control unit 170 of the first display device 100_1 can display a changed partial screen 315 with respect to the first content 310 on the first display unit 180_1, and the control unit 170 of the second display device 100_2 can display the changed remaining screen 316 with respect to the first content 310 on the second display unit 180_2. Here, each of the changed partial screen 315 and the changed remaining screen 316 may be a screen with respect to the first content 310 moved in the left direction corresponding to the acquired user input for dragging and dropping.

In a fourth embodiment, a volume adjustment operation of an audio output unit 185 will be described with reference to FIGS. 185 to 44 as an operation corresponding to a user input with respect to the pointer 205.

FIG. 44 illustrates a speaker volume adjustment region corresponding to a position of a pointer according to an embodiment of the present invention.

Referring to FIG. 44, on a screen of the first display unit 180_1 in the first display device 100_1, a first left speaker region 411 may be a region for adjusting a volume of a first left speaker 185_1, and a first right speaker region 412 may be a region for adjusting a volume of a first right speaker 185_2. On a screen of the second display unit 180_2 in the second display device 100_2, a second left speaker region 413 may be a region for adjusting a volume of a second left speaker 185_3, and a second right speaker region 414 may be a region for adjusting a volume of a second right speaker 185_4.

When the pointer 205 is placed in one of the first left speaker region 411, the first right speaker region 412, the second left speaker region 413, and the second right speaker region 414, and a user input for adjusting a volume is acquired, the first control unit 170_1 and the second control unit 170_2 can adjust a volume of a speaker corresponding to a region in which the pointer 205 is placed.

An embodiment will be described with reference to FIGS. 45 and 46.

FIG. 45 illustrates a volume adjustment input with respect to a first left speaker according to an embodiment of the present invention.

FIG. 46 illustrates a volume adjustment operation with respect to the first left speaker according to an embodiment of the present invention.

Referring to FIG. 45, at least one of the first control unit 170_1 and the second control unit 170_2 can acquire a user input for raising a volume from a remote control device 200 in a state in which the pointer 205 is placed in a left speaker region 411 of the first display device 100_1. Therefore, as shown in FIG. 46, the first control unit 170_1 can raise a volume of a first left speaker 185_1 in response to the user input for raising the volume. Here, an operation of raising the volume of the first speaker 185_1 can mean an operation of raising a gain of a voice signal output through the first left speaker 185_1. Meanwhile, for a certain time after the acquisition of the user input for raising the volume, the first control unit 170_1 and the second control unit 170_2 can mute a first right speaker 185_2, a second left speaker 185_3, and a second right speaker 185_4, except for the first left speaker 185_1 in response to the user input for raising the volume. Therefore, as shown in FIG. 46, the first control unit 170_1 can raise the volume of the first left speaker 185_1 and mute the first right speaker 185_2. The second control unit 170_2 can mute the second left speaker 185_3 and the second right speaker 185_4

Another embodiment will be described with reference to FIGS. 47 and 48.

FIG. 47 illustrates a volume adjustment input with respect to a first right speaker and a second left speaker according to an embodiment of the present invention.

FIG. 48 illustrates a volume adjustment operation with respect to the first right speaker and the second left speaker according to an embodiment of the present invention.

Referring to FIG. 47, when a user input for raising a volume is acquired, and the pointer 205 is placed in at least one of a first right speaker region 412 and a second left speaker region 413 respectively corresponding to a first right speaker 185_2 and a second left speaker 185_3, which output a woofer or a center audio, the first control unit 170_1 and the second control unit 170_2 can respectively raise volumes of the first right speaker 185_2 and the second left speaker 185_3. Therefore, as shown in FIG. 48, the first control unit 170_1 and the second control unit 170_2 can respectively raise the volumes of the first right speaker 185_2 and the second left speaker 185_3, which output the woofer or the center audio. For a certain time after the acquisition of the user input for raising the volume, the first control unit 170_1 and the second control unit 170_2 can mute a first left speaker 185_1 and a second right speaker 185_4, except for the first right speaker 185_2 and the second left speaker 185_3 in response to the user input for raising the volume. Since this has been described in detail, a detailed description thereof will be omitted.

Meanwhile, each of the display devices 100 according to the present invention can output only an audio output of one display device 100 of the plurality of display devices 100 in response to a position of the pointer 205. For example, when the pointer 205 is displayed on the display unit 180 of the first display device 100_1 of the first display device 100_1 and the second display device 100_2, the control unit 170 of the first display device 100_1 can control the audio output unit 185 of the first display device 100_1 to output an audio, and the control unit 170 of the second display device 100_2 can control the audio output unit 185 of the second display device 100_2 not to output an audio. Therefore, the first left speaker 185_1 and the first right speaker 185_2 included in the first display device 100_1 may output a voice signal, and the second left speaker 185_3 and the second right speaker 185_4 included in the second display device 100_2 may not output a voice signal.

In addition, each of the display devices 100 according to the present invention can change a broadcast channel displayed by one display device 100 of the plurality of display devices 100 in response to the position of the pointer 205. For example, in the case where the pointer 205 is displayed on the display unit 180 of the first display device 100_1 of the first display device 100_1 and the second display device 100_2, when a channel change input is input, the control unit 170 of the first display device 100_1 may change a channel displayed on the first display unit 180_1, and the control unit 170 of the second display device 100_2 may not change a channel displayed on the second display unit 180_2.

Meanwhile, each of the display devices 100 according to the present invention can display an information display window with respect to a variety of information related to the display device 100 in a black region. Here, the information display window can mean an on screen display (OSD) displayed on the display unit 180. For example, the information display window can include at least one of an infobox displaying information on a displayed channel and a channel list displaying channel information on a plurality of channels. The black region can mean a region of the screen in the display unit 180, in which a video is not displayed.

An embodiment will be described with reference to FIG. 49.

FIG. 49 illustrates a screen on which an infobox is displayed according to an embodiment of the present invention.

Referring to FIG. 49, the control unit 170 of the first display device 100_1 can output a partial video 311 of first content 310 through the display unit 180 of the first display device 100_1, and the control unit 170 of the second display device 100_2 can output the remaining video 313 of the first content 310 through the display unit 180 of the second display device 100_2. The control unit 170 of the first display device 100_1 can output a first infobox 754 in a left black region 511 that is a black region of the first display unit 180_1. Information on the displayed first content 310 can be displayed in the first infobox 754. For example, information on a broadcast service channel name or a broadcast service provider can be displayed in the first infobox 754. The control unit 170 of the second display device 100_2 can output a second infobox 755 in a left black region 521 that is a black region of the second display unit 180_2. Information on date and current time can be displayed in the second infobox 755. In addition, the control unit 170 of the second display device 100_2 can display a volume window 756 displaying a size of an output audio volume in the right black region 521 that is the black region of the second display unit 180_2.

Furthermore, when the information display window is displayed with respect to the variety of the information related to the display device 100, each of the display devices 100 according to the present invention can adjust a size of a displayed screen and move a combined screen.

This will be described with reference to FIG. 50.

FIG. 50 illustrates a channel list display operation according to an embodiment of the present invention.

Referring to FIG. 50, the control unit 170 of the first display device 100_1 can display a partial video 312 of first content 310 on a whole screen of the first display unit 180_1, and the control unit 170 of the second display device 100_2 can display the remaining video 314 of the first content 310 on a whole screen of the second display unit 180_2. At least one of the first control unit 170_1 and the second control unit 170_2 can acquire a user input for displaying a channel list. The first display device 100_1 and the second display device 100_2 can move a combined screen with respect to the first content 310 in a left direction. Therefore, the control unit 170 of the first display device 100_1 can display a changed partial screen 315 with respect to the first content 310 on the first display unit 180_1, and the control unit 170 of the second display device 100_2 can display the changed remaining screen 316 with respect to the first content 310 on the second display unit 180_2. The control unit 170 of the second display device 100_2 can display a channel list 761 in a partial region of a screen in the second display unit 180_2. A list with respect to a plurality of broadcast channels can be displayed on the channel list 716. Here, a size of the changed partial screen 315 and the changed remaining screen 316 may be smaller than that of a screen with respect to the partial video 312 and the remaining video 314 before the combined screen is moved according to the channel list display.

Meanwhile, one display device 100 of the plurality of display devices 100 operating in the twin mode may output a specific video, and the other display device 100 may output a screen with respect to information related to the specific video.

This will be described with reference to FIG. 51.

FIG. 51 is a flowchart of a process of displaying related information according to an embodiment of the present invention.

Referring to FIG. 51, a control unit 170 of a first display device 100_1 outputs a first video on a first display unit 180_1 (S501).

The control unit 170 of the first display device 100_1 can output the first video with respect to content or an application on a whole screen or a partial screen of first display unit 180_1.

The control unit 170 of the first display device 100_1 transmits information on the output first video to a second display device 100_2 through a communication unit 195 (S503).

Here, the transmitted information on the first video can include information on at least one of a content name of the output first video, contents of content, a name and contents of an application, and a user input with respect to the output first video.

A control unit 170 of a second display device 100_2 acquires information related to the first video based on the transmitted formation on the first video (S505).

When the first video is specific content, the control unit 170 of the second display device 100_2 can acquire information on content corresponding to the first video.

In addition, when the first video is a video with respect to a specific application, the control unit 170 of the second display device 100_2 can acquire information on in formation on an application corresponding to the first video.

The control unit 170 of the second display device 100_2 outputs the information related to the first video on a second display unit 180_2 (S507).

When the first video is the specific content, the control unit 170 of the second display device 100_2 can output the acquired information on the content corresponding to the first video on the second display unit 180_2.

In addition, when the first video is the specific application, the control unit 170 of the second display device 100_2 can output the information on the application corresponding to the first video on the second display unit 180_2.

Hereinafter, a specific embodiment with respect to a display of the aforementioned related information will be described.

FIG. 52 is an illustrative diagram of an EPG display according to an embodiment of the present invention.

Referring to FIG. 52, a control unit 170 of a first display device 100_1 can display an EPG 770 on a first display unit 180_1. Information on a broadcast schedule with respect to at least one broadcast service may be displayed on the EPG 770 displayed on the first display unit 180_1. The control unit 170 of the first display device 100_1 can acquire a user input for selecting one piece of content from the EPG 770 displayed on the first display unit 180_1. The control unit 170 of the first display device 100_1 may display a region 775 so as to be distinguished from other regions, the region 775 corresponding to first content 310 selected from a plurality of pieces of content. The control unit 170 of the first display device 100_1 can transmit information on the first content 310 to a second display device 100_2. A control unit 170 of the second display device 100_2 can acquire a video with respect to the first content 310 based on the transmitted information on the first content 310. The control unit 170 of the second display device 100_2 can display the first content 310 on a second display unit 180_2. As described above, among the first display device 100_1 and the second display device 100_2, one can display an EPG, and the other can display a video with respect to content selected from the EPG.

Meanwhile, the first display device 100_1 and the second display device 100_2 can display the EPG on a large screen, i.e., a combined screen.

Hereinafter, this will be described with reference to FIG. 53.

FIG. 53 illustrates a combined screen displaying an EPG according to an embodiment of the present invention.

Referring to FIG. 53, the control unit 170 of the first display device 100_1 can display a partial video 772 of magnified EPG 771 on the first display unit 180_1, and the control unit 170 of the second display device 100_2 can display the remaining video 773 of the magnified EPG 771 on the second display unit 180_2. For example, the magnified EPG 771 can display broadcast information from now to 8 hours later. Therefore, the control unit 170 of the first display device 100_1 can display broadcast information from now to 4 hours later on the partial video 772 of the magnified EPG 772, and the control unit 170 of the second display device 100_2 can display broadcast information from 4 hours later to 8 hours later on the remaining video 773 of the magnified EPG 771.

Meanwhile, the first display device 100_1 may output a specific video, and the second display device 100_2 may output a video acquired by magnifying a specific region of the specific video output from the first display device 100_1.

This will be described with reference to FIG. 54A.

FIG. 54A illustrates a magnified video display according to an embodiment of the present invention.

Referring to FIG. 54A, a control unit 170 of a first display device 100_1 can display first content 310 on a first display unit 180_1. The control unit 170 of the first display device 100_1 can display a guide box 620 for selecting a magnified video on the first display unit 180_1 and move a position of the guide box 620 in response to a user input. In addition, the control unit 170 of the first display device 100_1 can adjust a size of the guide box 620 in response to a user input. Meanwhile, the control unit 170 of the first display device 100_1 can transmit information on a selected region of the first content 310 corresponding to the guide box 620 to a second display device 100_2. A control unit 170 of the second display device 100_2 can display a magnified video 318 of the selected region in the first content 310 on a second display unit 180_2 based on the transmitted information on the selected region.

In addition, at least one display device 100 of the plurality of display devices 100 may receive, from a terminal 800 linked thereto, selection region information for selecting a specific region of a specific video output from the display device 100 and output a magnified video of the selected specific region based on the received selection region information. Before this is described, a configuration of the terminal 800 linked to the display device 100 will be described first.

The terminal 800 can include a communication module 810, a display module 820, a control module 830, and a memory 840.

The communication module 810 can communicate with other devices. For example, the communication module 810 can communicate with the communication unit 195 of the display device 100.

The display module 820 can output various videos.

The control module 830 cam control an entire operation of the terminal 800.

The memory 840 can store a variety of data related to an operation of the terminal 800.

FIGS. 54B and 54C are referenced.

FIG. 54B is an illustrative diagram illustrating a magnified region selection through a terminal according to an embodiment of the present invention.

FIG. 54C is an illustrative diagram illustrating a magnified region selection through a terminal according to another embodiment of the present invention.

Referring to FIG. 54B, the control unit 170 of the first display device 100_1 can display first content 310 on the first display unit 180_1. The control unit 170 of the first display device 100_1 can display a guide box 620 for selecting a magnified video on the first display unit 180_1 and move a position of the guide box 620 in response to a user input. In addition, at least one of the control unit 170 of the first display device 100_1 and the control unit 170 of the second display device 100_2 may receive selection region information for selecting a magnified video from the terminal 800 and control the second display device 100_2 to display a magnified video 318 of a selected region on the second display unit 180_2 based on the received selection region information. Specifically, the control module 830 of the terminal 800 can display a guide box 630 on the display module 820. The control module 830 can move a position of the guide box 630 in respond to a user input. In addition, the control module 830 may adjust a size of the guide box 630 in respond to a user input. The control module 830 may or may not display a video that is an object to be magnified, on the display module 820. For example, as shown in FIG. 54B, the control module 830 can display the first content 310 on the display module 820 and display the guide box 630 for selecting a magnified video of the first content 310. In another example, as shown in FIG. 54C, the control module 830 may not display the first content 310 on the display module 820 and display only the guide box 630 for selecting the magnified video. The control module 830 can transmit selection region information including information on a selected region of the first content 310 corresponding to the guide box 630 to at least one of the first display device 100_1 and the second display device 100_2 through the communication module 810. The second display device 100_2 receiving the selection region information can display a magnified video 318 of the selected region on the second display unit 180_2. In addition, the first display device 100_1 may display the first content 310 and the guide box 620 on the first display unit 180_1 in response to the received selection region information.

Meanwhile, each of the display devices 100 can display an original reduction video indicating an original of an output video in a partial region of the display unit 180 and display an output guide box 610 indicating a region of the original reduction video, which is output on a real display unit 180. When each of the display devices 100 acquires a user input for moving the output guide box 610, a video corresponding to the moved output guide box 610 can be output on the display unit 180 of each of the display devices 100.

This will be described with reference to FIG. 55.

FIG. 55 is an illustrative diagram of an output video selection according to an embodiment of the present invention.

Referring to FIG. 55, a control unit 170 of a first display device 100_1 can display a partial video 312 of first content 310 on a whole screen of a first display unit 180_1, and a control unit 170 of a second display device 100_2 can display the remaining video 314 of the first content 310 on a whole screen of a second display unit 180_2. An original reduction video 780 indicating an original video of the first content 310 can be displayed in a partial region of the second display device 100_2, and an output guide box 610, which indicates a region corresponding to a video actually output through the first display unit 180_1 and the second display unit 180_2, can be displayed in the partial region of the second display device 100_2. The control unit 170 of at least one of the first display device 100_1 and the second display device 100_2 can acquire a user input for moving the output guide box 610 displayed on the original reduction video 780 and display videos with respect to the first content 310 on the first display unit 180_1 and the second display unit 180_2 in response to the moved output guide box 610.

Meanwhile, at the time of setting a screen, the plurality of display devices 100 operating in the twin mode can display a screen before a screen setup input on one display device 100 of the plurality of display devices 100 and display a screen after the screen setup input on the other display device 100. Here, a screen setup can be for adjusting a video displayed on the display unit 180 and mean that at least one of a color, contrast, brightness, definition, color density, white balance, backlight brightness, and a screen mode is adjusted.

This will be described with reference to FIG. 56.

FIG. 56 is an illustrative diagram of a screen setup according to an embodiment of the present invention.

Referring to FIG. 56, a control unit 170 of a first display device 100_1 can display first content 310 before a screen setup on a first display unit 180_1. A control unit 170 of a second display device 100_2 can display first content 319 changed according to the screen setup on a second display unit 180_2. When the control unit 170 of the second display device 100_2 acquires a user input with respect to the screen setup, the control unit 170 can display a screen corresponding to the acquired user input on the second display unit 180_2. Therefore, the user can compare a screen before the screen setup and a screen after the screen setup through the first display device 100_1 and the second display device 100_2.

Meanwhile, the plurality of display devices 100 operating in the twin mode can display a video at a current time on the display unit 180 of one display device 100 of the plurality of display devices 100 and display a video at a past time on the display unit 180 of the other display device 100 of the plurality of display devices 100. In an embodiment, when each of the plurality of display devices 100 is configured with the first display device 100_1 and the second display device 100_2, the first display device 100_1 can output the video at the current time and the second display device 100_2 can output the video at the past time. When the second display device 100_2 receives a user input for adjusting a time of the output video, the second display device 100_2 may adjust the time of the output video.

Meanwhile, when the plurality of display devices 100 operating in the twin mode output an image on a large screen, i.e., a combined screen, the plurality of display devices 100 can move the image displayed on the combined screen such that an object corresponding to a thing or a human is not displayed at positions corresponding to bezels of the plurality of display devices 100, which closely contact each other.

This will be described with reference to FIG. 57.

FIG. 57 is an illustrative diagram of a movement of an image displayed on a combined screen according to an embodiment of the present invention.

Referring to FIG. 57, a control unit 170 of a first display device 100_1 can display a partial image 391 of a first image 390 on a first display unit 180_1, and a control unit 170 of a second display device 100_2 can display the remaining image 393 of the first image 390 on a second display unit 180_2. At least one of a first control unit 170_1 and a second control unit 170_2 can recognize an object corresponding to a human face included in the first image 390 and determine a position of the recognized object. Therefore, at least one of the first control unit 170_1 and the second control unit 170_2 can recognize that the human face included in the first image 390 is displayed at positions corresponding to bezels of the first display device 100_1 and the second display devices 100_2, which closely contact each other. The first display device 100_1 and the second display device 100_2 can move the first image 390 displayed on the display units 180 in a left direction. Therefore, the control unit 170 of the first display device 100_1 can display a partial image 392 of the first image 390 moved in the left direction on the first display unit 180_1, and the control unit 170 of the second display device 100_2 can display the remaining image 394 of the first image 390 moved in the left direction on the second display unit 180_2.

In addition, the plurality of display devices 100 operating in the twin mode may receive one or more images or one or more videos from the terminal 800 linked thereto and output the received one or more images or the received one or more videos.

This will be described with reference to FIG. 58.

FIG. 58 is an illustrative diagram of an image display screen according to an embodiment of the present invention.

Referring to FIG. 58, a first display device 100_1 and a second display device 100_2 can receive one or more images from a terminal 800. Here, the one or more images transmitted from the terminal 800 may be a preview image with respect to an image. The first display device 100_1 can display an image list screen 760 displaying thumbnail images respectively corresponding to a plurality of images transmitted from the terminal 800. The first display device 100_1 may display a pointer 205 on the image list screen 760 and acquire a user input for selecting one thumbnail image of a plurality of thumbnail images displayed on the image list screen 760. A control unit 170 of the first display device 100_1 can transmit information on a selected thumbnail image to the second display device 100_2. Therefore, a control unit 170 of the second display device 100_2 can display an image 399 corresponding to the selected thumbnail image on a second display unit 180_2. When the information on the selected thumbnail image is received from the first display device 100_1, the terminal 800 can display the image 399 corresponding to the selected thumbnail image on a display module 820.

Meanwhile, the plurality of display devices 100 operating in the twin mode can display a menu related to an operation and a function thereof on at least one display device 100.

This will be described with reference to FIGS. 59 and 60.

FIG. 59 is an illustrative diagram of a menu screen according to an embodiment of the present invention.

Referring to FIG. 59, a first display device 100_1 can display first content 310, and a second display device 100_2 can display second content 330. The first display device 100_1 can display a menu window 764 including a plurality of menus. The first display device 100_1 can acquire a user input for selecting one menu from the displayed menu window 764 through a pointer 205. Therefore, the first display device 100_1 can perform an operation corresponding to a selected menu.

FIG. 60 is an illustrative diagram of a menu screen according to another embodiment of the present invention.

Referring to FIG. 60, a first display device 100_1 can display first content 310, and a second display device 100_2 can display second content 330. The first display device 100_1 and the second display device 100_2 can display a menu window 765 including a plurality of menus. At least one of the first display device 100_1 and the second display device 100_2 can acquire a user input for selecting one menu from the displayed menu window 765 through a pointer 205. Therefore, at least one of the first display device 100_1 and the second display device 100_2 can perform an operation corresponding to a selected menu.

In addition, one display device 100 of the plurality of display devices 100 operating in the twin mode can display an input key in a partial region of the screen in the display unit 180. Here, the input key can mean a key for operating the display device 100. When a user input is acquired with respect to the input key, the plurality of display devices 100 can perform an operation corresponding to the acquired user input.

This will be described with reference to FIG. 61.

FIG. 61 illustrates an input key display screen according to an embodiment of the present invention.

Referring to FIG. 61, a first display device 100_1 can display first content 310, and a second display device 100_2 can display second content 330. A control unit 170 of the first display device 100_1 can display an input key 745 for operating a display device 100 in a partial region of a display unit 180. For example, various keys such as a numeric key, a screen capture key, and a power key can be displayed on the input key 745. The control unit 170 of the first display device 100_1 can acquire a user input with respect to the displayed input key 745 through a displayed pointer 205. Therefore, at least one of the first display device 100_1 and the second display device 100_2 can perform an operation corresponding to the user input with respect to the displayed input key 745.

The description of the input key is an example for description, and the present invention is not limited thereto. Therefore, various keys can be displayed on the input key according to a selection of a user or a designer.

FIG. 62 is a flowchart showing a process of displaying a pointer of a display device according to an embodiment of the present invention.

A display device 100 of FIG. 62 can be connected to at least one other display device and be disposed such that one side surface thereof closely contact one side surface of the at least one other display device. In addition, the display device 100 of FIG. 62 can be the display device 100 described in FIG. 5 operating as the master device described above or a display device 100 connected to a remote control device 200 (for example, paired with the remote control device 200 by using a Bluetooth communication method).

Referring to FIG. 62, the display device 100 can set position coordinates of each of display devices (including the display device 100 and at least one other display device) based on a placement state of the display devices (S1000). A control unit 170 of the display device 100 can check the displacement state of the display devices by performing at least one of the embodiments shown in FIGS. 19 to 21.

The display device 100 can change a pointer coordinate system based on the set position coordinates (S1100).

The pointer coordinate system is for calculating coordinates of a pointer displayed on a display unit 180 in response to movement information of the remote control device 200 and can have a certain coordinate range. The control unit 170 of the display device 100 can change the pointer coordinate system by changing a coordinate range of the pointer based on the set position coordinates.

Operations S1000 and S1100 will be described in more detail with reference to FIGS. 63 to 65.

FIG. 63 is an illustrative diagram of position coordinates set based on a placement state of display devices.

The descriptions in FIGS. 63 to 70B assume that the display devices are four display devices 100_1 to 100_4, but the number of the display devices can be freely changed.

In addition, the display device of FIG. 62 is assumed to be a first display device 100_1 of a plurality of display devices 100_1 to 100_4 shown in FIGS. 63 to 67C.

Referring to FIG. 63, a control unit 170 of the first display device 100_1 can check a placement state of the display devices 100_1 to 100_4.

For example, as shown in FIG. 19, when any one placement setting item of placement setting items displayed on a display unit 180 is selected with respect to each of the display devices 100_1 to 100_4, the control unit 170 of the first display device 100_1 can check the placement state of the display devices 100_1 and 100_4 by receiving the placement setting item selected from each of the other display devices 100_2 to 100_4 or placement information.

According to an embodiment, as shown in FIG. 20, the control unit 170 of the first display device 100_1 may check the placement state of the display devices 100_1 and 100_4 based on a test voice signal of each of the display devices 100_1 and 100_4, which is received from the remote control device 200.

According to another embodiment, as shown in FIG. 21, the control unit 170 of the first display device 100_1 may check the placement state of the display devices 100_1 and 100_4 by analyzing an image captured by a camera 191 of each of the display devices 100_1 and 100_4.

Besides, the control unit 170 may check the placement state of the display devices 100_1 and 100_4 by using a proximity sensor 160 included in each of the display devices 100_1 to 100_4, and use other various methods.

The control unit 170 can set position coordinates of each of the display devices 100_1 and 100_4 based on the check result of the placement state of the display devices 100_1 and 100_4. When the display devices 100_1 to 100_4 are disposed as shown in FIG. 63, the control unit 170 can set the position coordinates of the first display device 100_1 to (0, 0), the position coordinates of the second display device 100_2 to (1, 0), the position coordinates of the third display device 100_3 to (0, 1), and the position coordinates of the fourth display device 100_4 to (1, 1).

According to an embodiment, when a placement state of the display devices is different from the placement state shown in FIG. 63, position coordinates set in each of the display devices can be changed. For example, when four display devices are horizontally disposed in a row, position coordinates of the four display devices can be set to (0), (1), (2), and (3) or set to (0, 0), (1, 0), (2, 0), and (3, 0).

The control unit 170 can transmit the set position coordinates to the corresponding display devices 100_2 and 100_4, respectively. Each of the display devices 100_1 to 100_4 can store the position coordinates.

FIG. 64 is an illustrative diagram of a process of changing a pointer coordinate system based on position coordinates set with respect to each of display devices, and FIG. 65 is an illustrative diagram illustrating a pointer coordinate range set with respect to each of the display devices based on the changed pointer coordinate system.

In FIGS. 64 and 65, a pointer coordinate system of each of display devices 100_1 and 100_4 is assumed to have a size of 1,920*1,080. That is, a pointer coordinate range of each of the display devices 100_1 to 100_4 can have a range of (0, 0) to (1,919, 1,079)

The pointer coordinate system can correspond to definition of a display device, but is not necessarily limited thereto. For example, when the definition of the display device full HD (1,920*1,080), a size of the pointer coordinate system may also be 1,920*1,080.

Referring to FIGS. 64 and 65, each of the display devices 100_1 to 100_4 can change the pointer coordinate system based on the set position coordinates. When the display devices 100_1 to 100_4 are disposed as shown in FIG. 64, a pointer coordinate system with respect to all of the display devices 100_1 and 100_4 can have a size of 3,840*2,160.

Each of the display devices 100 can change the pointer coordinate system based on the set position coordinates. Specifically, each of the display devices 100_1 to 100_4 can change the pointer coordinate range based on the set position coordinates.

Each of the display devices 100_1 to 100_4 can change the pointer coordinate range by using the following Mathematical Equation 1.

$$X_{Min} = X_{TV} * X_{pointerMax}$$

$$X_{Max} = \{(X_{TV}+1) * X_{pointerMax}\} - 1$$

$$Y_{Min} = Y_{TV} * Y_{pointerMax}$$

$$Y_{Max} = \{(Y_{TV}+1) * Y_{pointerMax}\} - 1 \quad \text{[Mathematical Equation 1]}$$

Referring to Mathematical Equation 1, $X_{Min}$ and $X_{Max}$ can mean an X-coordinate range of a pointer coordinate range to be changed with respect to each of the display devices 100_1 to 100_4, and $Y_{Min}$ and $Y_{Max}$ can mean a Y-coordinate range of the pointer coordinate range to be changed. That is, the pointer coordinate range to be changed with respect to each of the display devices 100_1 to 100_4 can be a range of $(X_{Min}, Y_{Min})$ to $(X_{max}, Y_{max})$.

$X_{TV}$ and $Y_{TV}$ may mean the position coordinates $(X_{TV}, Y_{TV})$ set with respect to each of the display devices 100_1 and 100_4, and $X_{pointerMax}$ and $Y_{pointerMax}$ can respectively mean sizes of an X-coordinate and a Y-coordinate of a pointer coordinate system preset with respect to each of the display devices 100_1 to 100_4 (for example, $X_{pointerMax}=1,920$, and $Y_{pointerMax}=1,080$).

The pointer coordinate ranges of the display devices 100_1 to 100_4 can be calculated as follows by using Mathematical Equation 1.

In the case of the first display device 100_1, since $X_{TV}$ and $Y_{TV}$ are 0, $X_{pointerMax}$ is 1,920, and $Y_{pointerMax}$ is 1,080, $X_{Min}$ is 0, $X_{Max}$ is 1,919, $Y_{Min}$ is 0, and $Y_{Max}$ is 1,079. That is, the pointer coordinate range of the first display 100_1 device can have (0, 0) to (1,919, 1,079).

In the case of the second display device 100_2, since $X_{TV}$ is 1, $Y_{TV}$ is 0, $X_{pointerMax}$ is 1,920, and $Y_{pointerMax}$ is 1,080, $X_{Min}$ is 1,920, $X_{Max}$ is 3,839, $Y_{Min}$ is 0, and $Y_{Max}$ is 1,079. That is, the pointer coordinate range of the second display device 100_2 can have (1,920, 0) to (3,839, 1,079).

In the case of the third display device 100_3, since $X_{TV}$ is 0, $Y_{TV}$ is 1, $X_{pointerMax}$ is 1,920, and $Y_{pointerMax}$ is 1,080, $X_{Min}$ is 0, $X_{Max}$ is 1,919, $Y_{Min}$ is 1,080, and $Y_{Max}$ is 2,159. That is, the pointer coordinate range of the third display device 100_3 can have (0, 1,080) to (1,919, 2,159).

Finally, in the case of the fourth display device 100_4, since $X_{TV}$ and $Y_{TV}$ are 1, $X_{pointerMax}$ is 1,920, and $Y_{pointerMax}$ is 1,080, $X_{Min}$ is 1,920, $X_{Max}$ is 3,839, $Y_{Min}$ is 1,080, and $Y_{Max}$ is 2,159. That is, the pointer coordinate range of the fourth display device 100_4 can have (1,920, 1,080) to (3,839, 2,159).

Pieces information on the changed pointer coordinate ranges of the display devices 100_1 to 100_4 can be stored in the maser device, i.e., the first display device 100_1 or respectively stored in the display devices 100_1 and 100_4.

FIG. 62 will be described again.

Referring to FIG. 62, the display device 100 can receive movement information from the remote control device 200 (S1200). When the remote control device 200 connected to the display device 100 (for example, paired with the display device 100 by using a Bluetooth communication method) moves to move a position of the pointer, the control unit 170 of the display device 100 can receive the movement information from the remote control device 200.

The display device 100 can calculate coordinates of the pointer based on the changed pointer coordinate system (pointer coordinate range) and the movement information received from the remote control device 200 (S1300). The control unit 170 of the display device 100 can calculate the coordinates of the pointer from the movement information of the remote control device 200. At this time, the control unit 170 can calculate the coordinates of the pointer within the changed pointer coordinate system.

In order for at least one of display devices to display the pointer on a display unit, the display device 100 can transmit the calculated coordinates to the display devices (S1400). The display devices can determine based on the received coordinates whether the pointer is displayed, and display the pointer in a graphic form at a position corresponding to the coordinates.

Operations S1200 and S1400 will be described in more detail with reference to FIGS. 66A to 67C.

FIGS. 66A to 66C illustrate an embodiment according to a pointer display operation of the display device shown in FIG. 62.

Referring to FIGS. 66A to 66C, the control unit 170 of the first display device 100_1 can receive first movement information MI1 from the remote control device 200 connected to the first display device 100_1.

The first movement information MI1 can be generated by a sensor unit 240 included in the remote control device 200. For example, a gyro sensor 241 included in the sensor unit 240 can sense information on an operation of the remote control device 200 with respect to an x-axis, a y-axis, and a z-axis, and an acceleration sensor 243 can sense information on a movement speed or the like of the remote control device 200. The first movement information MI1 can include the information on the operation of the remote control device 200 and/or the information on the movement speed or the like of the remote control device 200.

The control unit 170 can calculate first pointer coordinates PC1 based on the received first movement information MI1.

The calculated first pointer coordinates PC1 can have any coordinates within the pointer coordinate system shown in FIG. 64 or 65.

The control unit 170 can transmit the calculated first pointer coordinates PC1 to the other display devices 100_2 and 100_4. Each of the display devices 100_1 to 100_4 can determine based on the first pointer coordinates PC1 whether the pointer 205 is displayed.

For example, when the first pointer coordinates PC1 are (240, 910), only the first display device 100_1 may display the pointer 205 on the display unit 180, and the remaining display devices 100_2 and 100_4 may not display the pointer 205.

FIGS. 67A to 67C illustrate an embodiment according to a pointer display operation of the display device shown in FIG. 62.

Referring to FIGS. 67A to 67B, the control unit 170 of the first display device 100_1 can receive second movement information MI2 from the remote control device 200 connected to the first display device 100_1.

The control unit 170 can calculate second pointer coordinates PC2 based on the received second movement information MI2 and transmit the calculated second pointer coordinates PC2 to the other display devices 100_2 to 100_4.

Each of the display devices 100_1 to 100_4 can determine based on the second pointer coordinates PC2 whether the pointer 205 is displayed. For example, when the second pointer coordinates PC2 are (1,910, 1,580), only the third display device 100_3 can display the pointer 205. At this time, the third display device 100_3 as well as the fourth display device 100_4 can display a portion of the pointer 205 based on a size of the pointer 205 displayed in a graphic form.

That is, each of the display devices 100_1 to 100_4 can determine whether the pointer 205 is displayed, based on pointer coordinates calculated by the first display device 100_1 and a size of the pointer 205. Information on the size of the pointer 205 may be stored in a storage unit 140 of each of the display devices 100_1 to 100_4.

Referring to FIG. 67C, in a case where the size of the pointer 205 is assumed to be 20*20, since the second pointer coordinates PC2 are (1,910, 1,580), the third display device 100_3 can display a first portion 205_1 of the pointer 205 (corresponding to a left size of 10*20 of the pointer 205), and the fourth display device 100_4 can display a second portion 205_2 of the pointer 205 (corresponding to a right size of 10*20 of the pointer 205), except for the first portion 205_1 of the pointer 205. That is, the third display device 100_3 can display the first portion 205_1 of the pointer 205 in a space having a coordinate range of (1,910, 1,580) to (1,919, 1,599) of the display unit 180, and the fourth display device 100_4 can display the second portion 205_2 of the pointer 205 in a space having a coordinate range of (1,920, 1,580) to (1,929, 1,599) of the display unit 180.

Therefore, when the pointer 205 is moved from any one display device to other display device, the pointer 205 can be naturally displayed even on boundaries between the display devices 100_1 to 100_4.

While the first display device 100_1 has been described as transmitting pointer coordinates to all of the other display devices 100_2 to 100_4, the display device 100_1 may transmit the pointer coordinates only to display devices, which are to display the pointer 205 based on the pointer coordinates, according to an embodiment. For example, in the case of FIGS. 66A to 66C, the first display device 100_1 may not transmit the first pointer coordinates PC1 to the other display devices 100_2 to 100_4, and in the case of FIGS. 67A to 67C, the first display device 100_1 may transmit the second pointer coordinates PC2 only to the third display device 100_3 and the fourth display device 100_4 and may not transmit the second pointer coordinates PC2 to the second display device 100_2.

FIG. 68 is a flowchart showing a process of processing a control command received from a remote control device through a display device according to an embodiment of the present invention.

A display device 100 of FIG. 68 can mean a display device connected to a remote control device 200. That is, the display device 100 may be the master device or the slave device described above with reference to FIG. 5.

Referring to FIG. 68, the display device 100 can receive a control command from the remote control device 200 (S2000). The control command can be a signal generated according to operations of various buttons 231 to 237 of a user input unit 230 in the remote control device 200. The control command can include various commands related to a function of the display device 100, such as a power on/off command, a volume adjustment command, and a channel change command.

The display device 100 can verify an operation mode of the display device 100 in response to the received control command (S2100). The operation mode can include a twin mode (described above) in which one piece of content is displayed on a combined screen of the display device 100 and the other display devices and a split mode in which the display devices respectively display different pieces of content.

As the verification result, when the operation mode of the display device 100 is the twin mode (YES of S2200), the display device 100 can transmit the received control command to a display device corresponding to the master device (S2300). The display device corresponding to the master device can process the received control command.

According to an embodiment, when the display device 100 is the master device, the display device 100 can not transmit the received control command to the other display device and immediately process the control command.

On the contrary, when the operation mode of the display device 100 is the split mode (NO of S2200), the display device 100 can transmit the received control command to a display device corresponding to a current position of the pointer 205, i.e., a display device currently displaying the pointer 205 (S2400).

An operation of the display device shown in FIG. 68 will be described in more detail with respect to FIGS. 69A to 70B.

FIGS. 69A and 69B illustrate an embodiment according to an operation of the display device shown in FIG. 68.

Referring to FIGS. 69A and 69B, it can be seen that the display devices 100_1 to 100_4 operate in the twin mode in which one piece of content is displayed on one combined screen. The fourth display device 100_4 connected to the remote control device 200 can receive a first control command CMD1. The remote control device 200 may be connected to the fourth display device 100_4 and may not be connected to the other display devices 100_1 to 100_3.

A control unit 170 of the fourth display device 100_4 can verify an operation mode of the fourth display device 100_4 in response to the received first control command CMD1. As the verification result, since the operation mode of the fourth display device 100_4 is the twin mode, the control unit 170 can transmit the received first control command CMD1 to the first display device 100_1 that is a master device.

A control unit 170 of the first display device 100_1 can process the first control command CMD1 received from the fourth display device 100_4. For example, when the first control command CMD1 is a volume adjust command, the control unit 170 of the first display device 100_1 can adjust a volume of the first display device 100_1 and transmit a control signal for adjusting a volume of each of the other display devices 100_2 to 100_4 to each of the other display devices 100_2 to 100_4.

That is, in the case of the present embodiment, when the display devices 100_1 to 100_4 operate in the twin mode, the operations of the display devices 100_1 to 100_4 can be controlled by using the remote control device 200 connected to the first display device 100_1 corresponding to the master device as well as the fourth display device 100_4 corresponding to a salve device.

FIGS. 70A and 70B illustrate an embodiment according to an operation of the display device shown in FIG. 68.

Referring to FIGS. 70A and 70B, it can be seen that the display devices 100_1 to 100_4 operate in the split mode in which different pieces of content are displayed. The fourth display device 100_4 connected to the remote control device 200 can receive a second control command CMD2.

The control unit 170 of the fourth display device 100_4 can verify an operation mode of the fourth display device 100_4 in response to the received second control command CMD2. As the verification result, since the operation mode of the fourth display device 100_4 is the split mode, the control unit 170 can verify a display device currently displaying the pointer 205.

In the case of embodiments shown in FIGS. 62 to 67C, the control unit 170 of the fourth display device 100_4 connected to the remote control device 200 can receive movement information from the remote control device 200 and calculate coordinates of the pointer 205 based on the received movement information. That is, the control unit 170 can determine based on the calculated coordinates of the pointer 205 that a display device currently displaying the pointer 205 is the second display device 100_2.

Therefore, the control unit 170 can transmit the received second control command CMD2 to the second display device 100_2, and a control unit 170 of the second control unit 170 can process the received second control command CMD2. For example, when the second control command CMD2 is a channel change command, the control unit 170 of the second display device 100_2 can change a channel to display other content to the display unit 180.

According to the present embodiment, when the display devices 100_1 to 100_4 operate in the split mode, a user can control operations of the other display devices 100_1 to 100_3 by using the remote control device 200 connected to any display device (for example, the fourth display device 100_4). That is, operations of various display devices can be controlled with the remote control device 200 alone.

According to an embodiment of the present invention, a display device can naturally display a pointer corresponding to a movement of a remote control device through a plurality of display devices connected to the display device.

In addition, an operation of the plurality of display devices can be controlled by using the remote control device connected to any one display device.

The invention can also be embodied as computer-readable codes on a computer-readable recording medium. The computer-readable recording medium is any data storage device that can store data which can be thereafter read by a computer system. Examples of the computer-readable recording medium include hard disk drives (HDDs), solid state disks (SSDs), silicon disk drives (SDDs), read-only memory (ROM), random-access memory (RAM), CD-ROMs, magnetic tapes, floppy disks, optical data storage devices, and storage media such as carrier waves (e.g., transmission through the Internet). Additionally, the computer may include the control unit 170 of a display device. Accordingly, the detailed description is not construed as being limited in all aspects and should be considered as illustrative. The scope of the invention should be determined by reasonable interpretation of the appended claims, and all modifications within equivalent ranges of the present invention are included in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
   a primary display;
   a communication unit configured to communicate with an other display device wherein a side of the other display device is located proximate to a side of the display device; and
   a controller configured to:
   cause a pointer corresponding to a remote control device to be displayed on the primary display or a secondary display of the other display device, wherein a position of the displayed pointer is based on a movement of the remote control device relative to the display device and a placement state of the display device relative to the other display device; and
   cause the display device or the other display device to execute a control command in response to a control command input received via the remote control device, wherein the control command is executed by the display device or the other display device based on an operation mode of the display device, wherein:
   a first content is displayed on the primary display;
   a second content is displayed on the secondary display; and
   the controller is further configured to cause at least one reference line to be displayed on the secondary display indicating an available aspect ratio for setting a new aspect ratio of the first content in response to a drag input of the pointer from the primary display to the secondary display.

2. The display device of claim 1, wherein the controller is further configured to set respective device position coordinates corresponding to the display device and the other display device based on the placement state of the display device and the other display device.

3. The display device of claim 2, wherein the controller is further configured to set a pointer coordinate system of the primary display based on the set device position coordinates.

4. The display device of claim 1, wherein the controller is further configured to:
   determine coordinates corresponding to a position of the displayed pointer based on the placement state and the movement of the remote control device; and cause the communication unit to transmit the determined coordinates to the other display device.

5. The display device of claim 4, wherein the controller is further configured to display at least a portion of the pointer on the primary display when a display position of the at least a portion of the pointer corresponds to the primary display based on a size and the determined coordinates of the pointer.

6. The display device of claim 1, wherein when the operation mode of the display device is set to a twin mode, the control command is executed by the display device or the other display device based on which device is controlling the twin mode, the twin mode corresponding to a single content being displayed across the primary display and the secondary display.

7. The display device of claim 1, wherein when the operation mode of the display device is set to a split mode, the control command is executed by the display device or the other display device based on whether the pointer is displayed on the primary display or the secondary display when the control command is input, the split mode corresponding to different content being displayed on the primary display and the secondary display.

8. The display device of claim 1, wherein:
the controller is further configured to cause the first content to be displayed across the primary display and a portion of the secondary display in response to a movement of the pointer from the primary display to the secondary display.

9. A method of operating a display device, the method comprising:
displaying a pointer corresponding to a remote control device on a primary display of the display device or a secondary display of another display device, wherein a side of the display device is proximate to a side of the other display device;
changing a display position of the pointer based on a movement of the remote control device relative to the display device and a placement state of the display device relative to the other display device; and
executing a control command via the display device or the other display device in response to a control command input via the remote control device, wherein the control command is executed by the display device or the other display device based on an operation mode of the display device, wherein:
a first content is displayed on the primary display;
a second content is displayed on the secondary display; and
the method further comprises displaying at least one reference line on the secondary display indicating an available aspect ratio for setting a new aspect ratio of the first content in response to a drag input of the pointer from the primary display to the secondary display.

10. The method of claim 9, further comprising setting respective device position coordinates corresponding to the display device and the other display device based on the placement state of the display device and the other display device.

11. The method of claim 10, further comprising setting a pointer coordinate system of the primary display based on the set device position coordinates.

12. The method of claim 9, further comprising:
determining coordinates corresponding to a position of the displayed pointer based on the placement state and the movement of the remote control device; and
transmitting the determined coordinates to the other display device.

13. The method of claim 12, further comprising displaying at least a portion of the pointer on the primary display when a display position of the at least a portion of the pointer corresponds to the primary display based on a size and the determined coordinates of the pointer.

14. The method of claim 9, wherein when the operation mode of the display device is set to a twin mode, the control command is executed by the display device or the other display device based on which device is controlling the twin mode, the twin mode corresponding to a single content being displayed across the primary display and the secondary display.

15. The method of claim 9, wherein when the operation mode of the display device is set to a split mode, the control command is executed by the display device or the other display device based on whether the pointer is displayed on the primary display or the secondary display when the control command is input, the split mode corresponding to different content being displayed on the primary display and the secondary display.

16. The method of claim 9, wherein:
the method further comprises displaying the first content to be displayed across the primary display and a portion of the secondary display in response to a movement of the pointer from the primary display to the secondary display.

* * * * *